(12) United States Patent
Elmore

(10) Patent No.: US 9,020,625 B2
(45) Date of Patent: Apr. 28, 2015

(54) PROCESS COST ANALYSIS SYSTEM

(75) Inventor: Donald M. Elmore, Dearborn, MI (US)

(73) Assignee: DataNet Quality Systems, Southfield, MI (US)

( * ) Notice: Subject to any disclaimer, the term of this patent is extended or adjusted under 35 U.S.C. 154(b) by 547 days.

(21) Appl. No.: 13/327,221

(22) Filed: Dec. 15, 2011

(65) Prior Publication Data
US 2012/0185073 A1    Jul. 19, 2012

Related U.S. Application Data

(60) Provisional application No. 61/433,442, filed on Jan. 17, 2011.

(51) Int. Cl.
*G06F 19/00* (2011.01)
*G05B 13/02* (2006.01)
*G06Q 10/06* (2012.01)

(52) U.S. Cl.
CPC ...................................... *G06Q 10/06* (2013.01)

(58) Field of Classification Search
CPC ....................................................... G06Q 10/06
USPC ......................................................... 700/103
See application file for complete search history.

(56) References Cited

U.S. PATENT DOCUMENTS

| | | | |
|---|---|---|---|
| 5,765,137 A * | 6/1998 | Lee | 705/7.25 |
| 2003/0033040 A1* | 2/2003 | Billings | 700/97 |
| 2004/0088265 A1* | 5/2004 | Bauer et al. | 705/400 |

OTHER PUBLICATIONS

Chang Hyun Kim, Yushin Hong, "An optimal production run length in deteriorating production process", Int. J. Production Economics 58 (1999) pp. 183-189.*
Yuanshyi Peter Chiu, "Determining the Optimal Lot size for the Finite Production Model with Random Defective Rate, the Rework Process, and Backlogging", Eng. Opt., vol. 35, No. 4, Aug. 2003, pp. 427-437.*

* cited by examiner

*Primary Examiner* — Mohammad Ali
*Assistant Examiner* — Yuhui R Pan
(74) *Attorney, Agent, or Firm* — Honigman Miller Schwartz and Cohn LLP

(57) ABSTRACT

A method of process cost analysis that includes determining a per-unit cost function for executing a process step, determining a percentage-of-acceptable-parts function for executing a process step, and receiving production data into memory. The production data corresponds to a measured quality metric of the executed process step. The method further includes determining a probability density function for the received production data, executing on a processor a correlation routine for cross-correlating the cost function with the probability density function of the production data to provide a first cross-correlation, and executing on the processor the correlation routine for cross-correlating the percentage-of-acceptable-parts function with the probability density function of the production data to provide a second cross-correlation. The method includes determining an average effective per-unit cost to produce a resultant of the process step by dividing the first cross-correlation by the second cross-correlation.

14 Claims, 56 Drawing Sheets

PROCESS COST ANALYSIS SYSTEM

CROSS REFERENCE TO RELATED APPLICATIONS

This U.S. patent application claims priority under 35 U.S.C. §119(e) to U.S. Provisional Application 61/433,442, filed on Jan. 17, 2011, which is hereby incorporated by reference in its entirety.

TECHNICAL FIELD

This disclosure relates to process cost analysis and statistical process control systems.

BACKGROUND

Statistical process control (SPC) typically entails the application of statistical methods to monitor and control a process to ensure that the process operates at its full potential to produce conforming product. Under SPC, a process may behave predictably to produce as much conforming product as possible with the least possible waste. While SPC has been applied most frequently to controlling manufacturing lines, it applies equally well to any process with a measurable output.

In general, SPC can be used to examine a process and the sources of variation in that process using tools that give weight to objective analysis over subjective opinions and to determine the strength of each source numerically. Variations in the process that may affect the quality of the end product or service can be detected and corrected, thus reducing waste as well as the likelihood that problems will be passed on to a customer. With an emphasis on early detection and prevention of problems, SPC generally has a distinct advantage over other quality methods, such as inspection, that apply resources to detecting and correcting problems after they have occurred.

SUMMARY

One aspect of the disclosure provides a method of process cost analysis. The method includes determining a per-unit cost function for executing a process step, determining a percentage-of-acceptable-parts function for executing a process step, and receiving production data into memory. The production data corresponds to a measured quality metric of the executed process step. The method further includes determining a probability density function for the received production data, executing on a processor a correlation routine for cross-correlating the per-unit cost function with the probability density function of the production data to provide a first cross-correlation, and executing on the processor the correlation routine for cross-correlating the percentage-of-acceptable-parts function with the probability density function of the production data to provide a second cross-correlation. The method includes determining an average effective per-unit cost to produce a resultant of the process step by dividing the first cross-correlation by the second cross-correlation.

In another aspect, a method of process cost analysis includes receiving at least one cost factor into memory for executing a process step and receiving production data into memory.

The production data corresponds to a measured quality metric of the executed process step. The method also includes determining a per unit manufacturing cost for the process step, determining a percentage of acceptable units manufactured by the process step, modeling the per unit manufacturing cost as a piecewise linear function, and modeling the percentage of acceptable units as a piecewise constant function. The method further includes determining a probability density function for the received production data, determining a first cross-correlation by executing on a processor a correlation routine for cross-correlating the piecewise linear function with the probability density function for the received production data, and determining a second cross-correlation by executing on the process the cross-correlation routine for cross-correlating the piecewise constant function with the probability density function for the received production data. Moreover, the method includes determining an average effective per-unit cost to produce a resultant of the process step by dividing the first cross-correlation by the second cross-correlation.

Yet another aspect of the disclosure provides a method of real-time statistical process control. The method includes determining a cost function for executing a process step and receiving production data into memory. The production data corresponds to a measured quality metric of the executed process step. The method further includes determining a probability density function for the received production data and executing on a processor a correlation routine for cross-correlating the cost function with the probability density function of the production data. The method also includes determining a percentage of acceptable process resultants produced by the process step and determining an average effective per-unit cost to produce a resultant of the process step by dividing the cross-correlation of the cost function and the probability density function of the production data by the cross-correlation of the percentage of acceptable process resultants and the probability density function of the production data.

Implementations of the disclosure may include one or more of the following features. In some implementations, the method includes determining a minimum value of the quotient of the first and second cross-correlations to determine a minimum average effective per-unit cost associated with a current data distribution. In some implementations, the method includes electronically displaying a plot corresponding to the average effective per-unit cost and/or minimum average effective per-unit cost. The method may include determining an optimal process mean associated with the minimum average effective per-unit cost associated with a current data distribution. The method may include presenting a process offset based at least in part on a difference between the optimal process mean and a current process mean associated with a current data distribution. The process offset can be associated with a cost savings of the process step. The minimum average effective per-unit cost can be iteratively determined using different standard deviations for the probability density function of the received data corresponding to a theoretical reduction in process variability. In some examples, the method includes determining an optimal mean and minimum average effective per-unit cost at one or more standard deviations. The method may include presenting the iteratively determined minimum average effective per-unit costs. For example, a progression of minimum average effective per-unit costs may be displayed at various % reductions in variation (e.g., 10%, 20%, 30%, etc.).

In some implementations, the cost function includes at least one of an indirect cost and a direct cost factor associated with the process step. The indirect cost factor may include a process cost factor (e.g., a fixed cost of machinery). The direct cost factor may include material costs. For example, the direct cost factor may include at least one of a lower specification limit violation scrap cost factor, a lower specification limit violation rework cost factor, an upper specification limit violation scrap cost factor, and an upper specification limit violation rework cost factor. Additional cost factors may include a lower specification limit violation scrap cost factor, a lower specification limit violation rework cost factor, an upper specification limit violation scrap cost factor, an upper specification limit violation rework cost factor, a maximum rework attempts cost factor for lower specification limit violations, a maximum rework attempts cost factor for upper specification limit violation, a lower dimensional limit for rework threshold cost factor, an upper dimensional limit for rework threshold cost factor, a cost of each rework attempt cost factor for lower specification limit violations a cost of each rework attempt cost factor for upper specification limit violations a percentage chance of rework success cost factor for lower specification limit violations, a percentage chance of rework success cost factor for upper specification limit violations, a percentage chance of rework failure cost factor for lower specification limit violations, a percentage chance of rework failure cost factor for upper specification limit violations, a percentage of lower specification limit violations allowed cost factor a percentage of upper specification limit violations allowed cost factor a disposal cost of a scrapped unit cost factor for lower specification limit violations, a disposal cost of a scrapped unit cost factor for upper specification limit violations, a per unit recovery value of a scrapped unit cost factor for lower specification limit violations, a per unit recovery value of a scrapped unit cost factor for upper specification limit violations, a per unit material value of a scrapped unit cost factor for lower specification limit violations, a per unit material value of a scrapped unit cost factor for upper specification limit violations, a per step process cost factor, and a per unit of measure material cost factor.

Another aspect provides a method of real-time statistical process control that includes associating indirect cost factors and direct cost factors with at least one process step. The direct cost factor includes at least one of a lower specification limit violation scrap cost factor, a lower specification limit violation rework cost factor, an upper specification limit violation scrap cost factor, and an upper specification limit violation rework cost factor. The method further includes receiving production variable data into memory and executing on a processor a first cross-correlation routine for cross-correlating at least one of the cost factors and the production variable data. The method further includes executing on a processor a second cross-correlation routine for cross-correlating a percentage of acceptable parts function and a probability density function of the production variable data. The method further includes dividing the first cross-correlation by the second cross-correlation to determine the average effective per-unit cost. The method may include determining a minimum average effective per-unit cost associated with a current data distribution. The method may include iteratively determining the minimum average effective per-unit cost using different standard deviations for the probability density function of the production variable data corresponding to a theoretical reduction in process variability. In some examples, the method includes determining an optimal mean and minimum average effective per-unit cost at one or more standard deviations. Moreover, the method may include presenting the iteratively determined minimum average effective per-unit costs.

The method may include executing a selection criteria on the determined average effective per-unit costs and identifying one of the determined average effective per-unit costs as corresponding to a recommended process mean associated with a current data distribution. The process variable data may allow monitoring of a quality of the at least one process step. When receiving multiple types of process variable data, a direct cost factor can be associated with each type of process variable data. In some examples, the average effective per-unit cost includes a ratio of an actual cost to make an acceptable part to a proportion of acceptable parts. The method may include electronically displaying a plot corresponding to the determined minimum average effective per-unit cost and/or determining an optimal process mean associated with the minimum average effective per-unit cost associated with a current data distribution. A process offset may be presented based at least in part on a difference between the optimal process mean and a current process mean associated with a current data distribution. The process offset can be associated with a cost savings of the process step.

Another aspect of the disclosure provides a cost inspection system for a process. The system includes a cost module, a data module, a cross-correlation module, and a cost module. The cost module receives a cost model associated with the at least one process step and provides a per-unit cost function for executing a process step. The cost module receives a cost model associated with the at least one process step and provides a percentage-of-acceptable-parts function for executing a process step. The data module receives production data corresponding to a measured quality metric of the executed process step and provides a probability density function for the received production data. The cross-correlation module cross-correlates the per-unit cost function with the probability density function of the production data to provide a first cross-correlation and cross-correlates the percentage-of-acceptable-parts function with the probability density function of the production data to provide a second cross-correlation. Lastly, the cost module executes on a computing processor and determines an average effective per-unit cost to produce a resultant of the at least one process step by dividing the first cross-correlation by the second cross-correlation.

In yet another aspect, a real-time statistical process control (SPC) system includes a function module that receives a cost model associated with at least one process step and provides a per-unit cost function associated with executing the at least one process step and a percentage-of acceptable-parts function associated with executing the at least one process step. The real-time SPC system includes a data module that receives production data corresponding to a measured quality metric of the executed process step and provides a probability density function for the received production data. A cross-correlation module cross-correlates the per-unit cost function with the probability density function of the production data to provide a first cross-correlation and cross-correlating the per-centage-of-acceptable-parts function with the probability density function of the production data to provide a second cross-correlation. A cost module, executing on a computing processor, determines an average effective per-unit cost to produce a resultant of the at least one process step by dividing the first cross-correlation (i.e., the cross-correlation of the cost function and the probability density function of the production data) by the second cross-correlation (i.e., the cross-correlation of the percentage of acceptable process resultants and the probability density function of the production data).

Implementations of the disclosure may include one or more of the following features. In some implementations, wherein the cost module displays on an electronic device a plot corresponding to the determined average effective per-unit cost and/or determines an optimal process mean associated with the plotted minimum average effective per-unit cost associated with a current data distribution. The cost module may present a process offset based at least in part on a difference between the optimal process mean and a current process mean associated with a current data distribution. The process offset can be associated with a cost savings of the at least one process step. In some examples, the cost module iteratively determines the minimum average effective per-unit cost using different standard deviations for the probability density function of the received data corresponding to a theoretical reduction in process variability. In some examples, an optimal mean and minimum average effective per-unit cost can be determined at one or more standard deviations. The cost module electronically may display the iteratively determined minimum average effective per-unit costs.

The cost function may include at least one of an indirect cost factor and direct cost factor associated with the at least one process step. The indirect cost factor can include a process cost factor. The direct cost factor comprising at least one of a lower specification limit violation scrap cost factor, a lower specification limit violation rework cost factor, an upper specification limit violation scrap cost factor, and an upper specification limit violation rework cost factor. Additional cost factors may include a lower specification limit violation scrap cost factor, a lower specification limit violation rework cost factor, an upper specification limit violation scrap cost factor, an upper specification limit violation rework cost factor, a maximum rework attempts cost factor for lower specification limit violations, a maximum rework attempts cost factor for upper specification limit violation, a lower dimensional limit for rework threshold cost factor, an upper dimensional limit for rework threshold cost factor, a cost of each rework attempt cost factor for lower specification limit violations a cost of each rework attempt cost factor for upper specification limit violations a percentage chance of rework success cost factor for lower specification limit violations, a percentage chance of rework success cost factor for upper specification limit violations, a percentage chance of rework failure cost factor for lower specification limit violations, a percentage chance of rework failure cost factor for upper specification limit violations, a percentage of lower specification limit violations allowed cost factor a percentage of upper specification limit violations allowed cost factor a disposal cost of a scrapped unit cost factor for lower specification limit violations, a disposal cost of a scrapped unit cost factor for upper specification limit violations, a per unit recovery value of a scrapped unit cost factor for lower specification limit violations, a per unit recovery value of a scrapped unit cost factor for upper specification limit violations, a per unit material value of a scrapped unit cost factor for lower specification limit violations, a per unit material value of a scrapped unit cost factor for upper specification limit violations, a per step process cost factor, and a per unit of measure material cost factor.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

When considering an improvement for a step in a manufacturing process, a statistical process control (SPC) practitioner may consider, at least in part, a statistical analysis that may include a current mean for each set of variable data used to monitor the quality of the step's output. SPC may be broadly broken down into three sets of activities: understanding a process; understanding causes of variation in the process; and eliminating or modifying sources that cause the variation.

Figure 1:
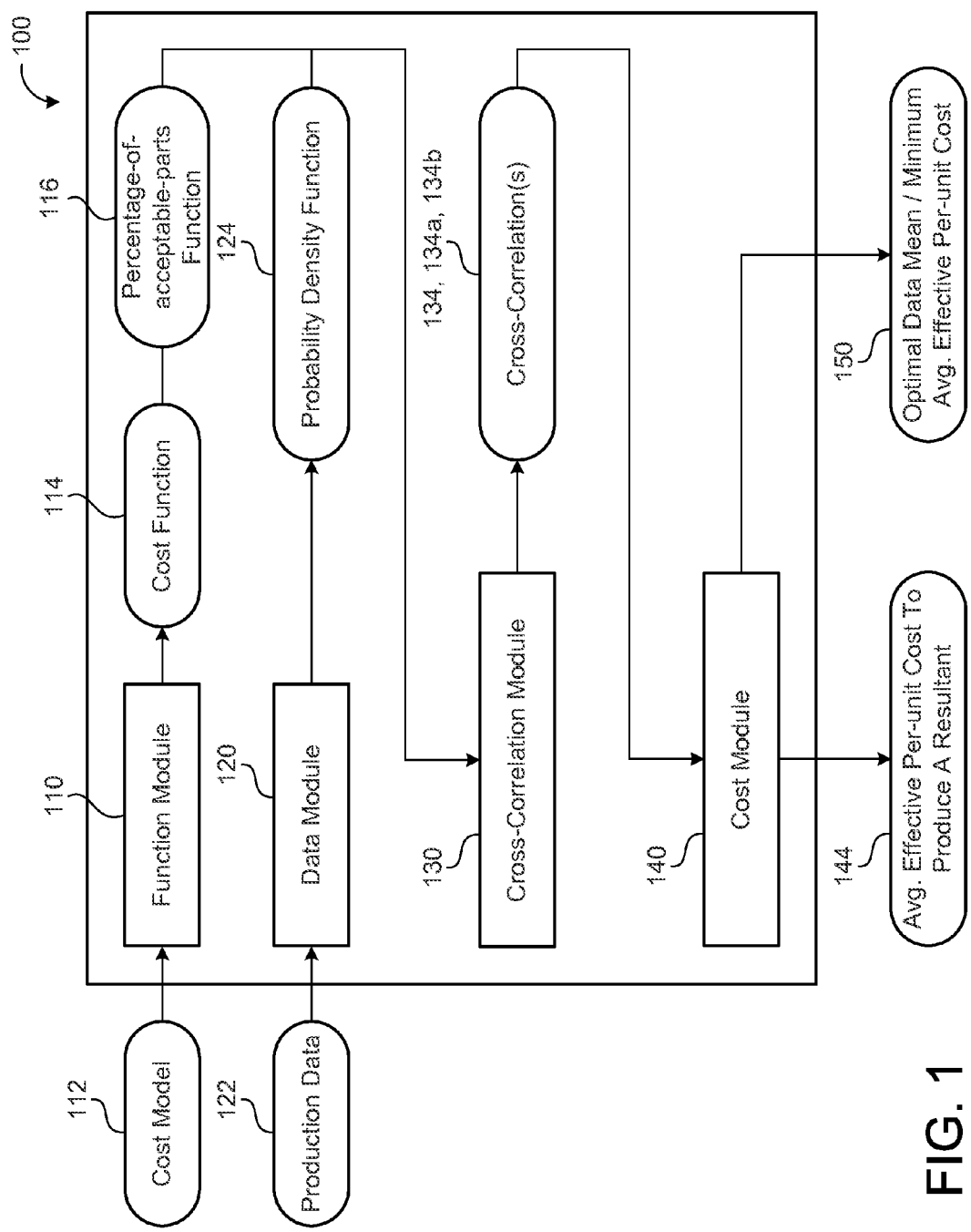
FIG. 1 is a schematic view of an exemplary real-time statistical process control (SPC) system.
Figure 2:
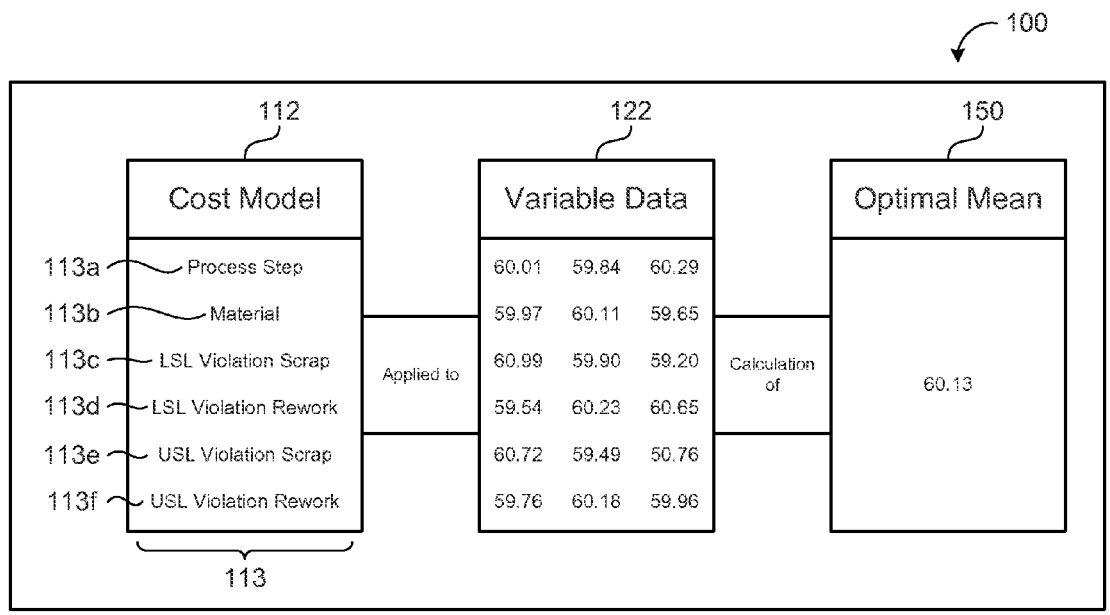
FIG. 2 is a schematic view of an exemplary real-time SPC system applying a cost model to a set of variable data to determine an optimal mean of the variable data.
Figure 3:
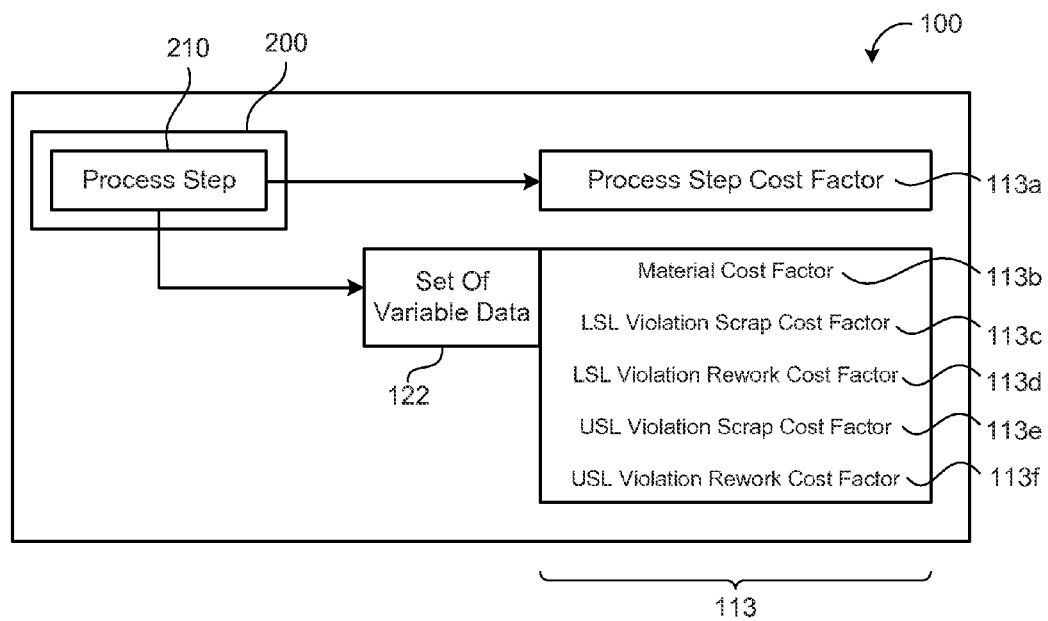
FIG. 3 is a schematic view of associating cost factors and variable data to a process step.

Referring to FIG. 1, in some implementations, a real-time statistical process control (SPC) system 100 (also referred to herein as a cost inspector) includes a function module 110 that receives a cost model 112 associated with at least one process step, and a data module 120. The function module 110 determines a cost function 114 (e.g., a per-unit cost function) and a percentage-of-acceptable-parts function 116 associated with executing the least one process step. The data module 120 receives production data 122 (also referred to as variable data) corresponding to a measured quality metric of the executed process step and determines a probability density function 124 for the received production data 122. A cross-correlation module 130 cross-correlates the cost function 114 with the probability density function 124 of the production data 122 to provide a cross-correlation 134 (a first cross-correlation 134a). In some examples, the cross-correlation module 130 cross-correlates the percentage-of-acceptable-parts function 116 with the probability density function 124 of the production data 122 to provide another cross-correlation 134 (a second cross-correlation 134b). In some implementations, a cost module 140, executing on a computing processor, determines an average effective per-unit cost 144 to produce a resultant of the at least one process step by dividing the first cross-correlation 134a of the cost function 114 and the probability density function 124 of the production data 122 by the second cross-correlation 134b of the percentage-of-acceptable-parts function 116 and the probability density function 124 of the production data 122.

Referring to FIGS. 2-4B, in some implementations, the SPC system 100 applies the cost model 112 to each set of received variable data 122 used to monitor the quality of a respective manufacturing output of a process step 210 of a process 200 (e.g., a manufacturing process) to determine an optimal mean 150 (e.g., via the cost module 140) for each set of variable data 122. The optimal mean 150 for a set of variable data 122 can be an average that represents an output of acceptable quality at the lowest cost. Recommended changes to the process 200, based in part on the calculated optimal mean 150, can be designed to shift a current mean for a set of variable data 122 to its optimal position. The cost model 113 may include user-supplied cost factors 113 which are applied to the variable data 122 to determine cost-related analytics that can be used to quantify how much a processed unit costs and whether that unit can be processed more cheaply. The user-supplied cost factors 113 may include a process step cost 113a, a material cost 113b, a lower specification limits (LSL) violation scrap cost 113c, a lower specification limits (LSL) violation rework cost 113d, an upper specification limits (USL) violation scrap cost 113e, and/or an upper specification limits (USL) violation rework cost 113f.

The process step cost factor 113a can be used to calculate costs which do not fluctuate during a process step 210. These costs may be indirect or fully loaded costs and can include such costs as building costs, machine costs and personnel costs. In a filling process step 210, for example, running the filling machine costs a set amount regardless of whether containers exit the process step under-filled, acceptably-filled, or over-filled. Unlike the other cost factors, this factor is independent of the number of sets of variable data 122 associated with a process step 210. In other words, a single process step cost can be used for each set of variable data 122 used to monitor a particular process step 210. Regardless of how many types of measurements are taken for a process step 210, the indirect costs for that step remains unchanged. In some implementations, the process step cost factor 113a is a per part factor that reflects the indirect costs incurred by one part passing through the process step 210.

The material cost factor 113b can be used to calculate the cost of material consumed during a process step 210. The material cost can be a direct cost. Each set of variable data 122 used to monitor a process step 210 can have its own material cost factor 113b. The material cost factor 113b may be a per unit of measure factor, meaning the value reflects the per unit of measure cost for the material consumed. For example, the material cost factor 113b of filling a container with 250 ml of material may be the cost for one milliliter of the material. For process steps 210 monitored by multiple sets of variable data, only one material cost factor 113b may be considered for a process step that consumes only one type of material or multiple material cost factors 113b for multiple types of corresponding material.

The lower specification limit violation scrap cost factor 113c can be used to calculate scrap costs related to violations of a lower specification limit (LSL). Since each set of variable data 122 used to monitor a process step 210 can have an LSL, each set of variable data 122 can have a corresponding lower specification limit violation scrap cost factor 113c. In some implementations, the lower specification limit violation scrap cost factor 113c includes two components: 1) a cost to scrap a part and 2) a percentage of parts which are allowed to violate the LSL without being scrapped. In some examples, the SPC system 100 determines the cost to scrap a part using the material cost factor 113b supplied for the respective set of variable data 122 and the process step cost factor 113a supplied for the process step 210 monitored by the set of variable 122.

The lower specification limit violation rework cost factor 113d can be used to calculate rework costs related to violations of a lower specification limit (LSL). Since each set of variable data 122 used to monitor a process step 210 can have its own lower specification limit, each set of variable data 122 can have its own lower specification limit violation rework cost factor 113d. Consequently, the lower specification limit violation rework cost factor 113d can be a per variable factor that reflects the cost to rework an aspect of a part measured by the set of variable data 122 for which an LSL violation was recorded.

The upper specification limit violation scrap cost factor 113e can be used to calculate rework costs related to violations of an upper specification limits (USL). Each set of variable data 122 can have a corresponding USL violation scrap cost factor 113e. In some implementations, the USL violation scrap cost factor 113e includes two components: 1) the cost to scrap a part and 2) a percentage of parts which are allowed to violate the USL without being scrapped. In some examples, the SPC system 100 determines the cost to scrap a part using the material cost factor 113b supplied for the respective set of variable data 122 and the process step cost factor 113a supplied for the process step 210 monitored by the set of variable 122.

The upper specification limit violation rework cost factor 113f can be used to calculate rework costs related to violations of an upper specification limit (USL). Since each set of variable data 122 used to monitor a process step 210 can have its own USL, each set of variable data 122 can have its own USL violation rework cost factor 113f. Consequently, the USL violation rework cost factor 113f can be a per variable factor that reflects the cost to rework an aspect of a part measured by the set of variable data 122 for which a USL violation was recorded.

The cost model 112 may include one or more process steps 210 with one or more associated cost factors 113 for each process step 210. In the example shown in FIG. 2, the cost model 112 includes a single process step 210, such as a filling step, with associated cost factors 113 measured by one set of variable data 122, such as by net weight for the filling step. In the example shown in FIG. 3, the cost model 112 includes cost factors 113 for a single process step 210 measured by multiple sets of variable data 122. For example, a drilling process step can be measured by a hole location and a hole diameter. In this example, the cost model 112 includes one process step cost factor 113a and one set of the applicable optional cost factors 113 for each set of variable data 122. FIG. 4 illustrates a cost model 112 for multiple process steps 210 within a manufacturing process (e.g., a bottling process with a bottle preforming process step followed by a bottle injection molding process step followed by a bottle filling process step). The cost model 112 for a multi-step process may include a set of cost factors 113 for each process step 210, where each set of cost factors 113 includes one process step cost factor 113a and one or more other cost factors 113b-113f for each set of variable data 122 associated with the respective process step 210.

While cost models 112 consisting of a single process step 210 have value, cost models 112 comprising multiple process steps 210 account for the accumulative costs of a process 200. In isolation, the costs of a later process step 210 in a process may be thought to be less than the costs of an earlier step 210. However, a true cost of a later process step 210 may be the sum of the costs unique to that process step 210 and the costs of each earlier process step 210 in the process 200. For example, the true cost of scrapping a part at the end of a process 200 can be the time and materials of every process step 210 invested in the part. In a multi-step cost model 112, the SPC system 100 may carry earlier costs forward and appropriately incorporate them into the calculation of later optimal means.

In some implementations, the cost model 112 includes one process step cost factor 113a for each process step 210 and, for each set of variable data 122 associated with each respective process step 210, one or more discretionary cost factors 113 (e.g., a material cost 113b, a lower specification limits (LSL) violation scrap cost 113c, a lower specification limits (LSL) violation rework cost 113d, an upper specification limits (USL) violation scrap cost 113e, and/or an upper specification limits (USL) violation rework cost 113f) relevant to that set of variable data 122.

In some examples, there are ten cost factor arrangements of the discretionary cost factors 113b-113f, where every set of variable data 122 represented in the cost model 112 employs one of the cost factor arrangements. Table 1 illustrates the cost factor arrangements.

Exemplary machining process steps are suggested, but are not limited to those listed.

TABLE 1

| | Cost Factor Arrangements | | | | | |
|---|---|---|---|---|---|---|
| | | LSL Violation Scrap | LSL Violation Rework | USL Violation Scrap | USL Violation Rework | |
| | Material | | | | | Exemplary Process Steps |
| 1 | | X | | X | | Machining |

TABLE 1-continued

Cost Factor Arrangements

| Material | LSL Violation Scrap | LSL Violation Rework | USL Violation Scrap | USL Violation Rework | Exemplary Process Steps |
|---|---|---|---|---|---|
| 2 |  | X |  | X | Machining (with no opportunity for rework) (with opportunity for rework) |
| 3 |  | X | X |  | Drilling, boring |
| 4 |  | X |  | X | Forging, heat treating |
| 5 | X | X |  |  | Filling (with stated minimum) |
| 6 | X | X | X | X | Extrusion, injection molding, etching (with no opportunity for rework) |
| 7 | X | X |  |  | Etching (with opportunity for rework) |
| 8 | X |  | X |  | Joining (with opportunity for rework) |
| 9 | X |  | X | X | Plating or chemical deposition (with no opportunity for rework) |
| 10 | X |  | X | X | Plating or chemical deposition (with no opportunity for rework) |

Figure 4A:
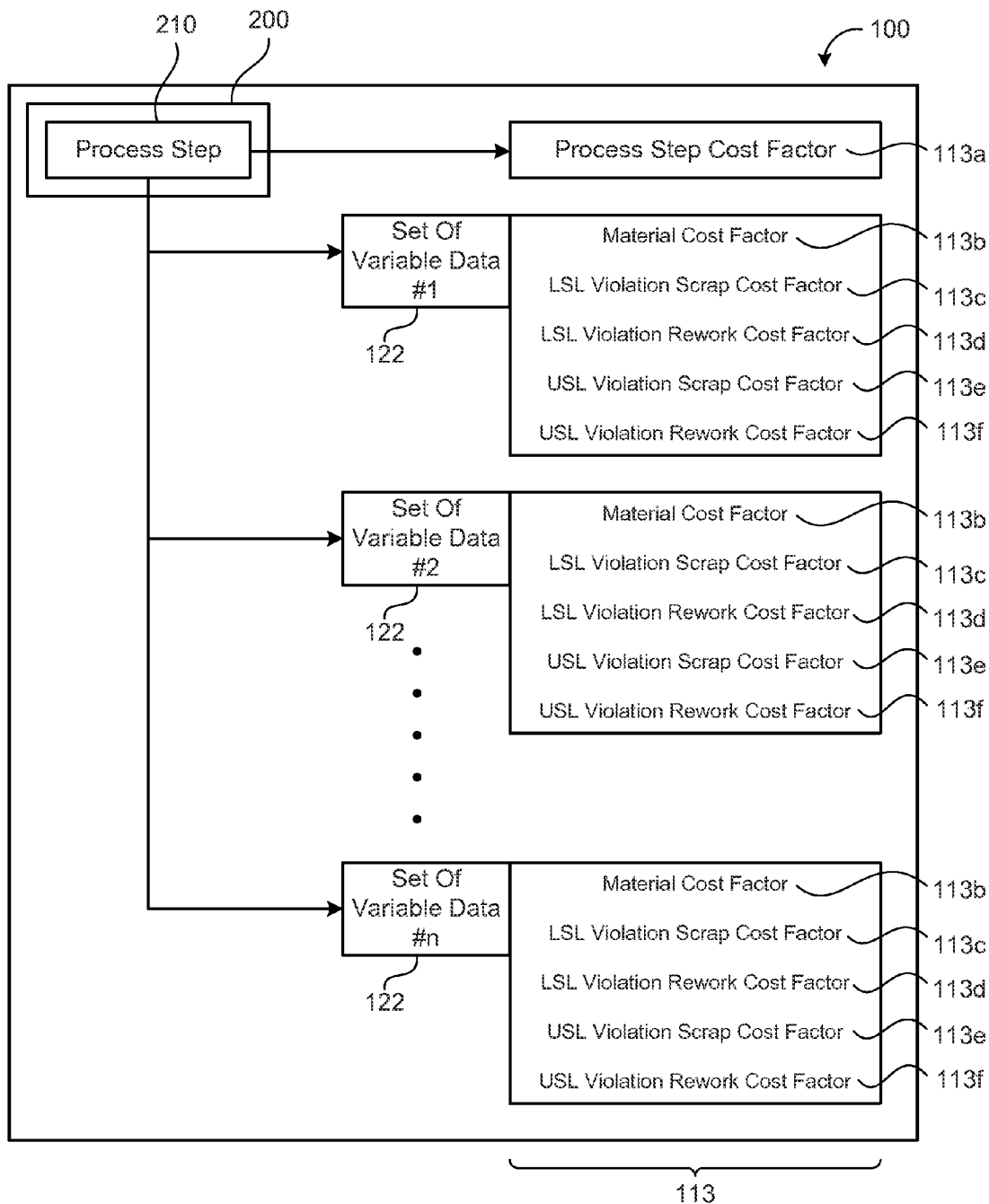
FIGS. 4A and 4B are schematic views of associating cost factors and variable data to multiple process steps.
Figure 4B:
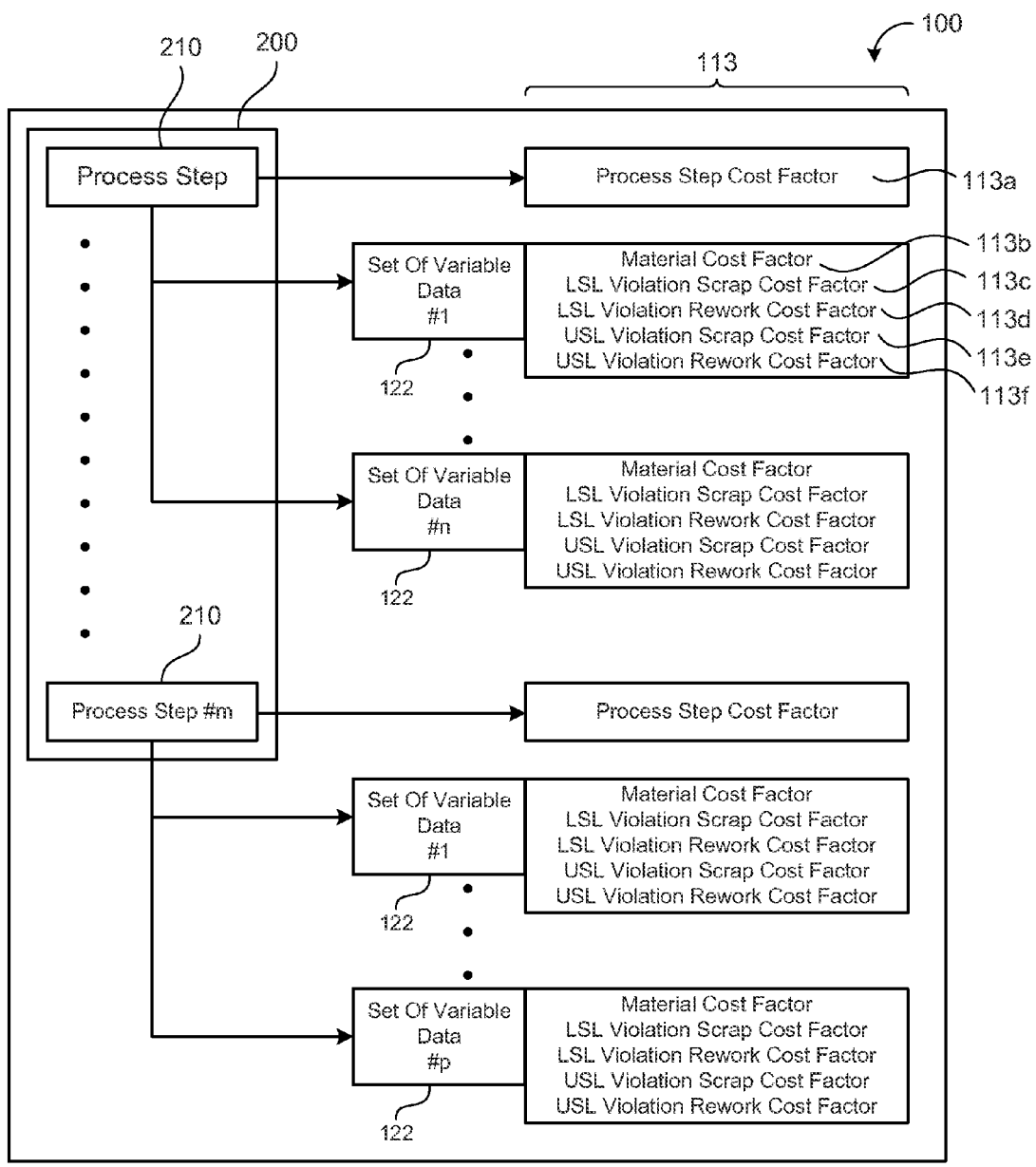
Figure 4C:
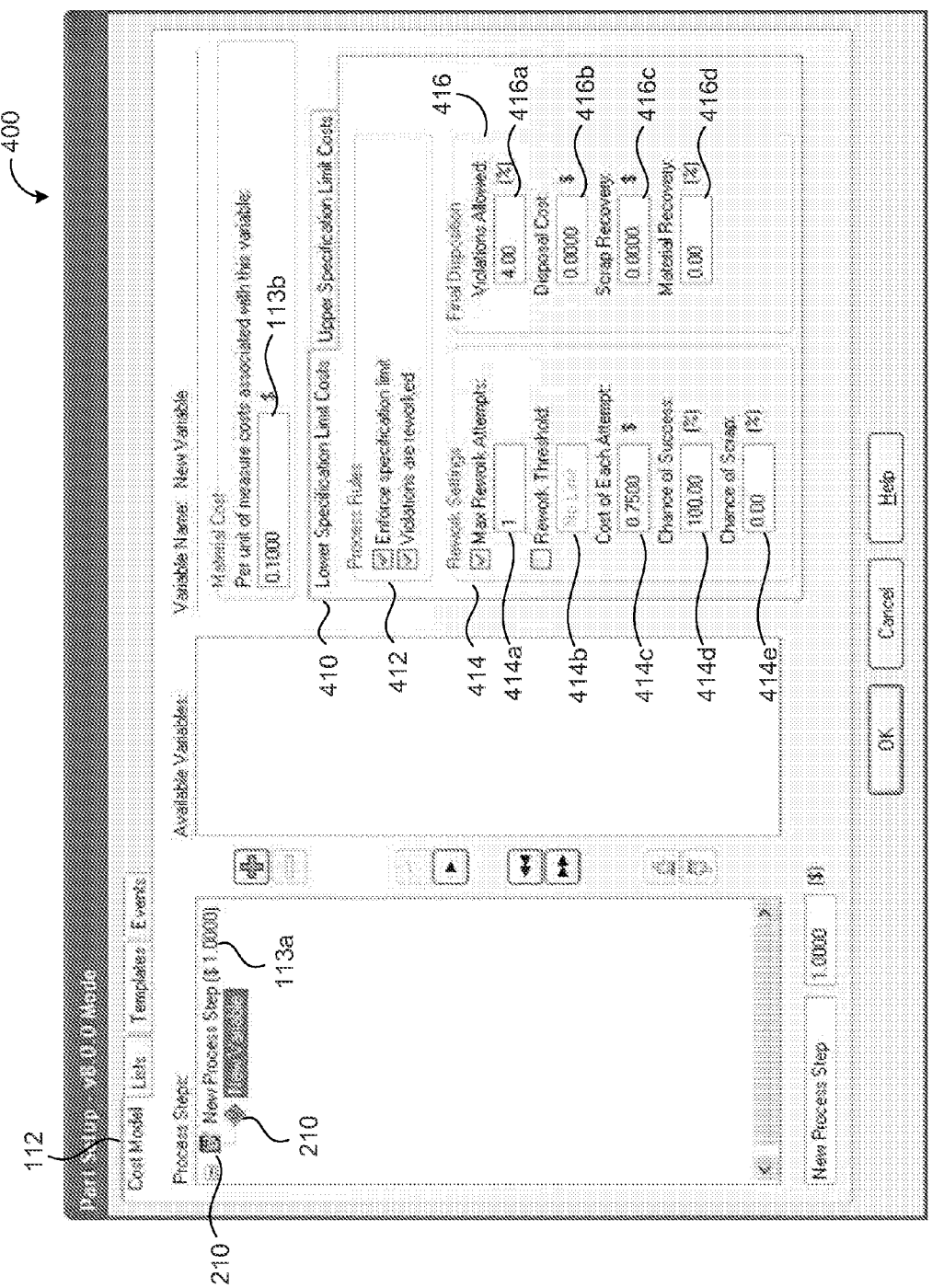
FIGS. 4C and 4D illustrate an exemplary cost model user interface that allows a user to create a cost model and define one or more process steps.
Figure 4D:
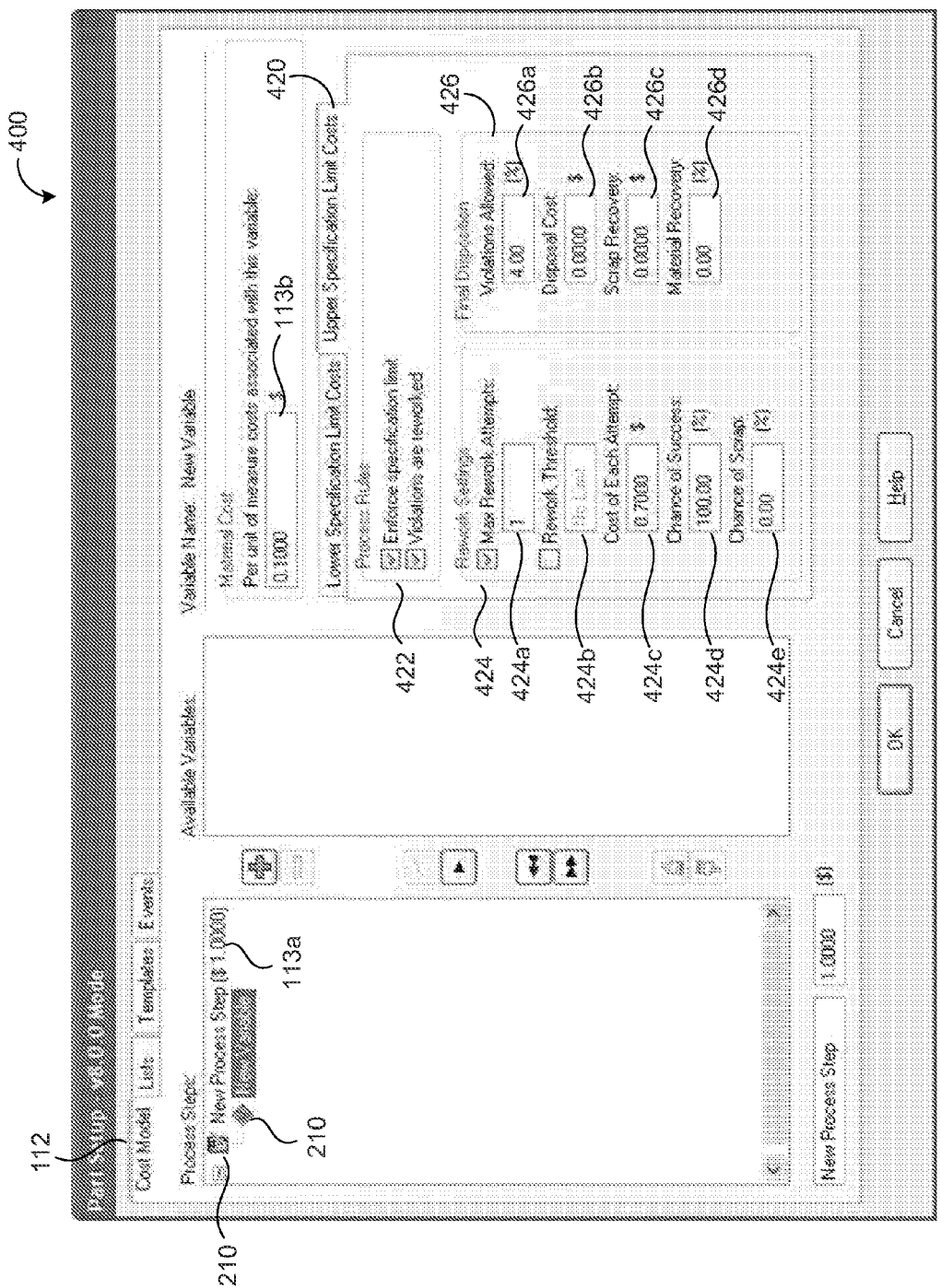

FIGS. 4C and 4D illustrate an exemplary cost model user interface 400 that allows a user to create a cost model 112 and define one or more process steps 210 by assigning one or more cost factors 113 to each process step 210. In the example shown, the process step 210 has lower specification limits (LSL) cost factors 410 and upper specification limits (USL) cost factors 420 available. The LSL cost factors 410 may include process rules 412, such as whether to enforce a specification limit and/or whether violations are reworked. The LSL cost factors 410 may include rework settings 414, such as a maximum rework attempts 414a, a rework threshold 414b, a cost of each attempt 410c, a chance of success 414d, and/or a chance of scrap 414e. The LSL cost factors 410 may include final disposition settings 416, such as a percent violations allowed 416a, a disposal cost 416b, a scrap recovery cost 416c, and/or a material recovery cost 416d. Similarly, the USL cost factors 420 may include process rules 422, such as whether to enforce a specification limit and/or whether violations are reworked. The USL cost factors 420 may include rework settings 424, such as a maximum rework attempts 424a, a rework threshold 424b, a cost of each attempt 420c, a chance of success 424d, and/or a chance of scrap 424e. The USL cost factors 420 may include final disposition settings 426, such as a percent violations allowed 426a, a disposal cost 426b, a scrap recovery cost 426c, and/or a material recovery cost 426d. Other cost factors in various arrangements are possible as well.

Figure 5:
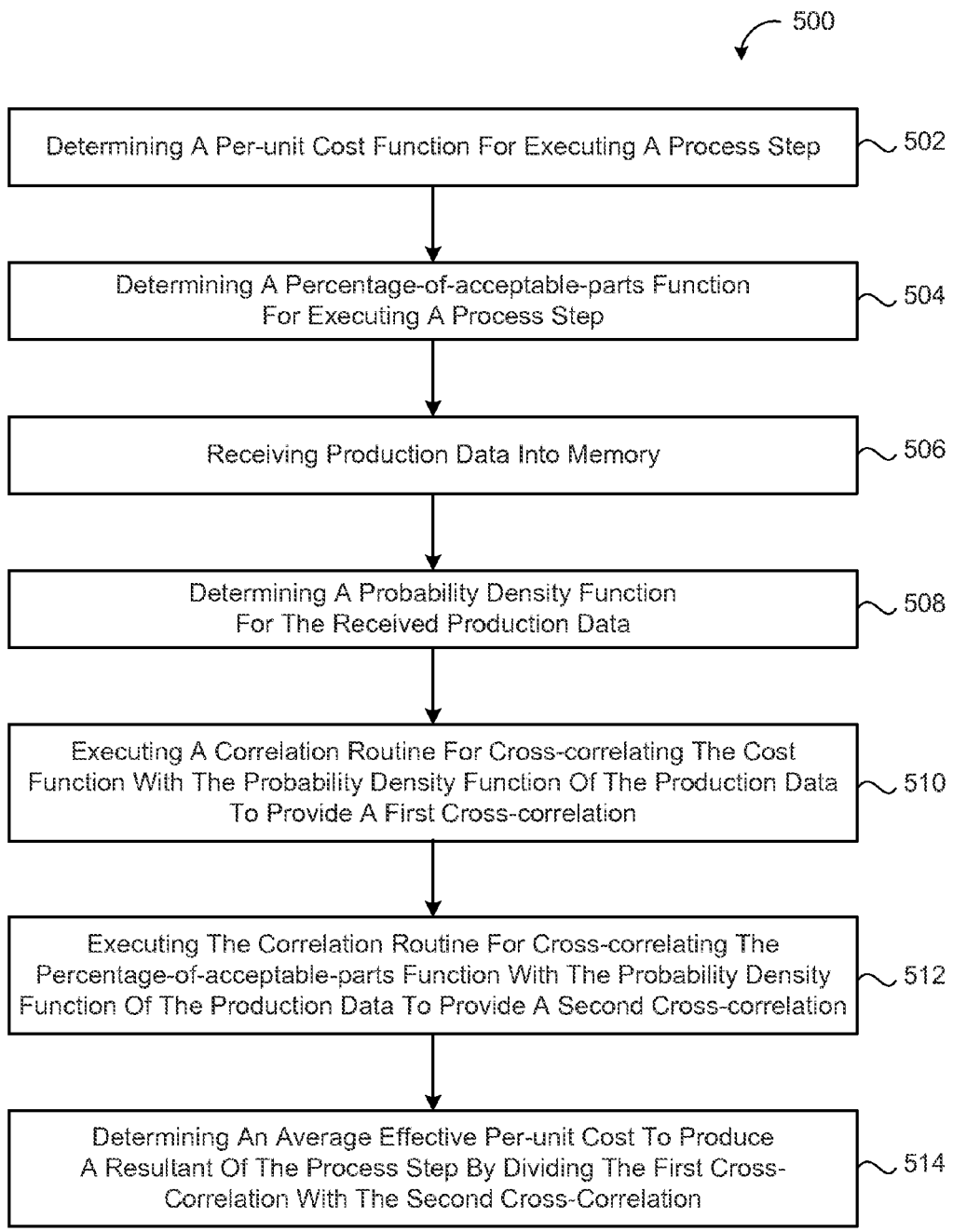
FIG. 5 provides an exemplary arrangement of operations for a method of real-time statistical process control.

FIG. 5 provides an exemplary arrangement 500 of operations executable on a computer process for a method of real-time statistical process control. The operations include determining 502 a per-unit cost function 114 for executing a process step 210, determining 504 a percentage-of-acceptable-parts function 116 for executing a process step 210, and receiving 506 production data 122 into memory. The production data 122 corresponds to a measured quality metric of the executed process step 210. The operations further include determining 508 a probability density function 124 for the received production data 122, executing 510 on a processor a correlation routine (e.g., using the cross-correlation module 130) for cross-correlating the per-unit cost function 114 with the probability density function 124 of the production data 122 to provide a first cross-correlation 134a, executing 512 on the processor the correlation routine for cross-correlating the percentage-of-acceptable-parts function 116 with the probability density function 124 of the production data 122 to provide a second cross-correlation 134b, and determining 514 an average effective per-unit cost 144 to produce a resultant of the process step 210 by dividing the first cross-correlation 134a by the second cross-correlation 134b.

In some implementations, the operations include displaying on an electronic device a plot corresponding to the determined average effective per-unit cost 144 and/or determining an optimal process mean associated with the plotted minimum average effective per-unit cost 150 associated with the data distribution 124. The operations may include presenting a process offset based at least in part on a difference between the optimal process mean 150 and a current process mean associated with the data distribution 124. The process offset can be associated with a cost savings of the process step 210. The minimum average effective per-unit cost 150 can be determined iteratively using different standard deviations for the probability density function 124 of the received data 122 that corresponds to a theoretical reduction in process variability. The iteratively determined minimum average effective per-unit costs 150 can be presented electronically in a graphical format.

Figure 6:
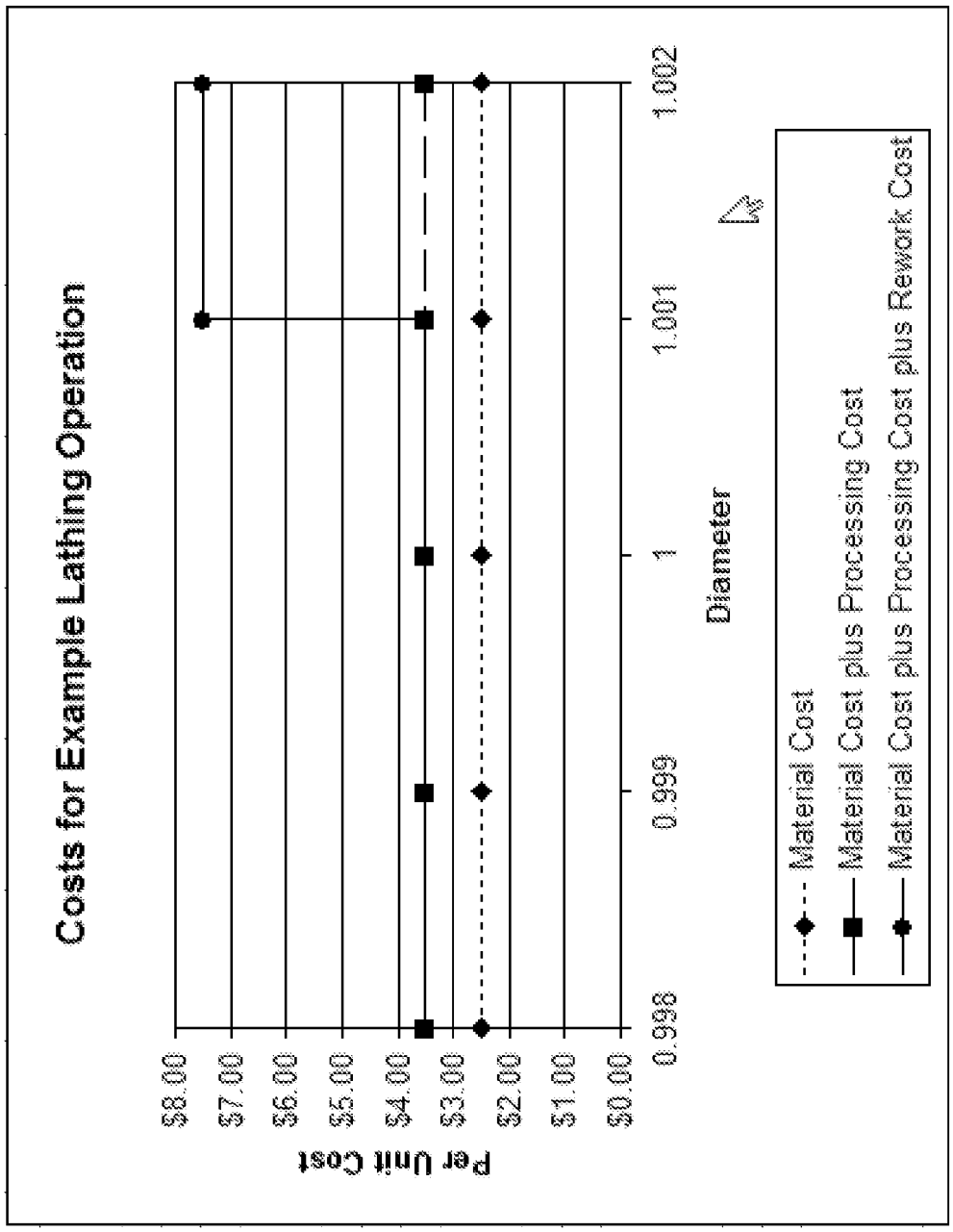
FIG. 6 provides a graph of cost with respect to a quality metric of an exemplary lathing operation.

Referring to FIG. 6, in the following lathing operation example, where incoming blanks are machined to a relatively smaller diameter, the cost of an incoming blank is $2.50 and the cost to pass a lathe over the blank one time is $1.00. The upper specification limit (USL) for a diameter of the lathed blank is 1.001 inches. The lower specification limit (LSL) for the diameter of the lathed blank is 0.999 inches. If, after one pass by the lathe, the blank has a diameter in excess of the USL, the blank is reworked in a secondary, manual process at a cost of $4.00. One pass through this secondary process results in a blank with a diameter that falls between the USL and LSL. If, after one pass by the lathe, the blank is found to have a diameter less than the LSL, the blank is scrapped. In this example, after one pass by the lathe, 60% of the blanks violate neither the USL nor LSL, 30% violate the USL, and 10% violate the LSL. If there were no specification limits to contend with, every finished blank would cost $3.50 ($2.50 for the blank and $1.00 for the lathing). However, the USL of 1.001 inches forces some of the lathed blanks to be reworked resulting in a total per reworked unit cost of $7.50 ($2.50 for the blank, $1.00 for lathing and $4.00 for rework). Just as the USL forces some blanks to be reworked, the LSL of 0.999 inches forces some of the lathed blanks to be scrapped. Determining the cost to assign to scrapped (i.e. bad) parts, however, is not as straightforward as determining rework costs.

Rather than determining the cost of a bad part directly, the SPC system 100 may determine the cost of a good part by distributing the total cost of all bad parts over the total cost of all good parts. In the example, out of a hundred lathed parts, 10 will be bad, 60 will be good after one pass by the lathe, and another 30 will be good after the manual secondary process. Since the 10 bad parts have the same initial processing costs ($1.00) and material costs ($2.50) as a good part, each can be said to cost $3.50, resulting in a total of $35.00. Distributing the cost of the 10 bad parts over the cost of the 90 good parts results in each good part costing $3.50 plus 1/90*$35.00, which equals $3.89. The distributed cost can be referred to as an effective cost of a good part $EC_{good}$.

$$EC_{good} = C_{good}/P_{good} \tag{1}$$

$EC_{good}$ is the effective cost of one good part (accounting for scrap losses), $C_{good}$ is the actual cost of one good part (time and materials only), and $P_{good}$ is the proportion of good parts made (in the above example, 0.90). The proportion of good parts can be estimated as the percentage of all measurements in a distribution below a specific value (such as a lower specification limit), as given by the cumulative density function of the distribution. The cumulative density function of any distribution is defined as:

$$cdf(z) = \int_{-\infty}^{z} pdf(x)dx \tag{2}$$

where pdf(x) is the probability density function of interest. Integrating the probability density function results in:

$$P_{good} = 1 - cdf(LSL) \tag{3}$$

and $$EC_{good} = C_{good}/P_{good} = C_{good}/(1 - cdf(LSL)) \tag{4}$$

Equation 3 applies specifically to the lathing example, an operation where scrapping occurs at the lower specification limit and rework occurs at the upper specification limit.

The per unit rework cost can be determined by calculating a weighted average manufacturing cost. Instead of ignoring the rework costs, as was done for the preceding calculation, scrap costs will be temporarily ignored for this calculation. As a result, if 70% of the lathed blanks are at or below the USL, then these lathed blanks each have a per unit cost of $3.50, and the remaining 30% of the lathed blanks have a per unit cost of $7.50. The weighted average cost is:

$$\overline{C}_{good} = 0.70*\$3.50 + 0.30*\$7.50 = \$4.70 \tag{5}$$

The general form of this calculation can be expressed as the integral of the value function (the per piece cost as illustrated in FIG. 5) multiplied by the weighting function (the probability density function of the measurements) over all possible measurement values.

$$\overline{C}_{good} = \int_{-\infty}^{\infty} C_{good}(x) \cdot pdf(x)dx \tag{6}$$

The formula for the average, effective cost of one good part becomes the following, where the denominator is the specific form of $P_{good}$ derived in this example:

$$\overline{EC}_{good} = \frac{\overline{C}_{good}}{P_{good}} = \frac{\int_{-\infty}^{\infty} C_{good}(x) \cdot pdf(x)dx}{1 - cdf(LSL)} \tag{7}$$

For the lathing example, (i.e., 10% violating the LSL, 30% violating the USL and 60% violation neither the LSL nor USL), the average, effective per piece cost is $5.22.

In addition to determining the average, effective per piece cost of a part produced by a particular process 200, the SPC system 100 can, in some implementations, project how a part can be processed more cheaply. The SPC system 100 calculates the average, effective per piece cost of a part based on the current mean of the corresponding variable data 122. For calculating the optimal mean, the SPC system 100 considers an additional term, which introduces a shift of the process mean from its current position to an optimal position. This is represented mathematically as:

$$\overline{EC}_{good}(\delta) = \frac{\overline{C}_{good}}{P_{good}} = \frac{\int_{-\infty}^{\infty} C_{good}(x) \cdot pdf(x+\delta)dx}{1 - cdf(LSL - \delta)} \tag{8}$$

The numerator of the function is a cross-correlation of the cost to manufacture a good part and the probability density function. The function's minimum can be determined by solving the following equation for δ:

$$\frac{d}{d\delta}\overline{EC}_{good}(\delta) = 0 \tag{9}$$

Once the minimum, $\delta_{opt}$, is found, the optimal mean, $\mu_{opt}$, (i.e., the process mean having the lowest average, effective per piece cost) can be given by:

$$\mu_{opt} = \mu_0 + \delta_{opt} \tag{10}$$

where, $\mu_0$ is the current process mean as determined from the variable data 122 (i.e., production data) under analysis, $\delta_{opt}$ is the solution to equation 9. (Note that the solution may be constrained such that $LSL \leq \mu_0 + \delta_{opt} \leq USL$.) With the optimal mean located, the minimum cost (the lowest average, effective per piece cost) can be given by:

$$C_{opt} = \overline{EC}_{good}(\delta_{opt}) \tag{11}$$

The average, effective per piece cost can be evaluated at $\delta_{opt}$.

In some implementations, the minimum, average, effective per unit manufacturing cost is given by:

$$\frac{d}{d\delta}\overline{EC}_{good}(\mu_0 + \delta) = 0 \tag{12}$$

The value of which δ satisfies the expression may be the value at which $\overline{EC}_{good}(\mu+\delta)$ reaches its minimum value. $\overline{EC}_{good}(\cdot)$ is the average per unit manufacturing cost at any process set point and can be defined as:

$$\overline{EC}_{good}(\mu_0 + \delta) = \frac{R_{xy}(\delta)}{P_{good}(\delta)} \quad (13)$$

where, $\mu_0$ is the current process mean as determined from the variable data 122 (i.e., production data), $\delta$ is any real number such that $LSL \leq (\mu_0 + \delta) \leq USL$ (e.g., to constrain the recommended process set point to lay between the specification limits.)

$R_{xy}(\delta)$ is the cross-correlation between two real-valued functions and may be defined as:

$$R_{xy}(\delta) = \int_{-\infty}^{\infty} C_{good}(\zeta + \delta) \cdot pdf(\zeta) d\zeta \quad (14)$$

where, $C_{good}(\cdot)$ is the per unit manufacturing cost (i.e., not the average per unit manufacturing cost) at a given set point, $pdf(\cdot)$ is the probability density function (e.g., one of twelve Pearson distributions) that best fits the variable data 122 analyzed.

$P_{good}(\delta)$ is the proportion of good parts made when running at a process set point of $\mu_0 + \delta$ and is given by:

$$P_{good}(\delta) = 1 - \text{ScrapTail}_L(\delta) - \text{ScrapTail}_U(\delta) \quad (15)$$

where,

Allowance$_U$ is the percentage of parts which violate the USL that are allowed to escape detection without consequence.

Allowance$_L$ is the percentage of parts which violate the LSL that are allowed to escape detection without consequence.

$$\text{ScrapTail}_L(\delta) = \begin{cases} cdf(LSL - \delta) - \text{Allowance}_L (\text{if\_scrapping}) \\ 0\_(\text{otherwise}) \end{cases} \quad (16)$$

$$\text{ScrapTail}_U(\delta) = \begin{cases} cdf(USL - \delta) - \text{Allowance}_U (\text{if\_scrapping}) \\ 0\_(\text{otherwise}) \end{cases} \quad (17)$$

$$cdf(z) = \int_{-\infty}^{z} pdf(x) dx \quad (18)$$

$pdf(x)$ is the probability density function (e.g., one of twelve Pearson distributions) that best fits the variable data 122 analyzed.

$$C_{good}(\mu) = \text{ProcessStepCost} + \text{LowerReworkCost}(\mu) + \text{UpperReworkCost}(\mu) \quad (19)$$

where, ProcessStepCost is a user-specified, constant, manufacturing cost associated with the respective process step 210.

$$\text{LowerReworkCost}(\mu) = C_{ReworkAttempt_L} \cdot \mu(LSL - \mu) \quad (20)$$

$$\text{UpperReworkCost}(\mu) = C_{ReworkAttempt_U} \cdot \mu(\mu - USL) \quad (21)$$

$C_{ReworkAttempt_L}$ is a user-specified, constant cost associated with reworking one unit that violates the lower specification limit. $C_{ReworkAttempt_U}$ is a user-specified, constant cost associated with reworking one unit that violates the upper specification limit. LSL is a user-specified, lower specification limit of the variable data 122 (e.g., production data) being analyzed. USL is a user-specified, upper specification limit of the variable data 122 (e.g., production data) being analyzed. $\mu(\cdot)$ is a standard unit step function.

In some implementations, the SPC system 100 executes a cost-benefit analysis for reducing process variability. Qualitatively, manufacturing processes have some amount of piece-to-piece variation. An equipment upgrade may engender a significant reduction in such variation. Equipment upgrades, however, come at a cost and this immediately raises the question of return. The SPC system 100 may provide predictive analyses to determine a return-on-investment for equipment upgrades (e.g., to reduce process variability). After determining the optimal mean and minimum average cost values for the current process 200, the optimal mean and minimum average cost values can be recalculated using a modified distribution. The probability density function that was originally fit to the production data can be adjusted to have a smaller standard deviation. In some examples, the SPC system 100 uses 90% of the original standard deviation, then 80%, then 70%, and so on, all the way down to a standard deviation of 0. (With a standard deviation of zero, the distribution collapses into a Dirac delta function—a uni-valued probability density function with unity area.)

While it is theoretically possible to express $C_{opt}$ as a function of standard deviation, the resulting function may only be evaluated for a few of the possible probability density functions. As a result, $C_{opt}$ may be evaluated numerically at discrete values of $\sigma$ and then plotted for analysis.

Figure 7A:
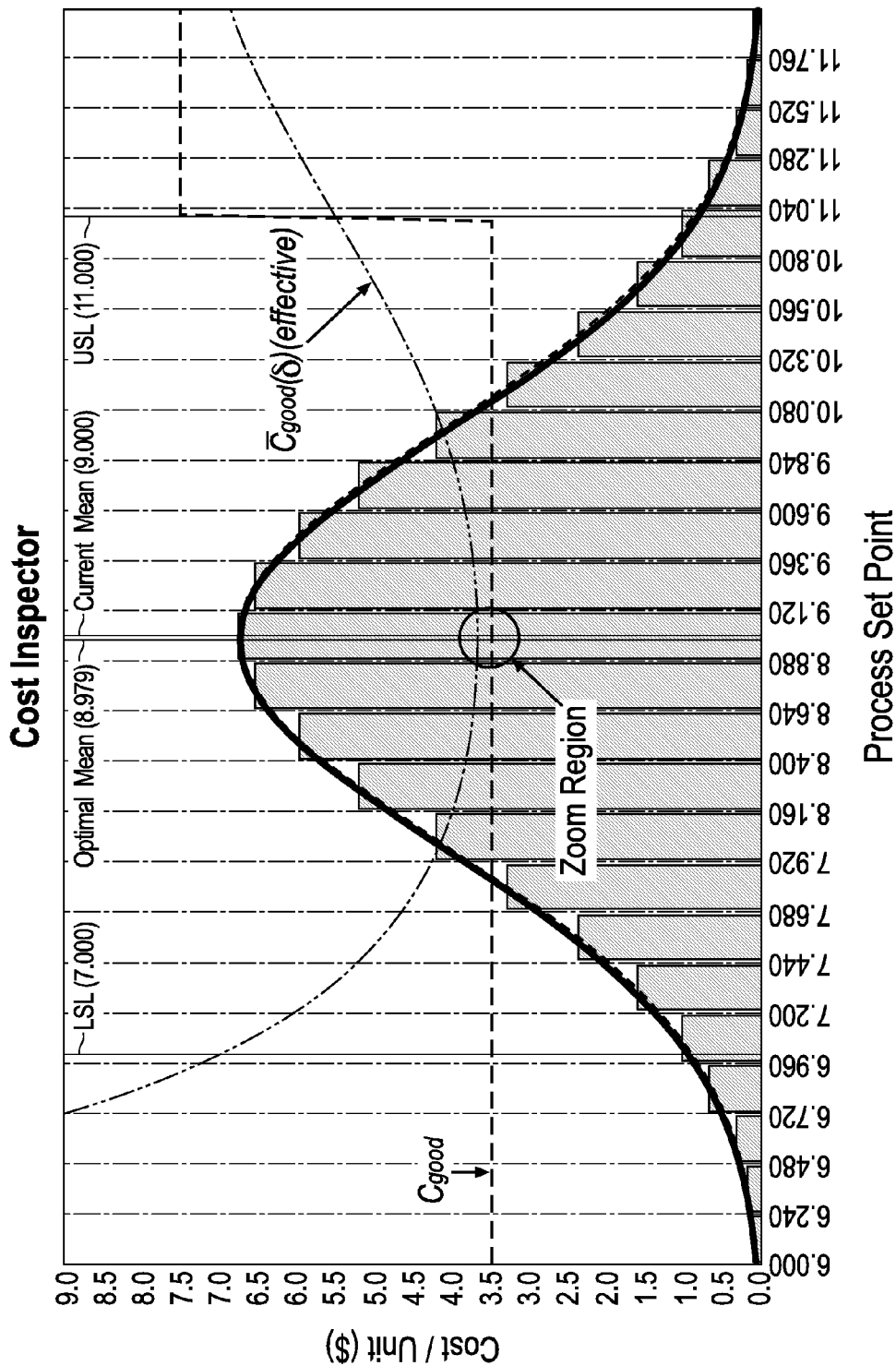
FIG. 7A graphically illustrates an exemplary determined cost per unit versus process set point of a process.
Figure 7B:
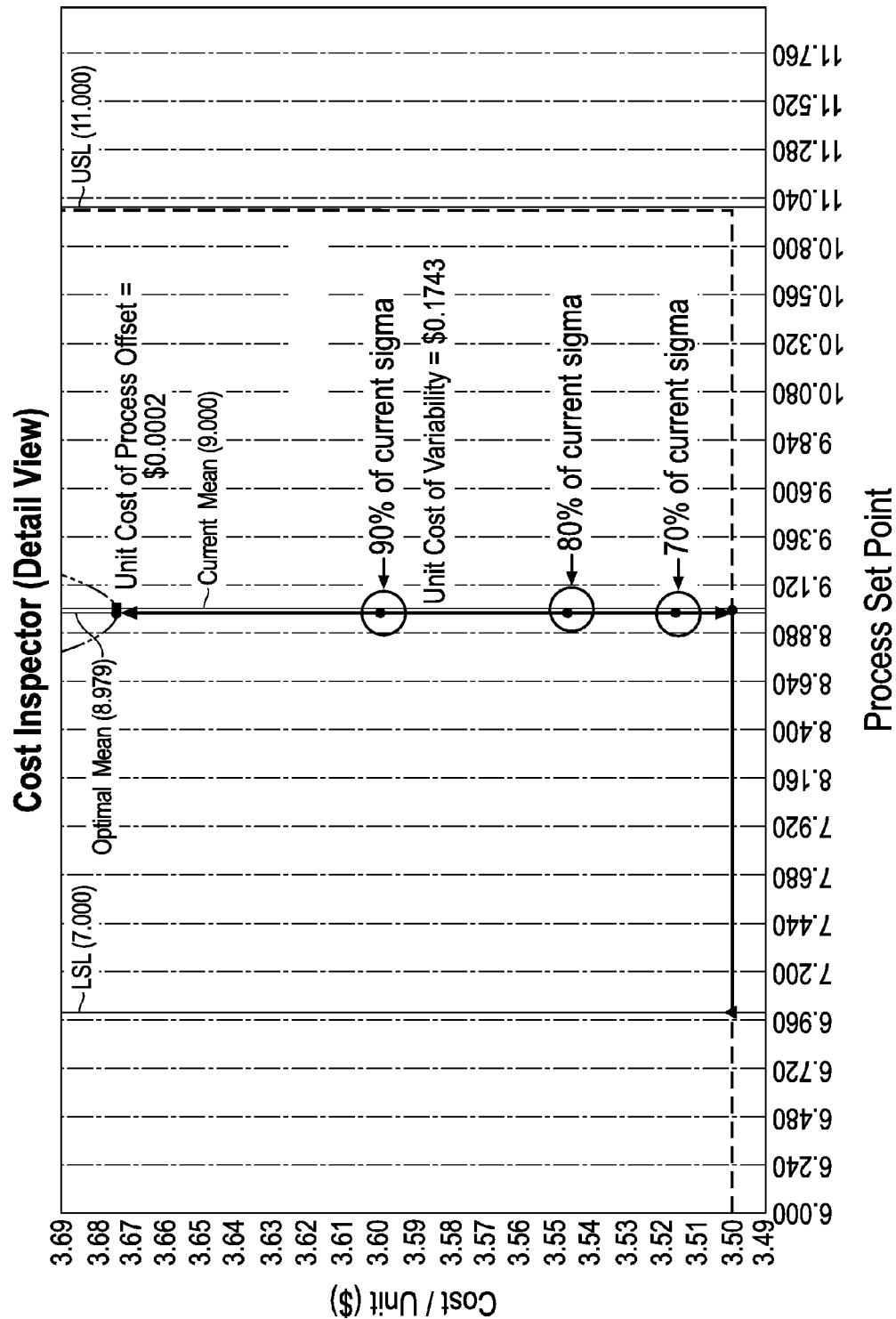
FIG. 7B provides a detail view of FIG. 7A.

FIG. 7A graphically illustrates a determined cost per unit versus process set point of a process 200. In the example shown, the current process mean, $\mu_0$, is 9.000 and the optimal process mean, $\mu_{opt}$, has been calculated to be 8.979. The graph provides a histogram of the variable data 122 analyzed and provides plots of $C_{good}$, $\overline{EC}_{good}(\delta)$, and pdf(x) (which is the fitted probability density function). FIG. 7B provides a detail view of FIG. 7A. The bottom horizontal line in this detail view represents the $3.50 unit cost. The cost of process offset point near the top of the chart represents this cost plus the cost of variability at 100% of the current process sigma $\sigma$. Reducing the exemplary process 200 by 10% results in cutting the loss due to variability almost in half and reducing the process sigma $\sigma$ by 30% results in the near elimination of all loss due to process variability.

The following process variability sensitivity (PVS) ratio evaluates the percent reduction in average, effective per piece cost that can be expected by decreasing the process sigma $\sigma$ by 10%:

$$PVS = \frac{C_{opt} - C_{opt-90\%}}{C_{opt}} \quad (22)$$

In the lathing example, PVS=2.033. By reducing the process sigma $\sigma$ by 10%, the average, effective per piece cost decreases by 2.033% (from $3.6743/unit to $3.5996/unit), resulting in a savings of 7.47 cents/unit.

While the graph of a Taguchi Loss curve may look somewhat like a SPC system curve, the calculations involved are fundamentally different. The SPC system 100 makes no assumptions about the cost of scrap, nor the distribution of the measurements being analyzed. The Taguchi Loss method, on the other hand, begins with the assumption that the lowest per piece cost occurs at the specified target or nominal value. It then assumes that the cost function is parabolic; that is, it assumes the per piece manufacturing cost increases quadratically as the distance from target increases. Finally, because of the assumed parabolic shape of the per piece manufacturing cost curve, the Taguchi Loss method tacitly assumes the cost function is symmetric on either side of the specified target.

While all of these assumptions can be defended in certain applications, they introduce significant short comings when are applied to real-world production data for the purpose of calculating actual, realized costs. The Taguchi Loss method is often used to model future manufacturing costs at the design stage of product development, but is not the best model to calculate actual costs accrued during production.

A graphical representation of a per piece cost is not necessarily parabolic, as assumed in the Taguchi Loss method, which makes an approximation of a loss function that would (at some future date) be measurable once production started. Since there is no way to accurately predict exactly what the equation of that loss function would ultimately be, the Taguchi Loss method uses the first two terms from a Taylor series expansion of a generic function as an estimate of the actual cost function. This may be a good model to use when production data is not available. However, a Taylor series is itself only an approximation of another function and is only somewhat accurate near the point around which the expansion is made. One of the strengths of the SPC system 100 is that is can be used to calculate the actual per piece manufacturing cost based on user-specified scrapping and rework rules and a set of empirically collected variable data 122 (e.g., production data), as represented by equation 13, for example.

In some examples, the SPC system 100 may indicate that the lowest per piece manufacturing cost point may not be at an obvious target. For example, a process 200 that requires scrapping a below-spec unit, but allows reworking an above-spec unit, in many cases it is probable that the lowest cost point will be above the specified target value, simultaneously increasing the probability of rework and decreasing the probability of scrap.

Figures 8, 9A:
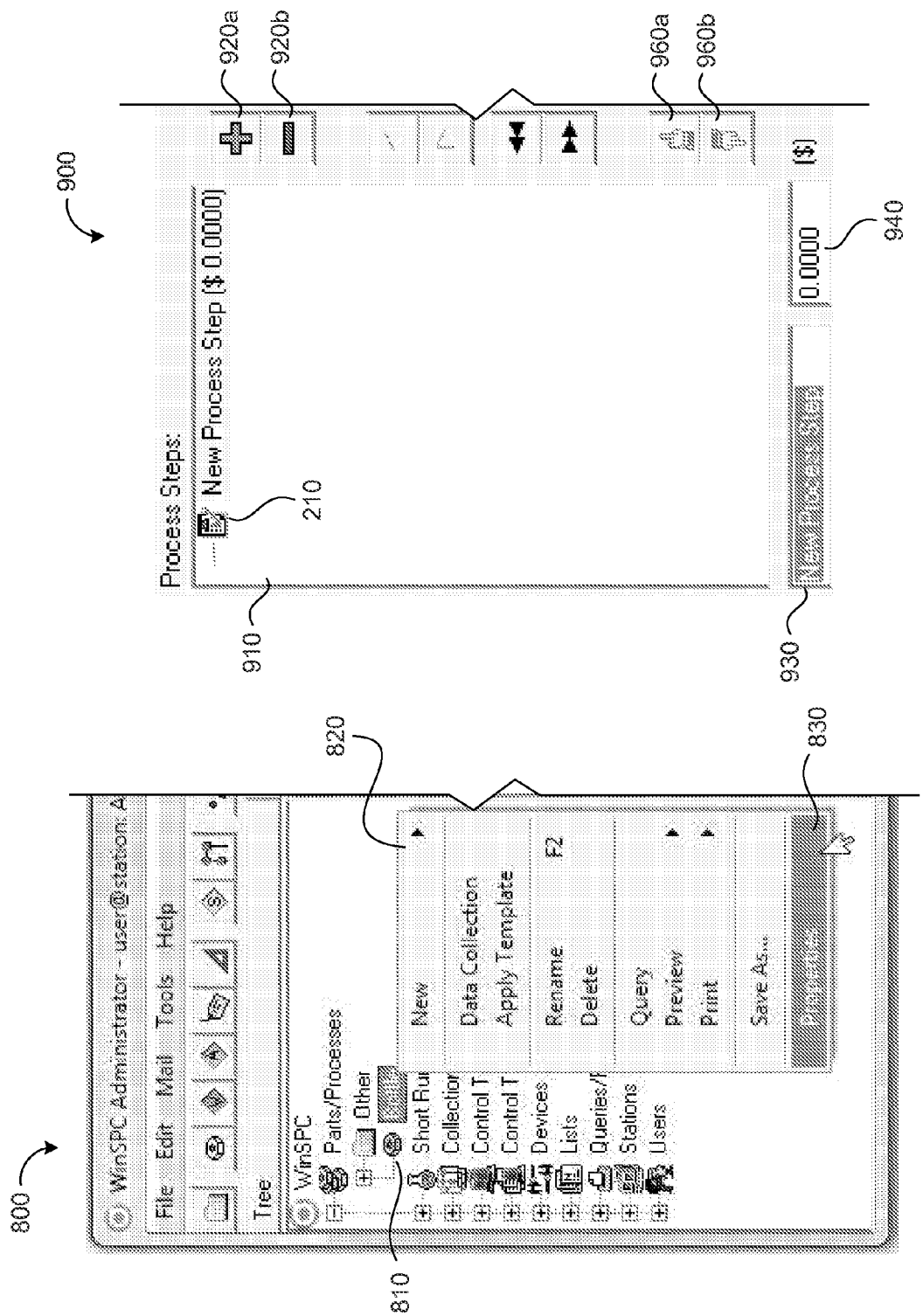
FIG. 8 is a schematic view of an exemplary administrator window of a real-time SPC system.
FIGS. 9A-9D provide schematic views of various portions of an exemplary process pane.
Figures 9B, 9C:
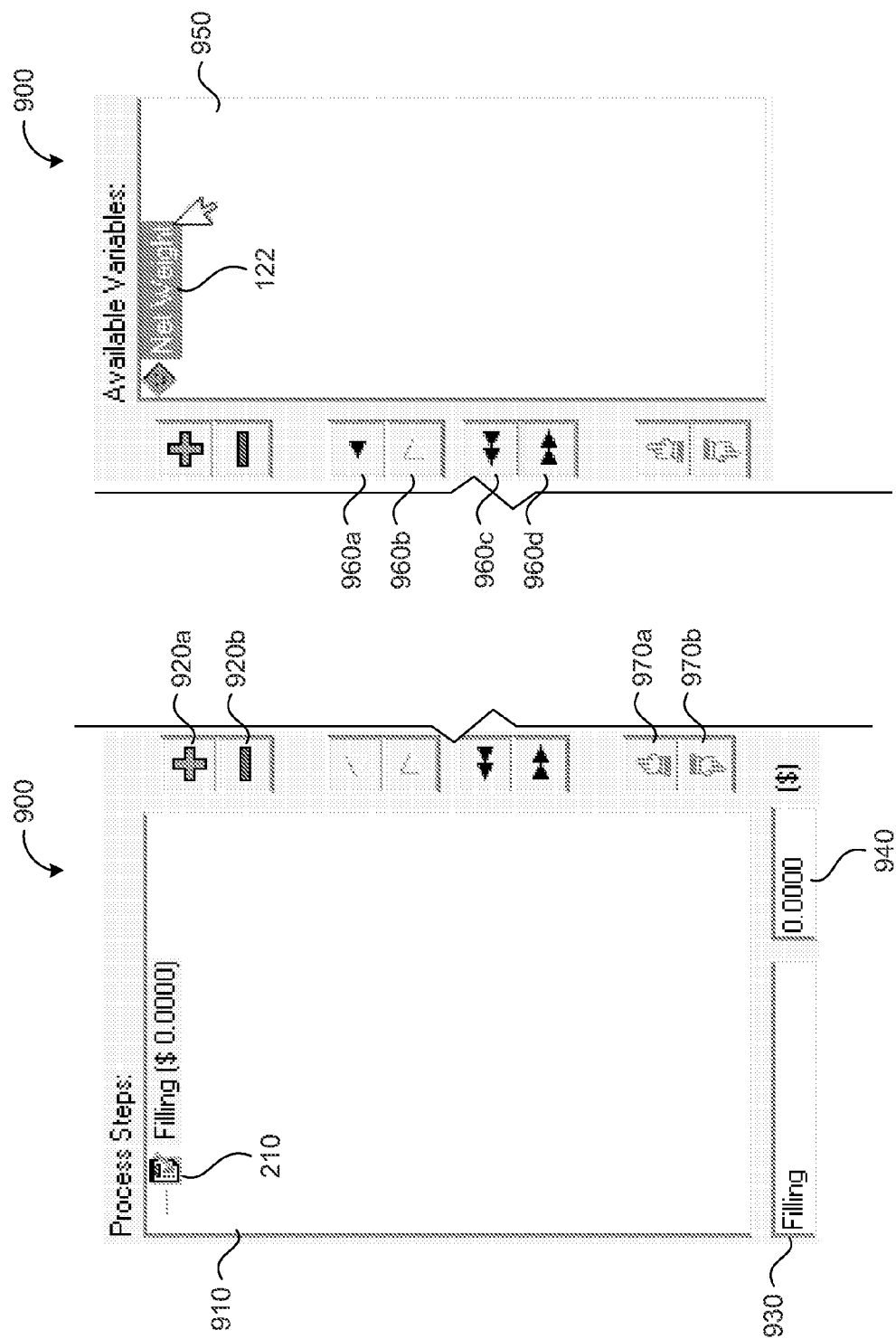
Figure 9D:
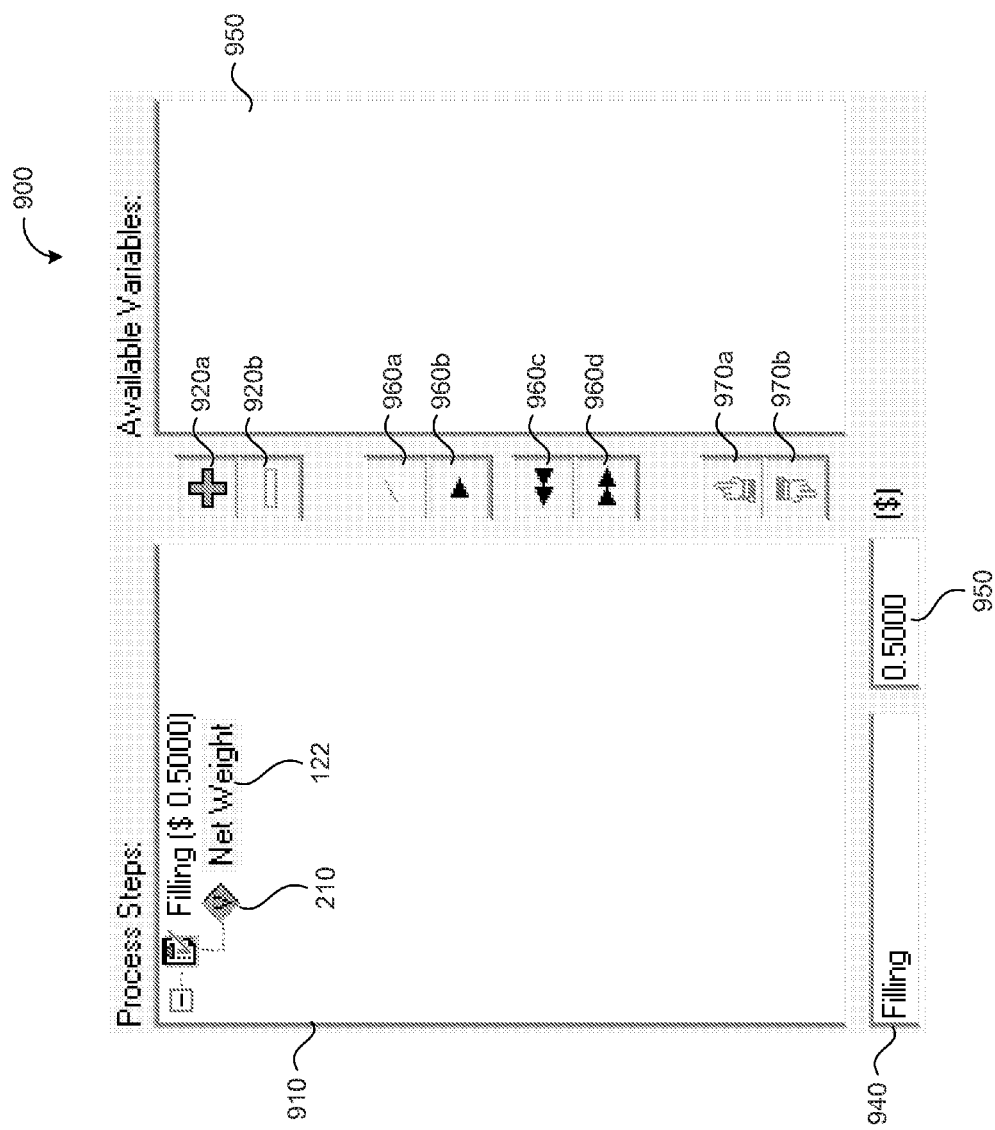

Referring to FIGS. 8-12, in some implementations, a user of the SPC system 100 can set up a cost model 112 by opening an administrator window 800, right-click on a part 810 for which to set up a cost model 112 to open an options menu 820 and select properties 830, as shown in FIG. 8. (It does not matter at this point whether the cost model is to be a single-process step cost model or a multi-process step cost model.) The SPC system 100 displays a cost model part properties dialog box 900 having a process pane 910 that can be populated with the process steps 210 of a particular process 200. The user may add and remove process steps 210 to the process pane 910 by clicking or selecting a create process step button 920a and remove process step button 920b, respectively. For each selected process step 210, the user may overwrite a default name provided in a process step name box 930 with a descriptive name, such as "filling," for the process step 210, as shown in FIG. 9B. Moreover, the user may specify a process step cost factor 113a for the selected process step in a process step cost factor box 940. Next, the user may assign or remove sets of variable data 122 to the selected process step 210 by selecting one or more sets of variable data 122 in an available variables pane 950 and selecting an add variables button 960a or a remove variables button 960b, respectively, as shown in FIG. 9C. As a result, the selected set(s) of variable data 122 are assigned to the corresponding process step 210, as shown in FIG. 9D. The user can add all available sets of variable data 122 in an available variables pane 950 by selecting an add all variables button 960d. Moreover, the user can remove all sets of variable data 122 associated with the selected process step 210 by selecting a remove all variables button 960d. The user can reorder the process steps by selecting the move process step up button 970a or the move process step down button 970b.

Figure 10:
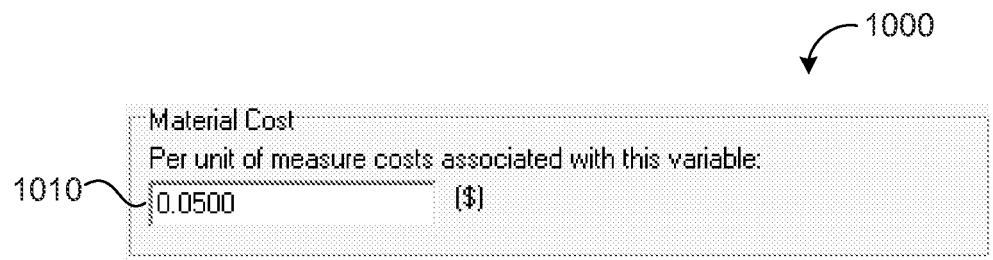
FIG. 10 is a schematic view of an exemplary material costs pane.

The user may supply any cost factors 113 relevant to each set of variable data 122 used to monitor each respective process step 210. Referring to FIG. 10, if the set of variable data 122 has a material cost factor 113b, the user may enter a per unit of measure material cost in a material cost box 1010 of a material cost pane 1000.

Figure 11:
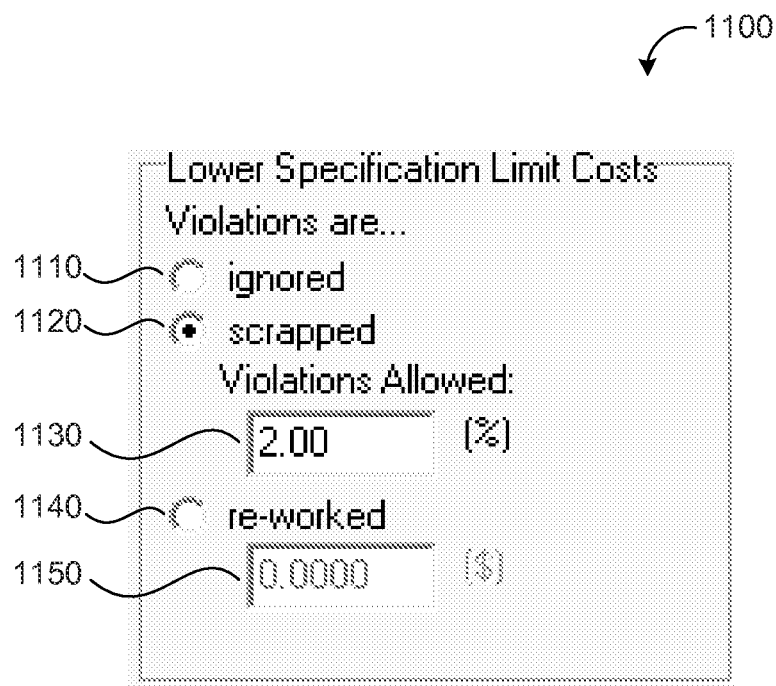
FIG. 11 is a schematic view of an exemplary lower specification limit costs pane.

Referring to FIG. 11, which illustrates an exemplary lower specification limit violation pane 1100, for each set of variable data 122, the user may select whether lower specification limit violations are ignored using an enforce/ignore radio button 1110, whether the part is scrapped by selecting a scrap radio button 1120 and assigning an associated lower specification limit violation scrap cost factor 113c in a LSL scrap cost factor box 1130 (e.g., percent violations allowed), and/or whether the part is reworked by selecting a rework radio button 1140 and assigning an associated lower specification limit violation rework cost factor 113d in a LSL rework cost factor box 1150. For the scrapped option, the value entered is the percentage of violations allowed, which, in other words, is the percentage of parts which can violate the LSL without having to be scrapped. For the reworked option, the value entered is the cost to bring one LSL-violating part into conformance.

Figure 12:
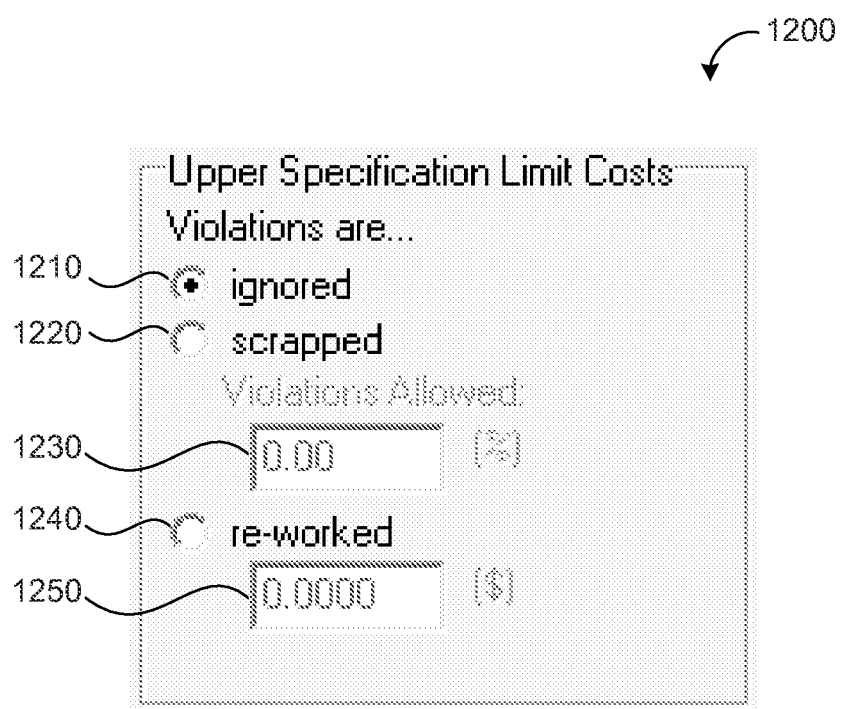
FIG. 12 is a schematic view of an exemplary upper specification limit costs pane.

Referring to FIG. 12, which illustrates an exemplary upper specification limit violation pane 1200, for each set of variable data 122, the user may select whether upper specification limit violations are ignored using an ignore radio button 1210, whether the part is scrapped by selecting a scrap radio button 1220 and assigning an associated upper specification limit violation scrap cost factor 113e in a USL scrap cost factor box 1230, and/or whether the part is reworked by selecting a rework radio button 1240 and assigning an associated upper specification limit violation rework cost factor 113f in a USL rework cost factor box 1250. For the scrapped option, the value entered is the percentage of violations allowed, which, in other words, is the percentage of parts which can violate the USL without having to be scrapped. For the reworked option, the value entered is the cost to bring one USL-violating part into conformance.

Figure 13:
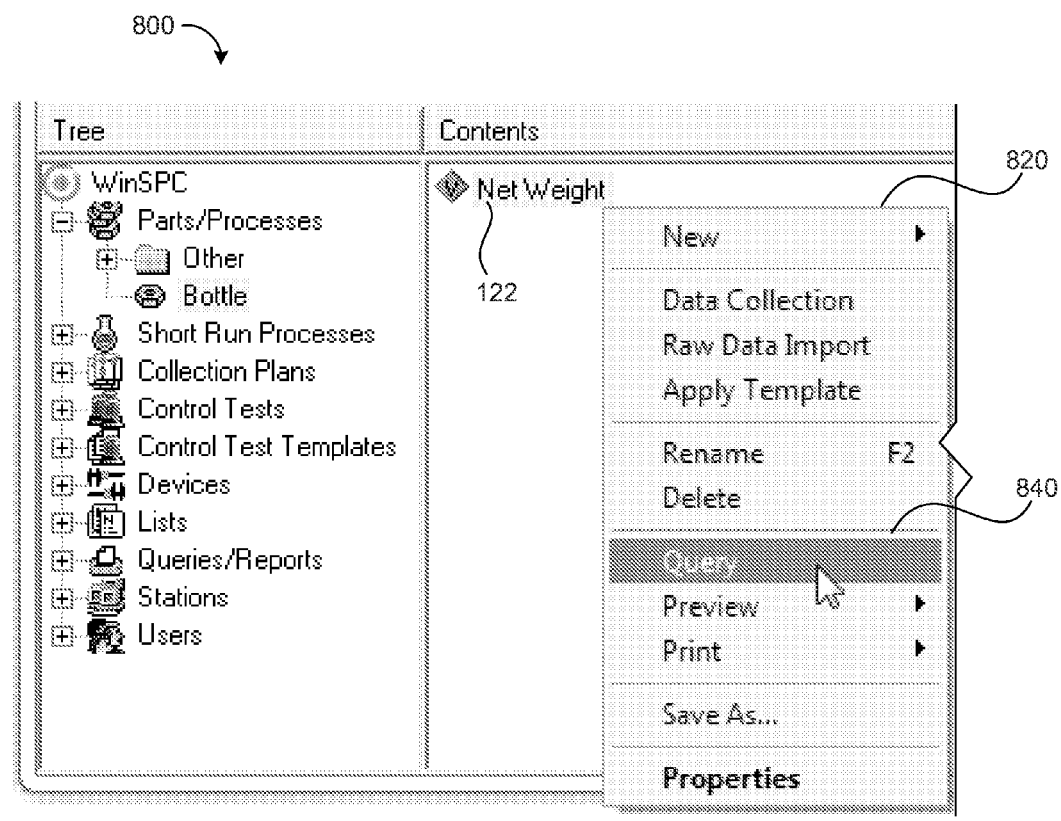
FIG. 13 is a schematic view of an exemplary administrator view of a real-time SPC system.
Figure 14:
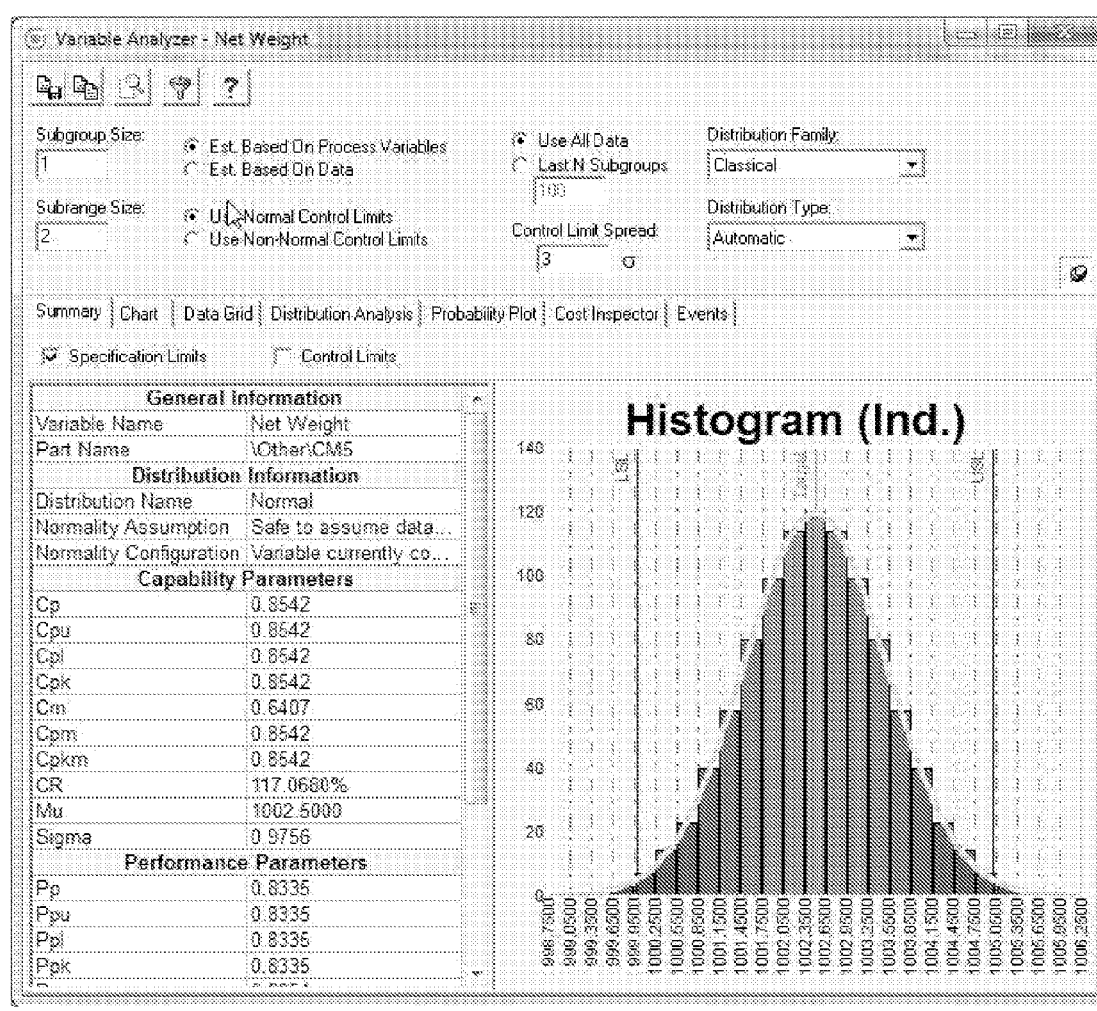
FIG. 14 is a schematic view of an exemplary variable analyzer view.

Once a cost model 112 is set up in the SPC system 100, the cost model 112 can be applied to each set of variable data 122 represented. By applying a cost model 112 to a constituent set of variable data 122, an optimal mean for that set of variable data 122 can be calculated and viewed. In the example shown in FIG. 13, a selected cost model 112 can be applied to a constituent set of variable data 122 by displaying that set of variable data 122 in the SPC system 100. For example, in the administrator window 800, the user may right-click on the set of variable data 122 to open the options menu 820 and select query 840 to execute a variable analyzer 1400, an example of which is shown in FIG. 14, on the selected set of variable data 122. The variable analyzer 1400 can display a histogram of the set of variable data 122 as well as a corresponding optimal mean.

In some implementations, the SPC system 100 provides the current process mean as the average of the set of variable data 122 as of the last measurement recorded (e.g., last real-time measurement of the process 200) and the average cost per unit, which reflects the average total cost to manufacture one unit at the current mean. The average cost per unit may be a composite of process step costs, material costs, scrap costs and rework costs. The SPC system 100 may provide a minimum average cost per unit and/or an optimal process mean, which can be a projection of the average total cost that would be incurred at the optimal mean or the lowest cost that can be expected given the present cost factors. The SPC system 100 may provide a process offset as the difference between the current process mean and optimal process mean for a given set(s) of variable data 122. Moreover, the SPC system 100 may provide a cost of process offset as the difference between the current average cost per unit and the minimum average cost per unit.

In some implementations, the SPC system 100 provides information on how to capitalize on the cost-cutting opportunity associated with the optimal mean for a set of variable data 122, by offering improvements to the corresponding process step 210 to shift the process mean for the set of variable data 122 from its current position toward its optimal position. Effecting such an improvement may require an intimate knowledge of the process step 210 and, in some cases, a familiarity with the overall manufacturing process 200 of which the process step 210 is a member. For example, if the process step 210 is a filling process step executed on a filling machine and the optimal process mean is less than (e.g., to the left of) the current process mean, the filling machine is overfilling and needs to be adjusted to fill containers with less material. If the optimal process mean is greater than (e.g., to the right of) the current process mean, the filling machine is under-filling and needs to be adjusted to fill containers with more material. In another example, if the process step 210 includes dimension-reducing, as with machining operations such as milling, and the optimal process mean is to the left of the current process mean, the process step 210 is under-reducing and needs to be adjusted to further reduce the dimension. If the optimal process mean is to the right of the current process mean, the process step 210 is over-reducing and needs to be adjusted to reduce the dimension less. These examples show that the position of the optimal process mean relative to the position of the current process mean can be used to determine if a process step 210 is having too little effect (e.g., heating too little, plating too little, etc.) or too much effect (e.g., cooking too much, etching too much, etc.). Consequently, the process step 210 can be adjusted to correct the deficiency or excess. For a set of variable data where the optimal process mean equals the current process mean, the operation can be considered as optimized as it can be with the current equipment. Further cost-cutting in this scenario may only possible by upgrading the machine.

Figure 15A:
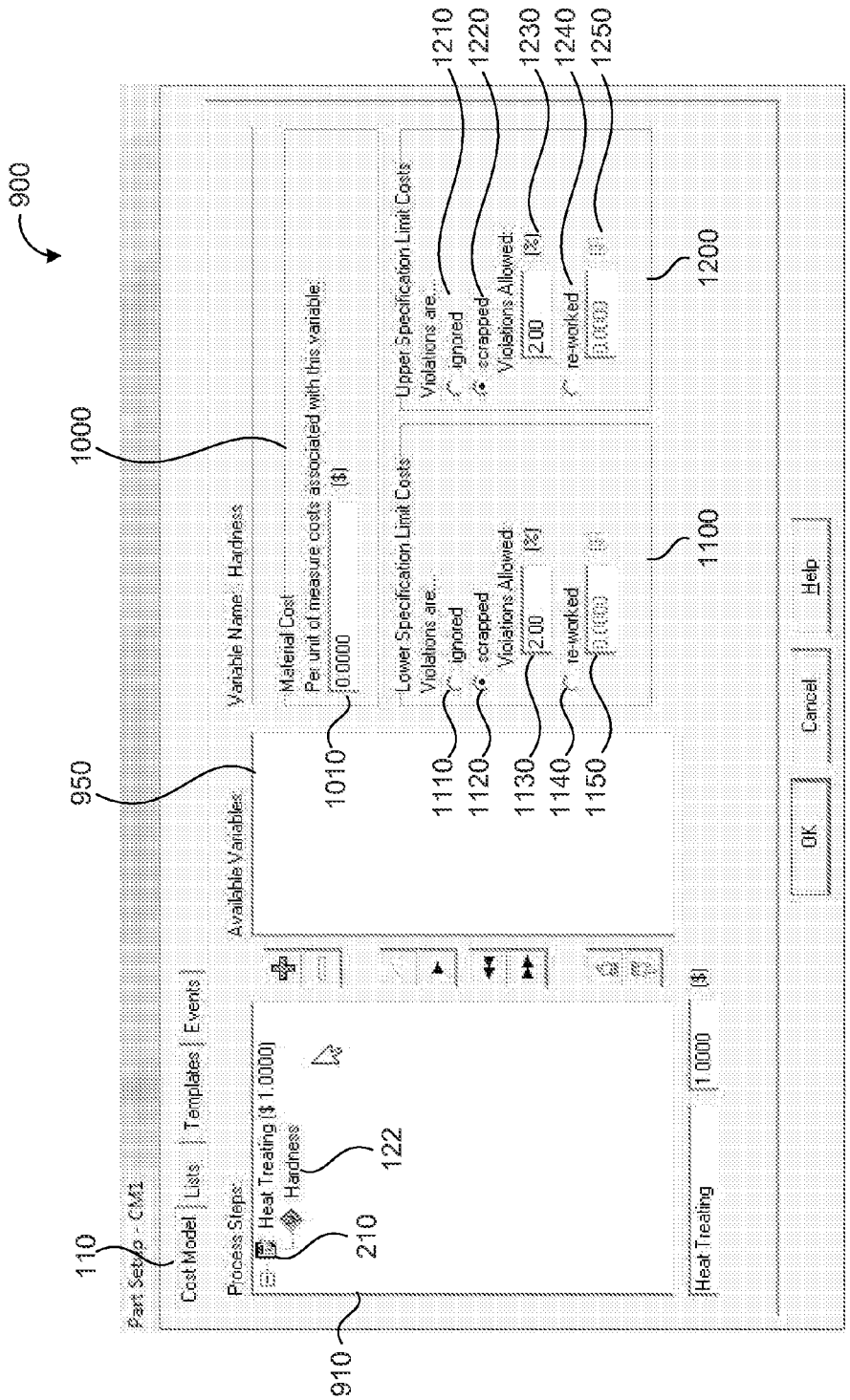
FIG. 15A is a schematic view of an exemplary cost model view receiving inputs for a lower specification limit scrapped violation cost and an upper specification limit scrapped violation cost.

Referring to FIG. 15A, in the following example, a cost model 112 is for a heat treating process step 210 is shown in the process pane 910 of the cost model part properties dialog box 900. The set of variable data 122 associated with the heat treating process step 210 is hardness. In addition to the process step cost factor 113*a* entered in the process step cost factor box 940, the cost model 112 has a lower specification limit violation scrap cost factor 113*c* entered in the SL scrap cost factor box 1150 and an upper specification limit violation scrap cost factor 113*e* entered in the USL scrap cost factor box 1230.

Figure 15B:
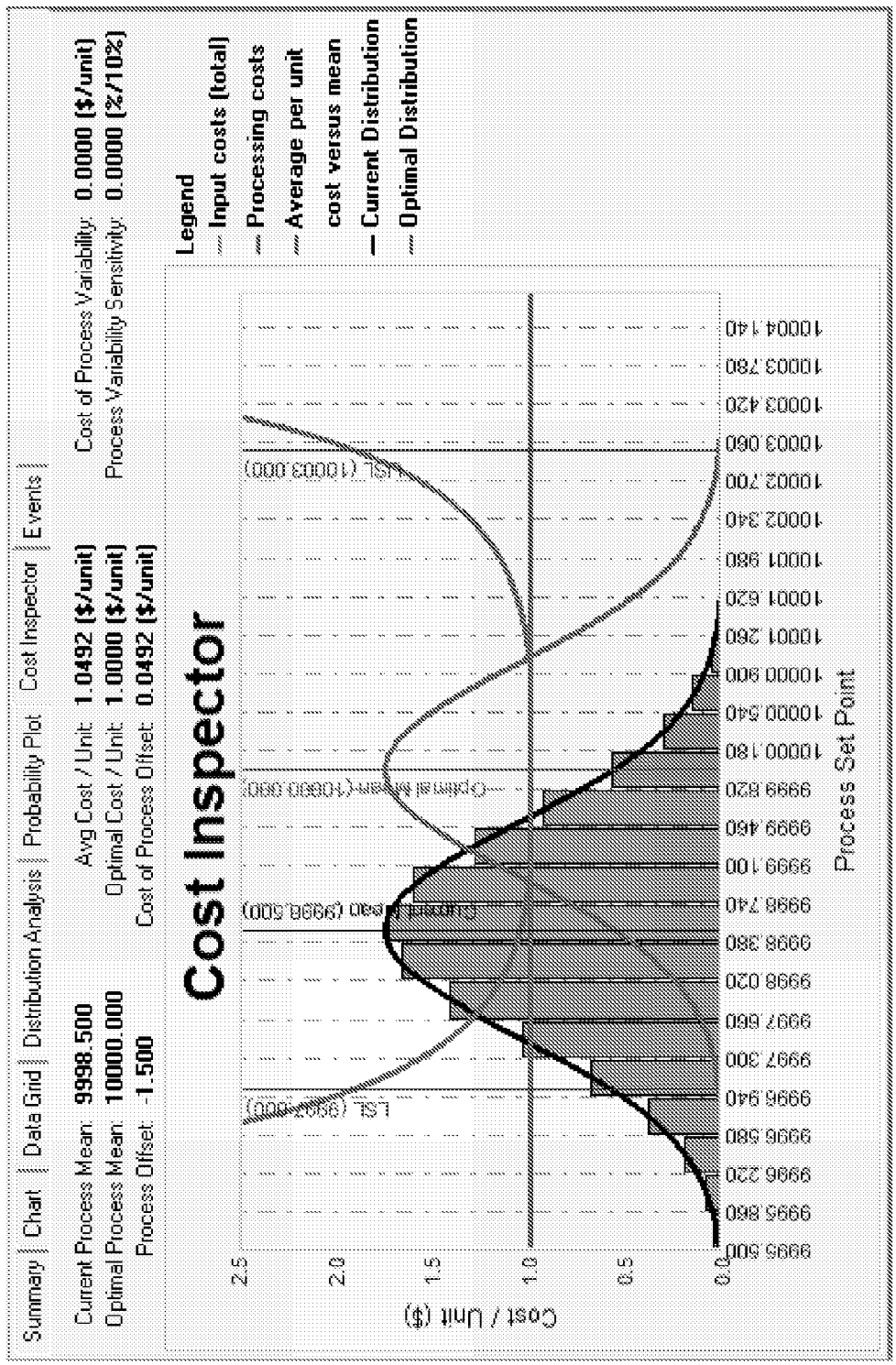
FIG. 15B provides an exemplary graphical view of costs, probability density function of a set of production data, and an optimal data mean provided by a real-time SPC system.

As illustrated in FIG. 15B, applying the cost model 112 to an example set of hardness data reveals that the data's optimal process mean is to the right of the current process mean and has a cost of process offset of just under five cents per unit. For every million units heat treated, this adds up to a waste of $49,200.00. To cut this cost, since the unit of measurement for this heat treating step is indentation depth, the process step 210 needs to be adjusted to harden the units less, which in turn would result in the indentation depth shifting closer to the USL with respect to current position.

Figure 15C:
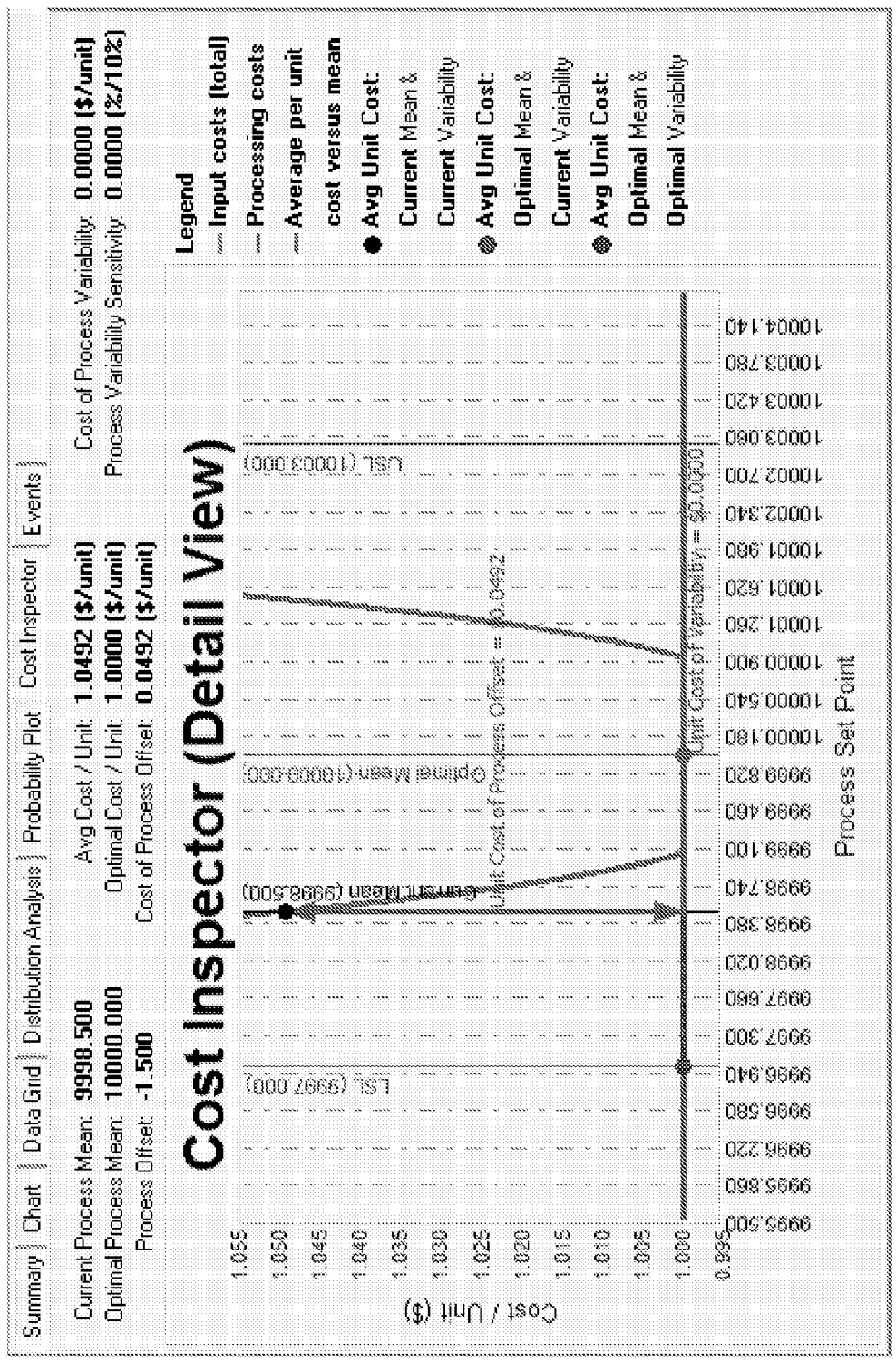
FIG. 15C provides a detail view of FIG. 15B.

In a detail view shown in FIG. 15C, the lowest cost point for the heat treating process step 210 is shown at a midpoint between the LSL and USL. This is due to the fact that both the cost model and the distribution of data are symmetrical.

Figure 16A:
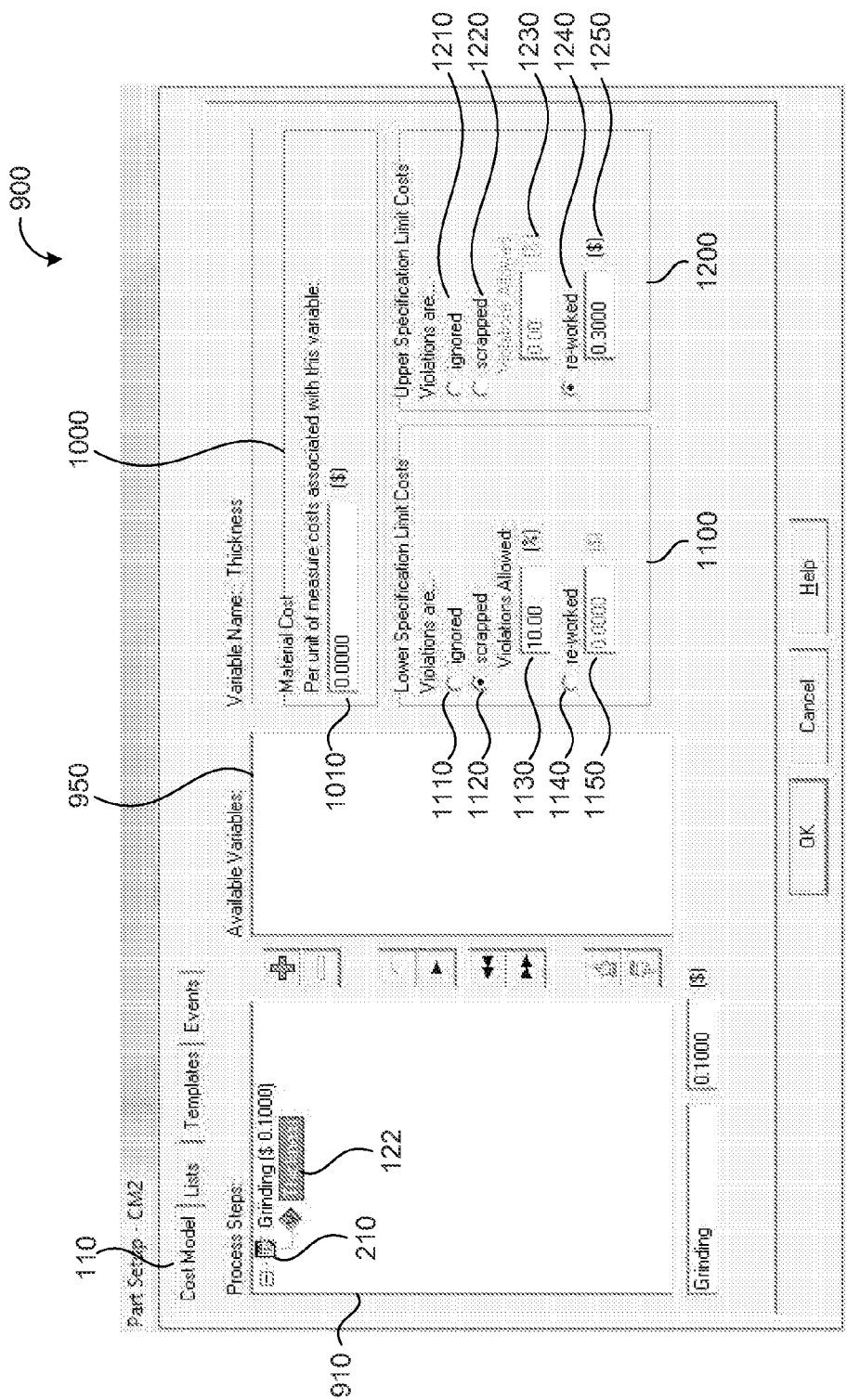
FIG. 16A is a schematic view of an exemplary cost model view receiving inputs for a lower specification limit scrapped violation cost and an upper specification limit rework violation cost.
Figure 16B:
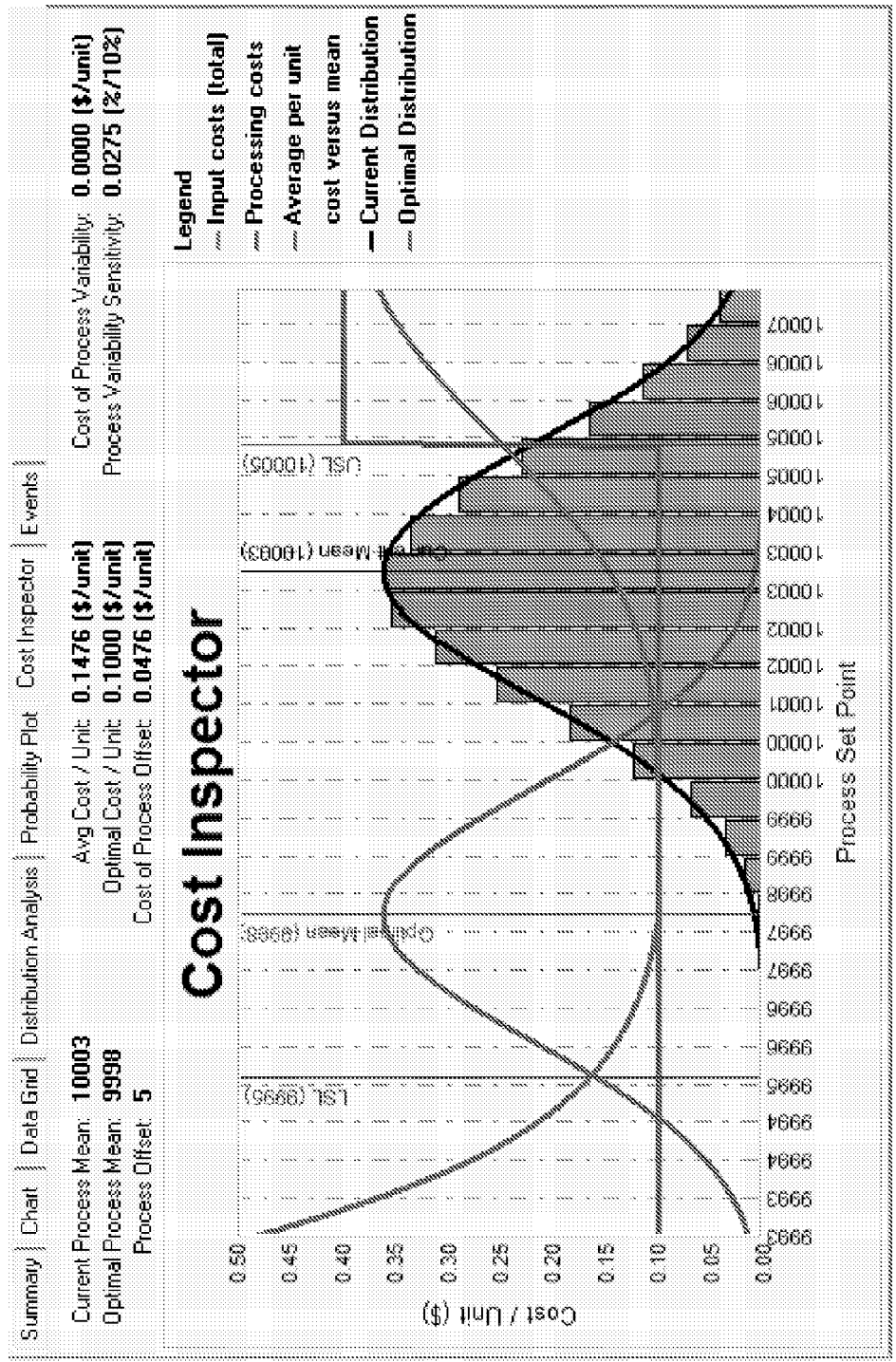
FIG. 16B provides an exemplary graphical view of costs, probability density function of a set of production data, and an optimal data mean provided by a real-time SPC system.
Figure 16C:
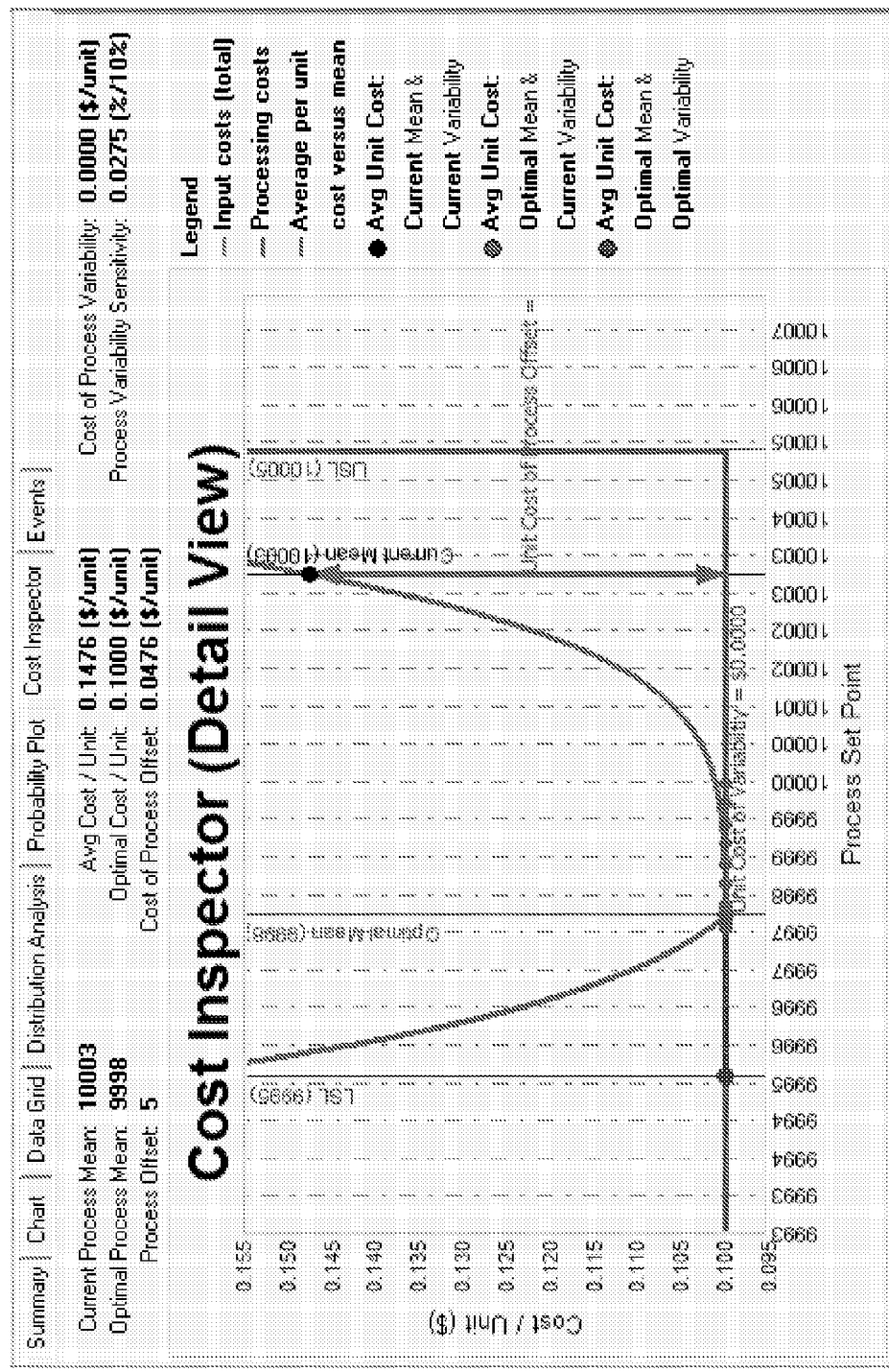
FIG. 16C provides a detail view of FIG. 16B.

FIGS. 16A-16C illustrate an example of a cost model 112 for a grinding process step 210 having a set of associated variable data 122 for a thickness of a part. In addition to the process step cost factor 113*a* entered in the process step cost factor box 940, the cost model 112 has a lower specification limit violation scrap cost factor 113*c* entered in the LSL scrap cost factor box 1150 and an upper specification limit violation rework cost factor 113*e* entered in the USL rework cost factor box 1250. Applying the cost model 112 to an example set of Thickness data, as shown in FIG. 16B, reveals that the data's optimal process mean is to the left of the current process mean and has a cost of process offset of just under five cents per unit. For every million units ground, this adds up to a waste of $47,600.00. In this example, the grinding process step 210 is under-grinding. To cut costs, the grinding process step 210 needs to be adjusted to grind more. The detail view shown in FIG. 16C illustrates that the optimal process mean will only approach a target that is centered between the LSL and USL if process variability is reduced.

Figure 17A:
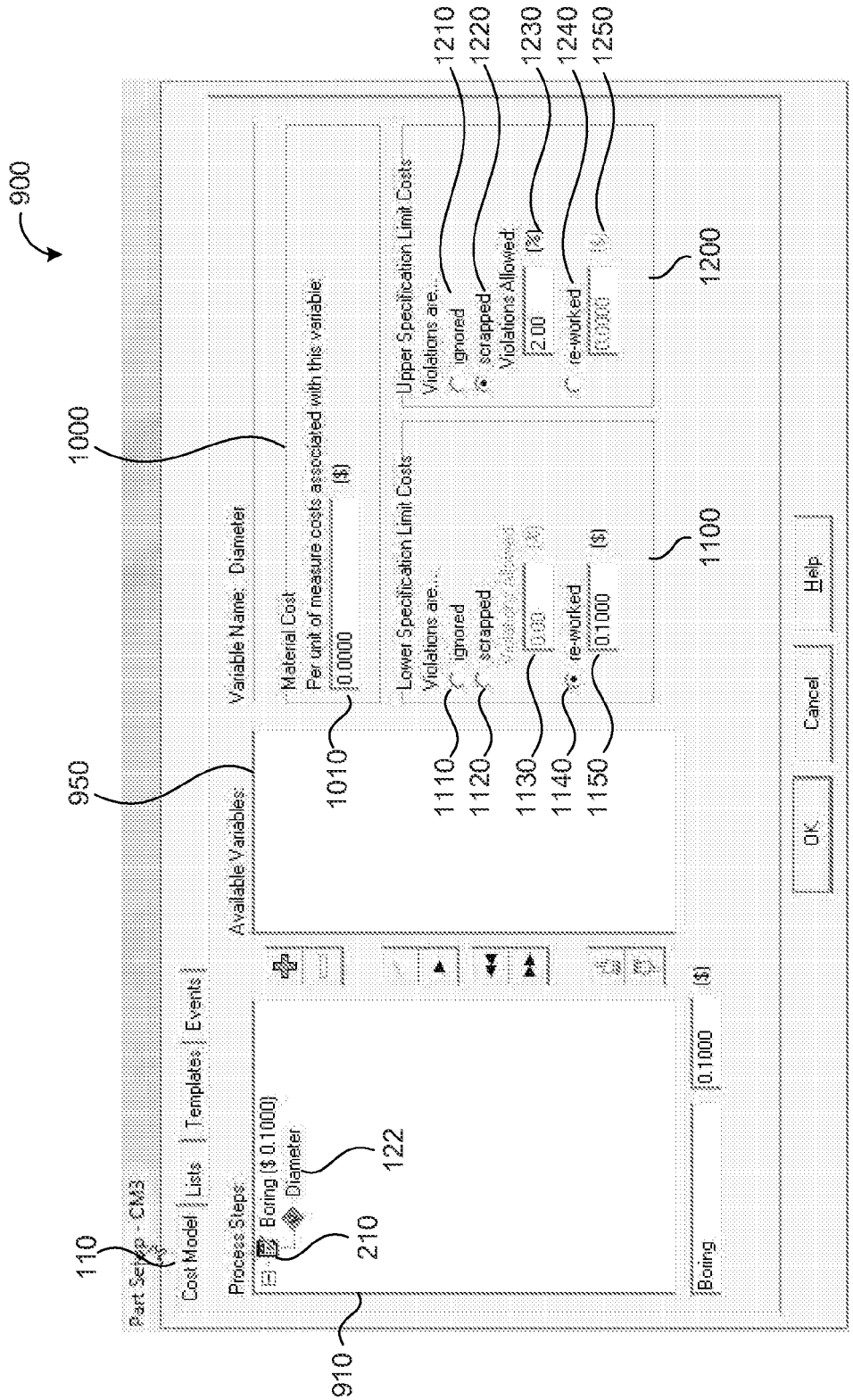
FIG. 17A is a schematic view of an exemplary cost model view receiving inputs for a lower specification limit rework violation cost and an upper specification limit scrapped violation cost.
Figure 17B:
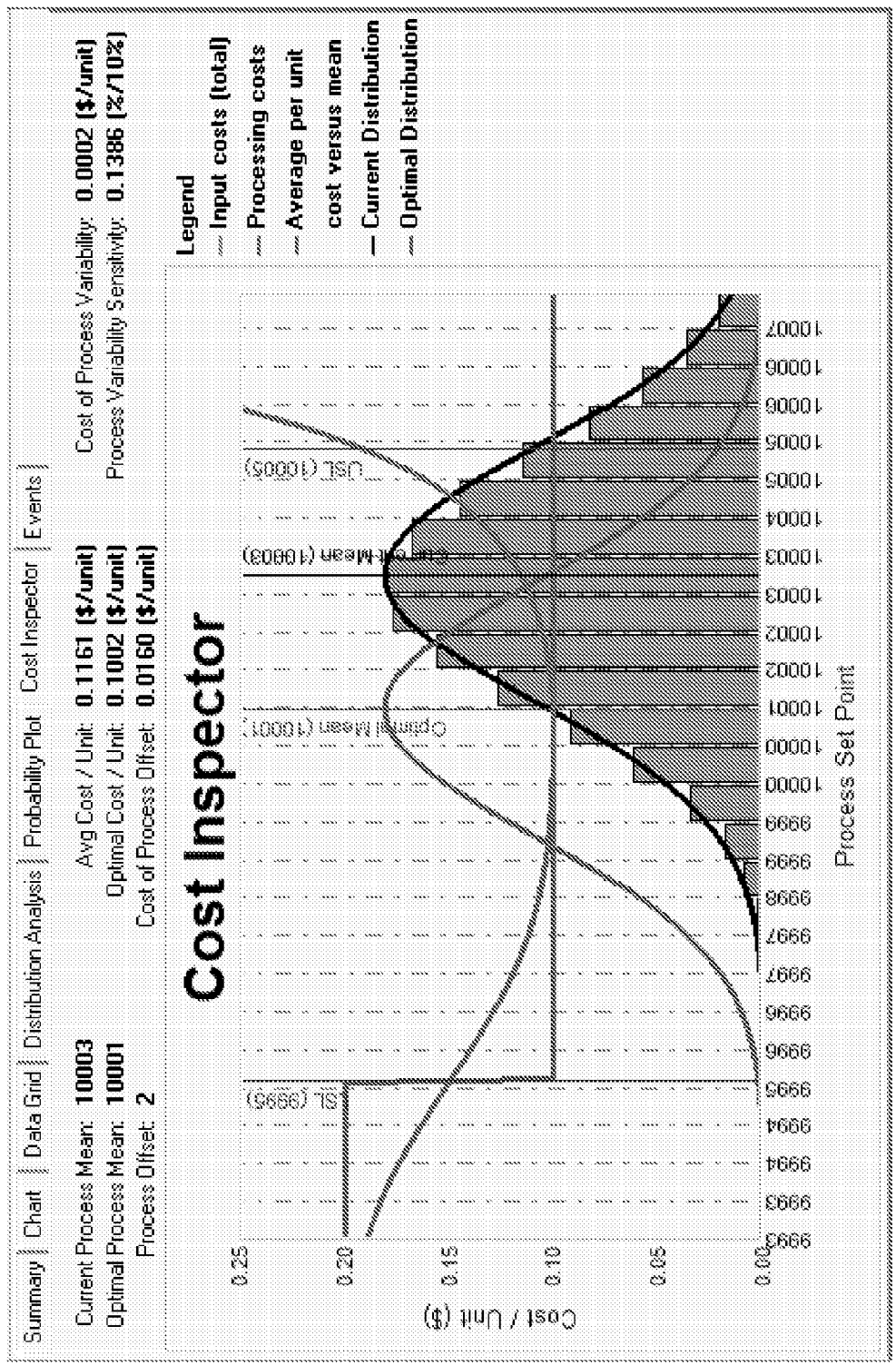
FIG. 17B provides an exemplary graphical view of costs, probability density function of a set of production data, and an optimal data mean provided by a real-time SPC system.
Figure 17C:
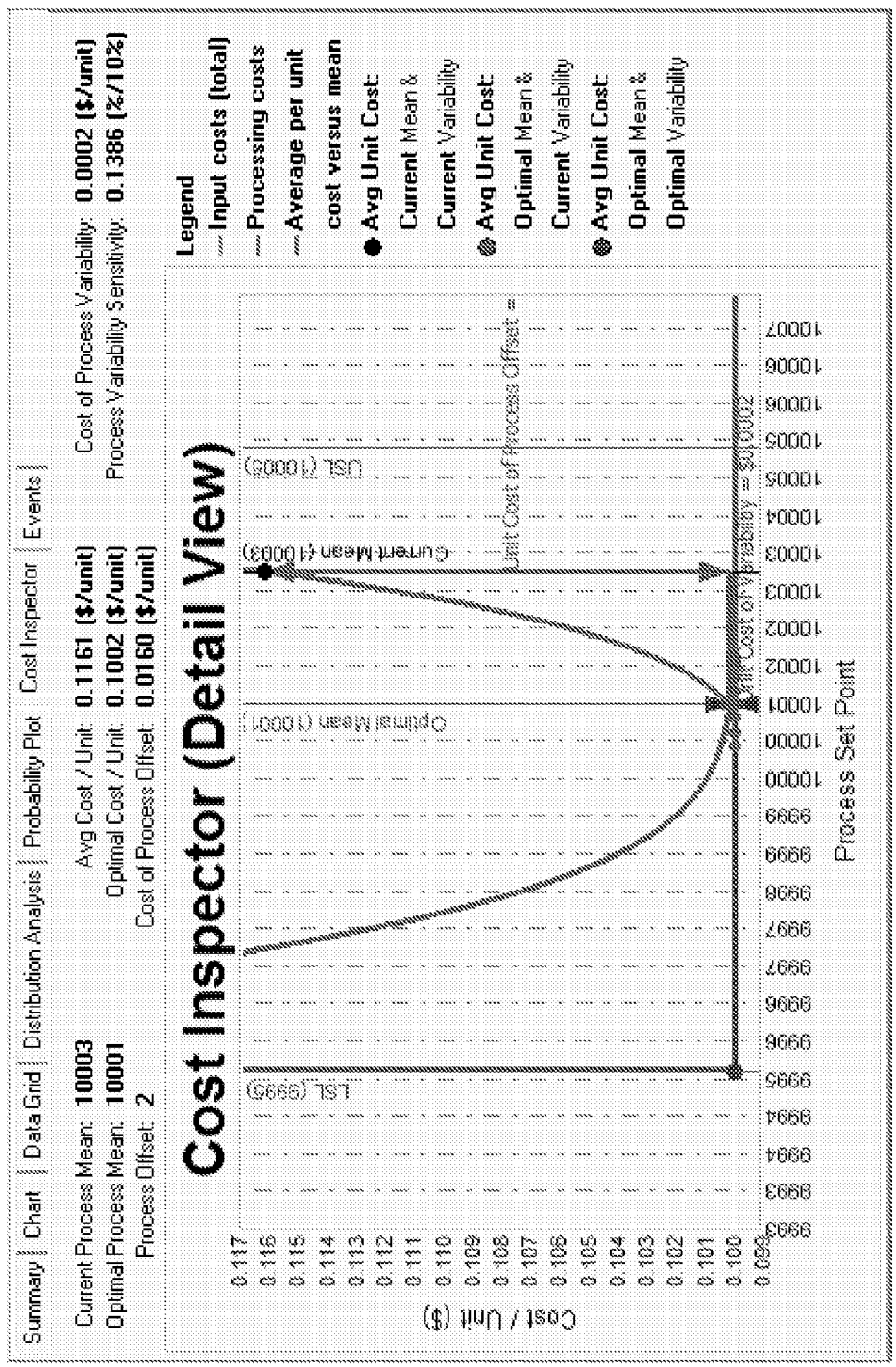
FIG. 17C provides a detail view of FIG. 15B.

FIGS. 17A-17C illustrate an example of a cost model 112 for a boring process step 210 having a set of associated variable data 122 for a diameter of a part. In addition to the process step cost factor 113*a* entered in the process step cost factor box 940, the cost model 112 has a lower specification limit violation rework cost factor 113*d* entered in the LSL rework cost factor box 1150 and an upper specification limit violation scrap cost factor 113*e* entered in the USL scrap cost factor box 1230. Applying the cost model 112 to an example set of diameter data, as shown in FIG. 17B, reveals that the data's optimal process mean is to the left of the current process mean and has a cost of process offset of around one and a half cents per hole. For every million holes bored, this adds up to a waste of $16,000.00. The boring process step 210 is boring excessively wide holes. To cut costs, the boring process step 210 needs to be adjusted to bore holes of a lesser diameter. The detail view shown in FIG. 17C illustrates that no gains beside those associated with process offset are possible. There are no savings, in other words, that can be expected from reducing variability because there is insufficient loss due to variability.

Figure 18A:
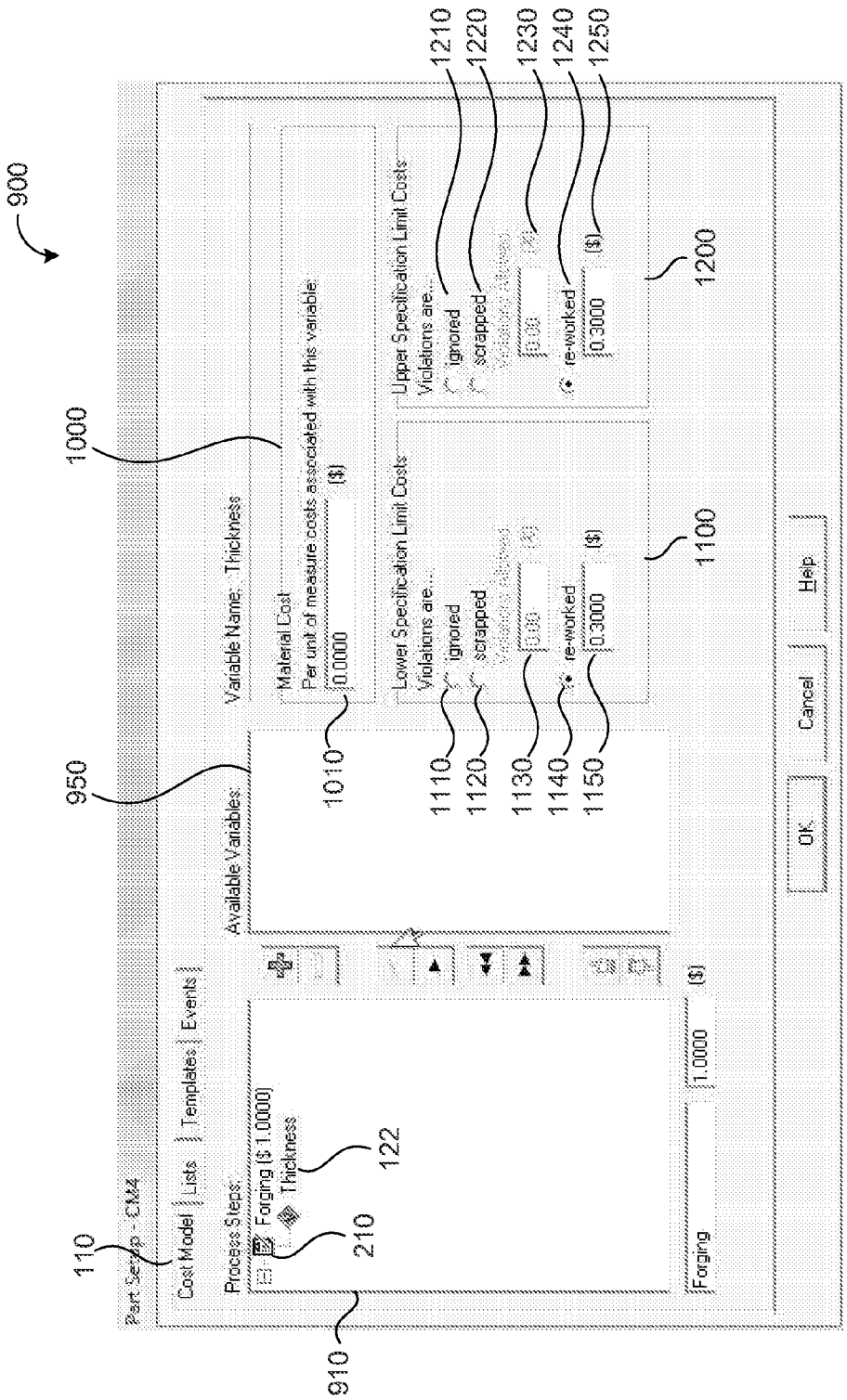
FIG. 18A is a schematic view of an exemplary cost model view receiving inputs for a lower specification limit rework violation cost and an upper specification limit rework violation cost.
Figure 18B:
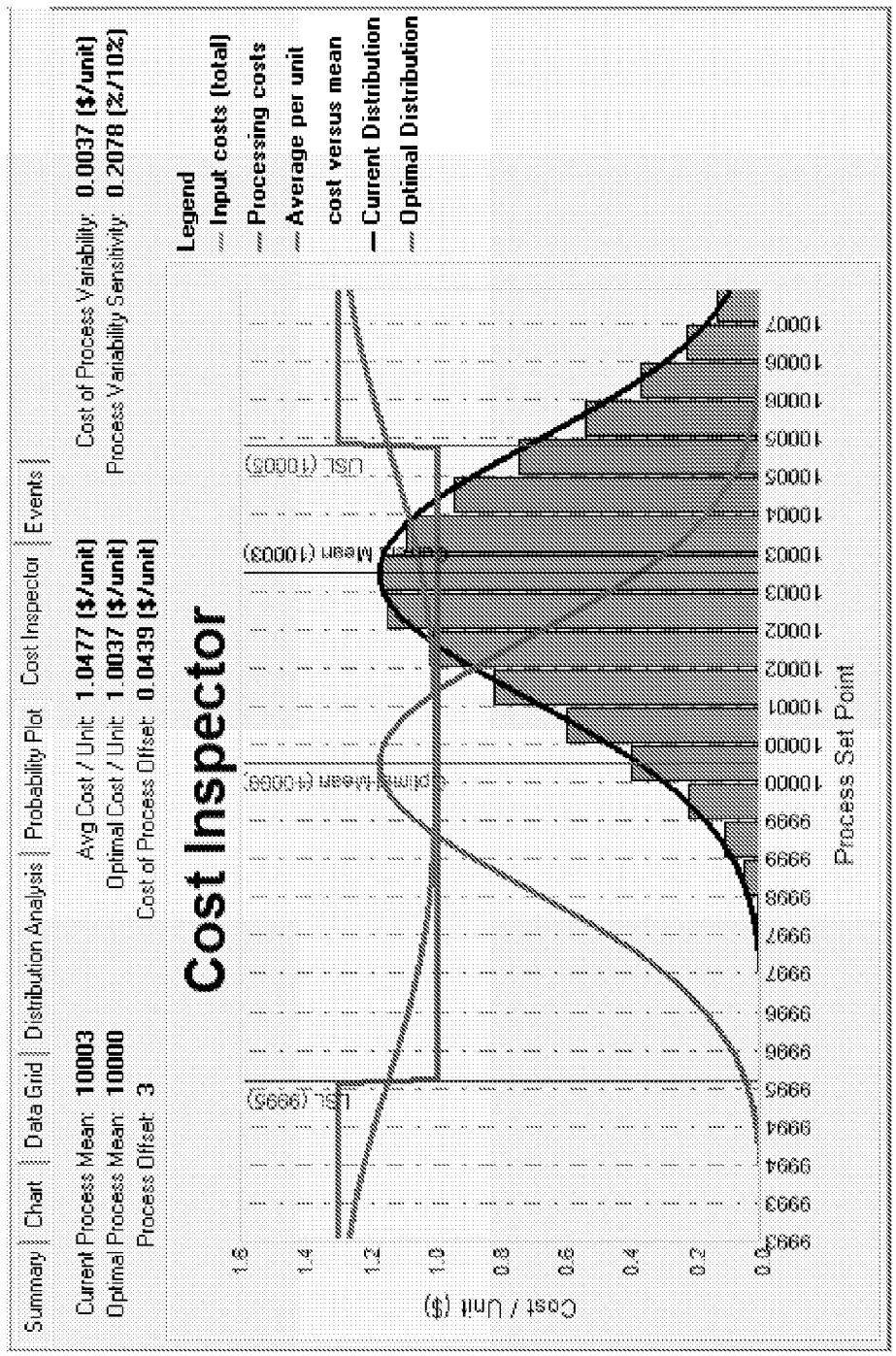
FIG. 18B provides an exemplary graphical view of costs, probability density function of a set of production data, and an optimal data mean provided by a real-time SPC system.
Figure 18C:
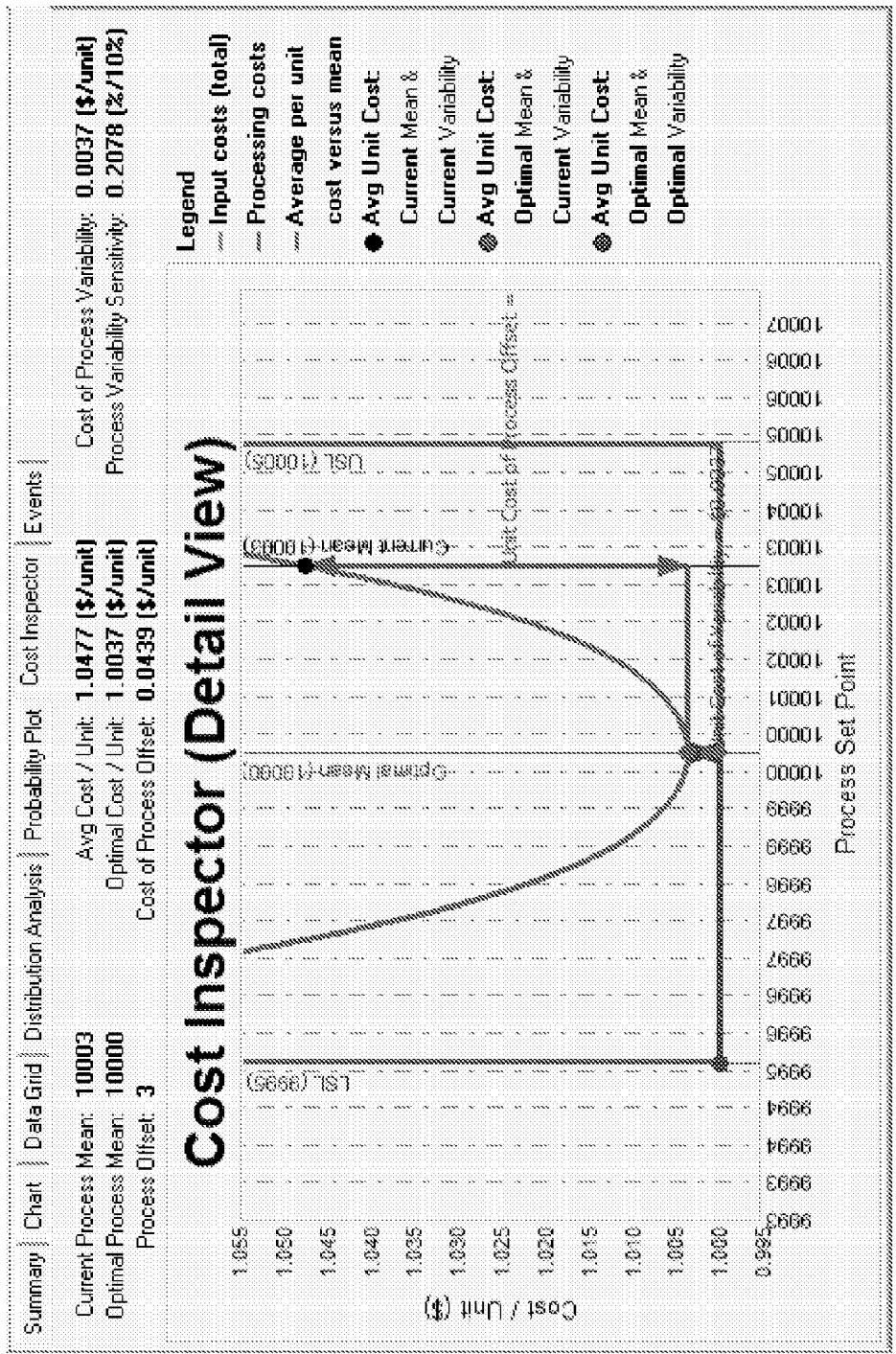
FIG. 18C provides a detail view of FIG. 18B.

FIGS. 18A-18C illustrate an example of a cost model 112 for a forging process step 210 having a set of associated variable data 122 for a thickness of a part. In addition to the process step cost factor 113*a* entered in the process step cost factor box 940, the cost model 112 has a lower specification limit violation rework cost factor 113*d* entered in the LSL rework cost factor box 1150 and an upper specification limit violation rework cost factor 113*f* entered in the USL rework cost factor box 1250. Applying the cost model 112 to an example set of thickness data, as shown in FIG. 18B, reveals that the data's optimal process mean is to the left of the current process mean and has a cost of process offset of a little over four cents per unit. For every million units forged, this adds up to a waste of $43,900.00. The forging process step 210 is forging units with too great a thickness. To cut costs, the process step needs to be adjusted so the forged units are thinner. The detail view shown in FIG. 18C illustrates that the cost of process offset is over ten times the cost of process variability. Consequently, the focus for improvement should be shifting the current mean to the optimal mean. Once that is done, further gain from reducing process variability can be pursued if, in light of other priorities, it makes sense.

Figure 19A:
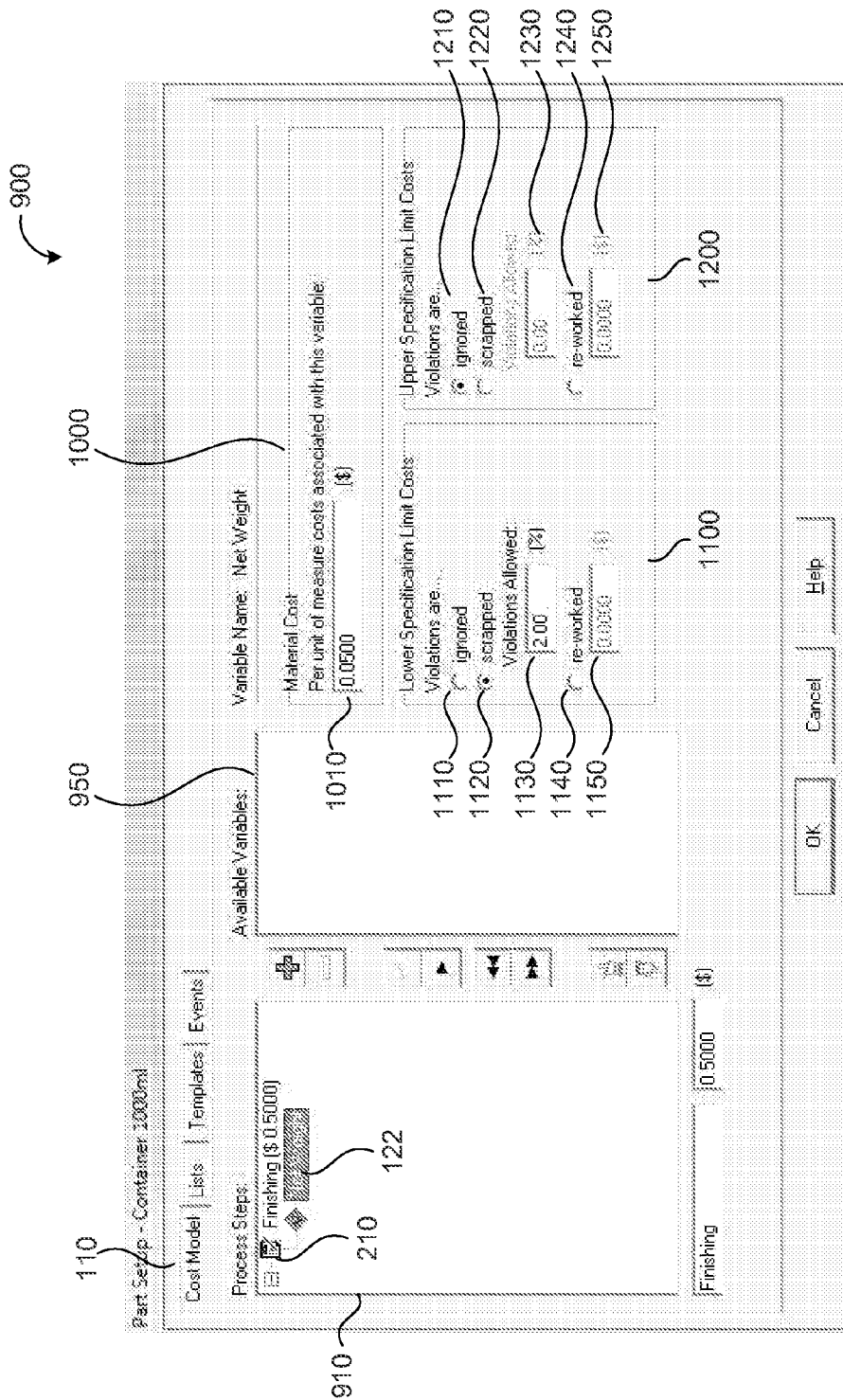
FIG. 19A is a schematic view of an exemplary cost model view receiving inputs for a material cost and a lower specification limit scrapped violation cost.
Figure 19B:
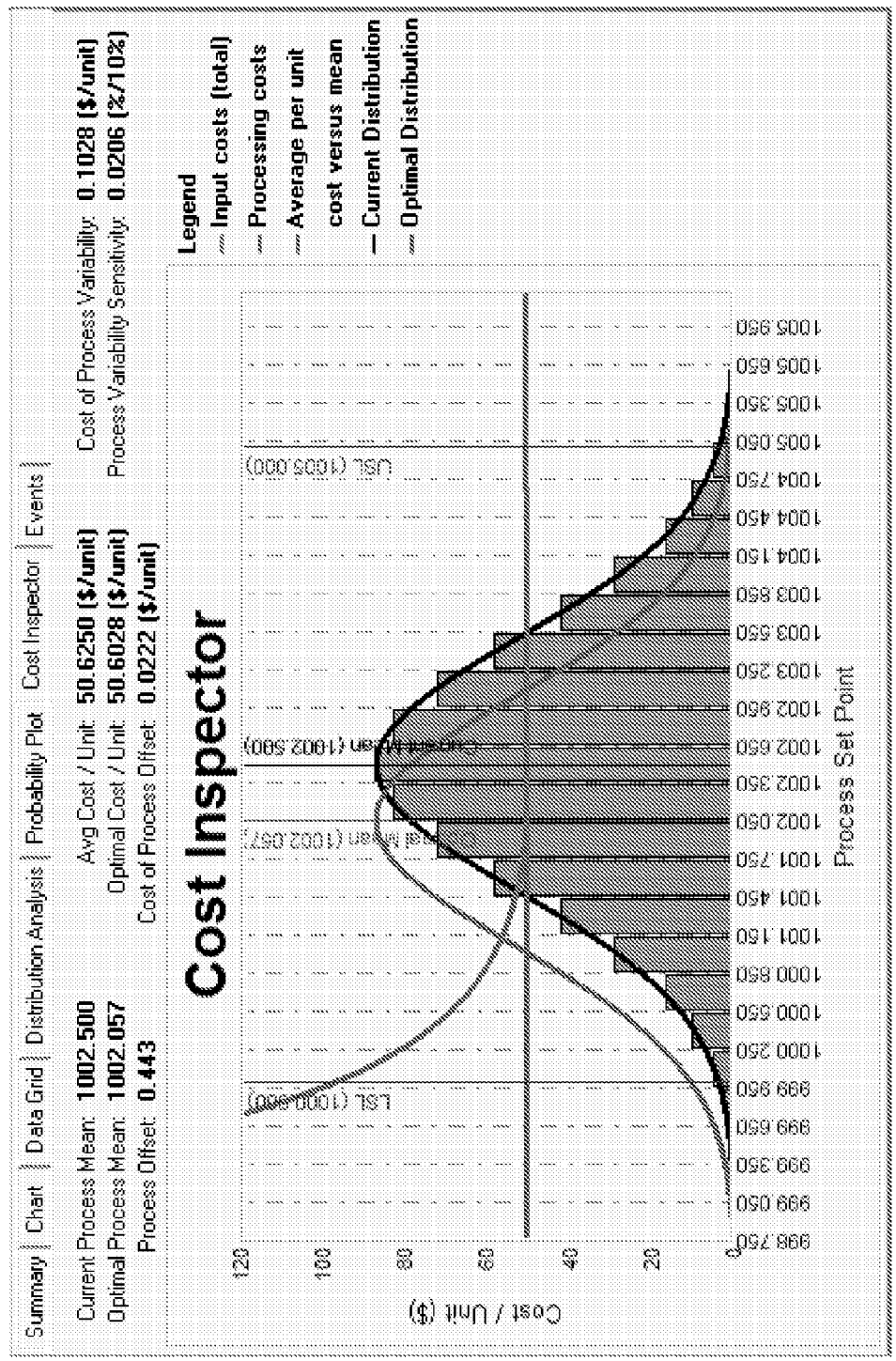
FIG. 19B provides an exemplary graphical view of costs, probability density function of a set of production data, and an optimal data mean provided by a real-time SPC system.
Figure 19C:
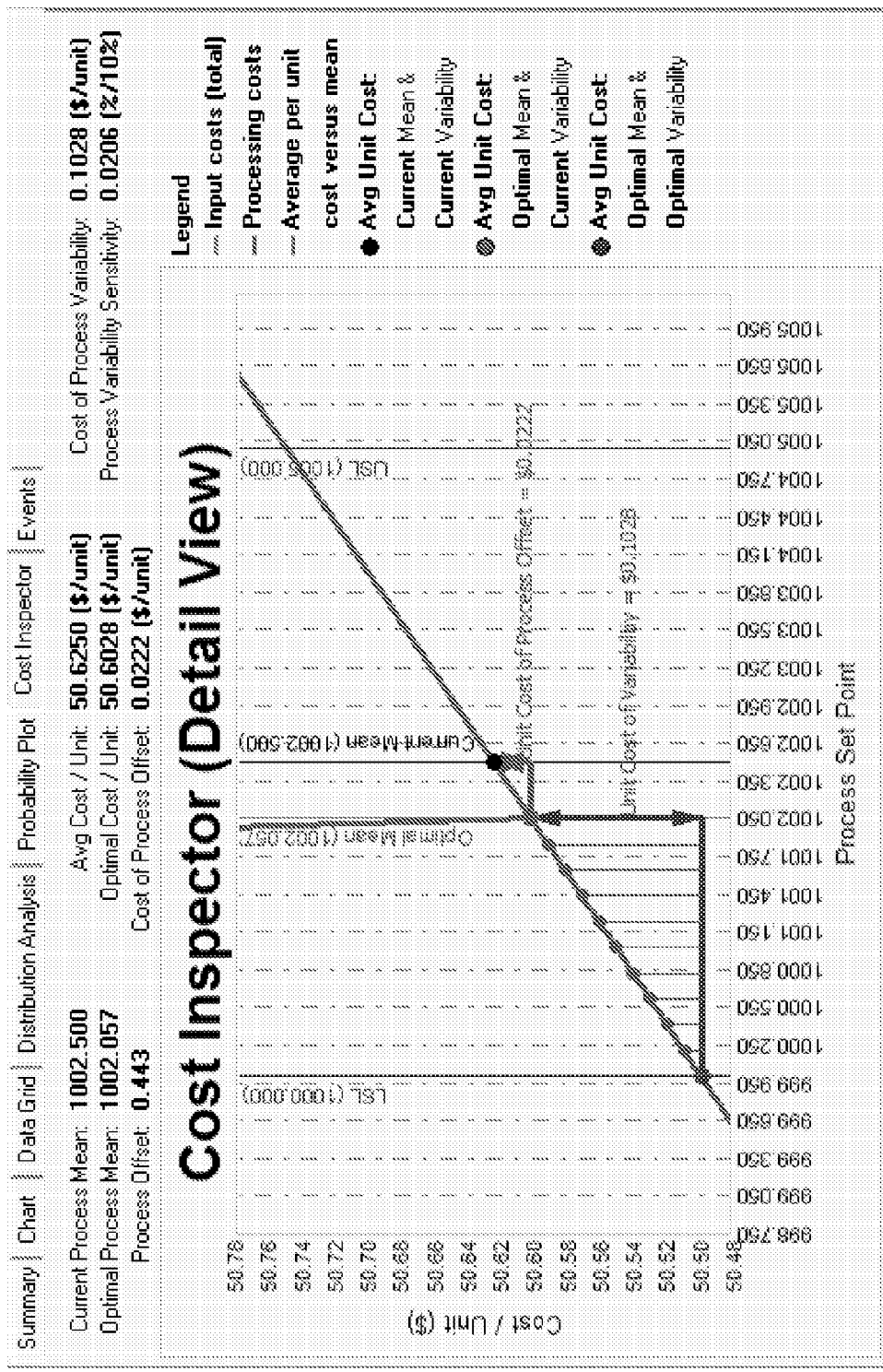
FIG. 19C provides a detail view of FIG. 19B.

FIGS. 19A-19C illustrate an example of a cost model 112 for a filling process step 210 in which a machine dispenses material into containers. The set of variable data 122 associated with the filling process step 210 is net weight. In addition to the process step cost factor 113*a* entered in the process step cost factor box 940, the cost model 112 has a material cost factor 113*b* entered in the material cost factor box 1010 and a lower specification limit violation scrap cost factor 113*c* entered in the LSL scrap cost factor box 1150. Applying the cost model 112 to an example set of net weight data, as shown in FIG. 19B, reveals that the data's optimal process mean is to the right of the current process mean and has a cost of process offset of just over two cents per container. For every million containers filled, this adds up to a waste of $22,200.00. The filling process 210 step is over-filling and needs to be adjusted to fill containers with less material. The detail view shown in FIG. 19C illustrates that the cost of process variability is nearly five times the cost of process offset. As a result, initial improvements can be directed at process variability. In addition, the process variability sensitivity shows that the cost of a finished unit can be reduced by 0.02% for every 10% decrease in the process variability. The evenly spaced dots between the LSL and optimal process mean illustrate this linear progression of cost savings.

Figure 20A:
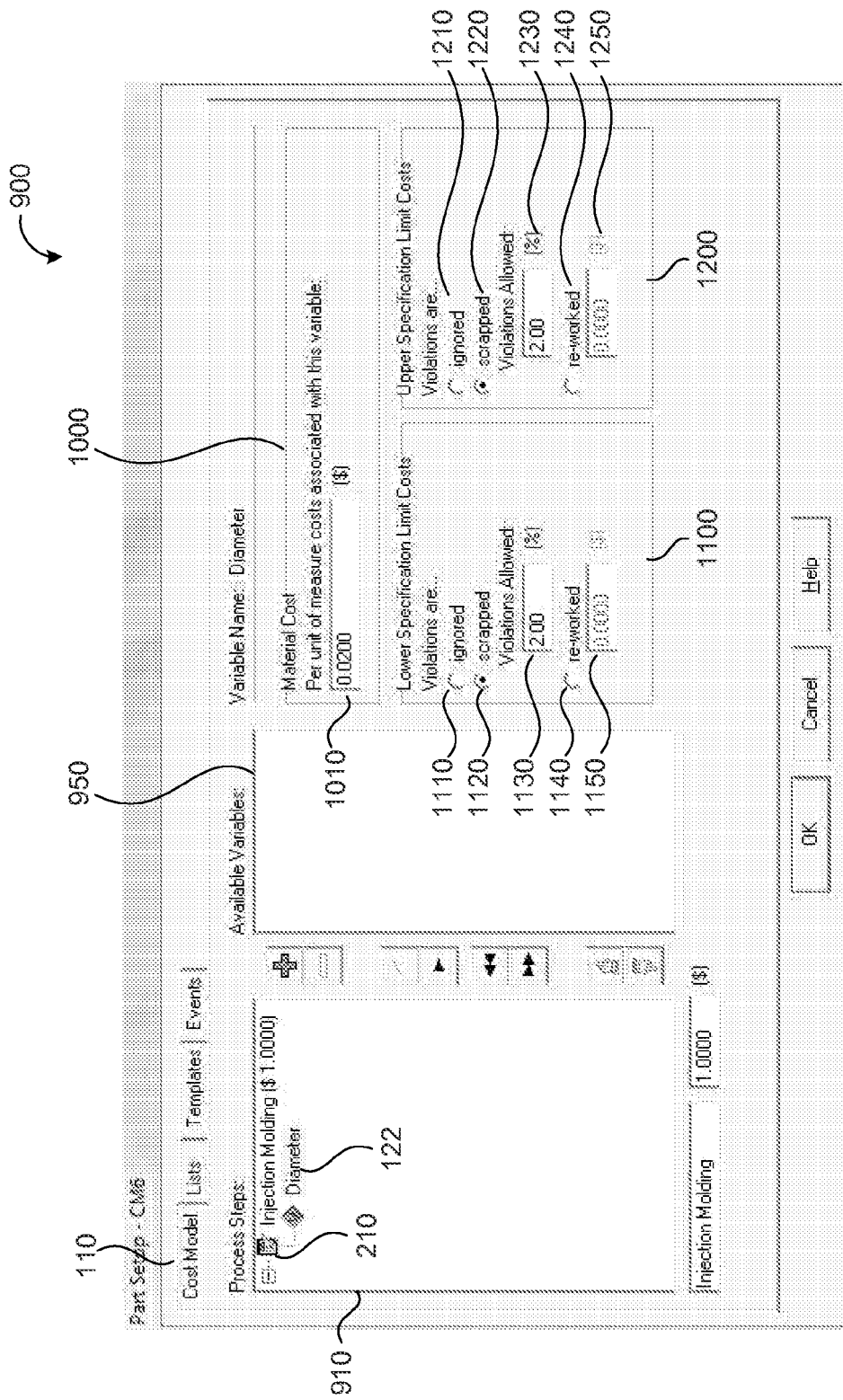
FIG. 20A is a schematic view of an exemplary cost model view receiving inputs for a material cost, a lower specification limit scrapped violation cost and an upper specification limit scrapped violation cost.
Figure 20B:
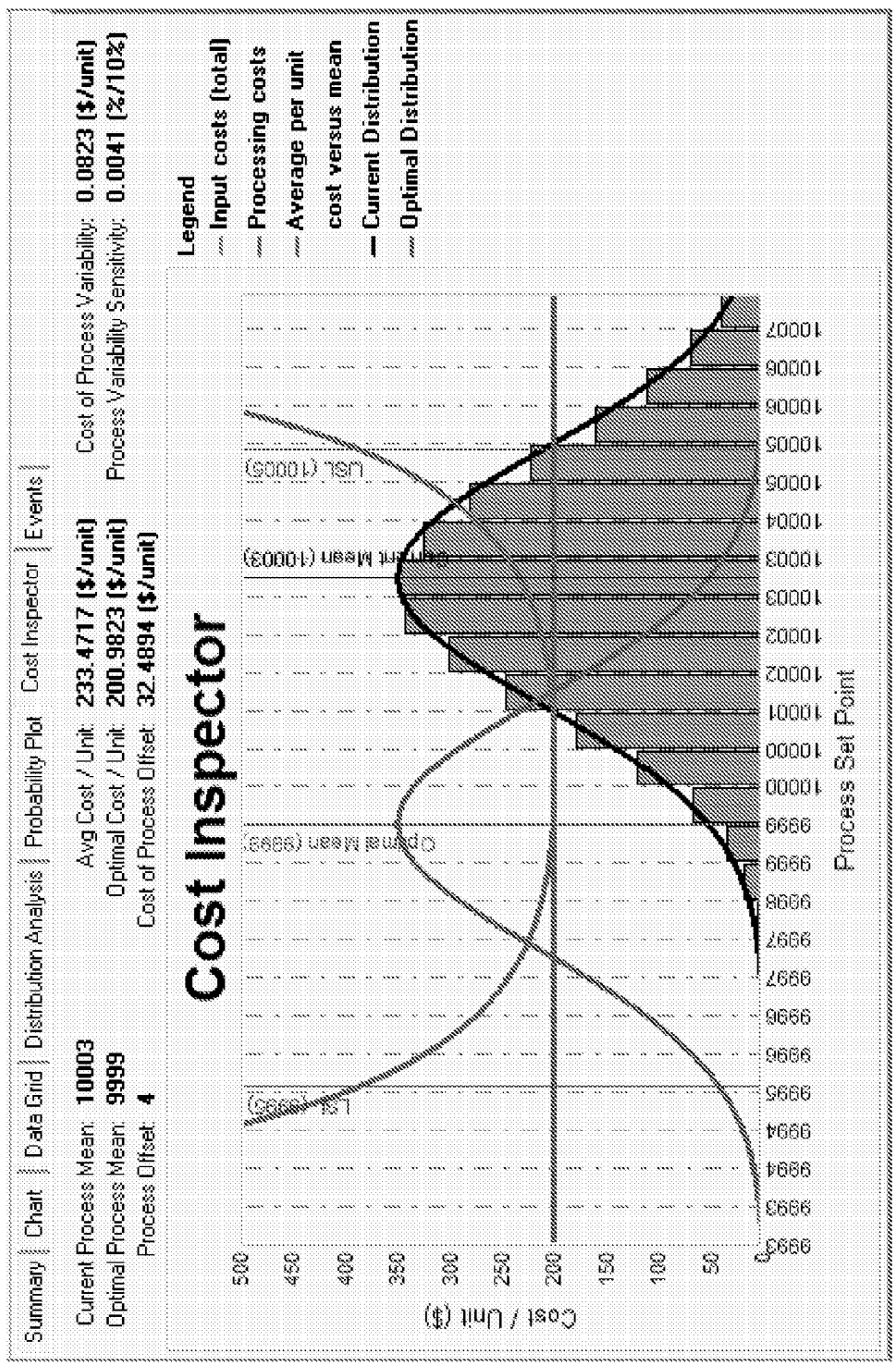
FIG. 20B provides an exemplary graphical view of costs, probability density function of a set of production data, and an optimal data mean provided by a real-time SPC system.
Figure 20C:
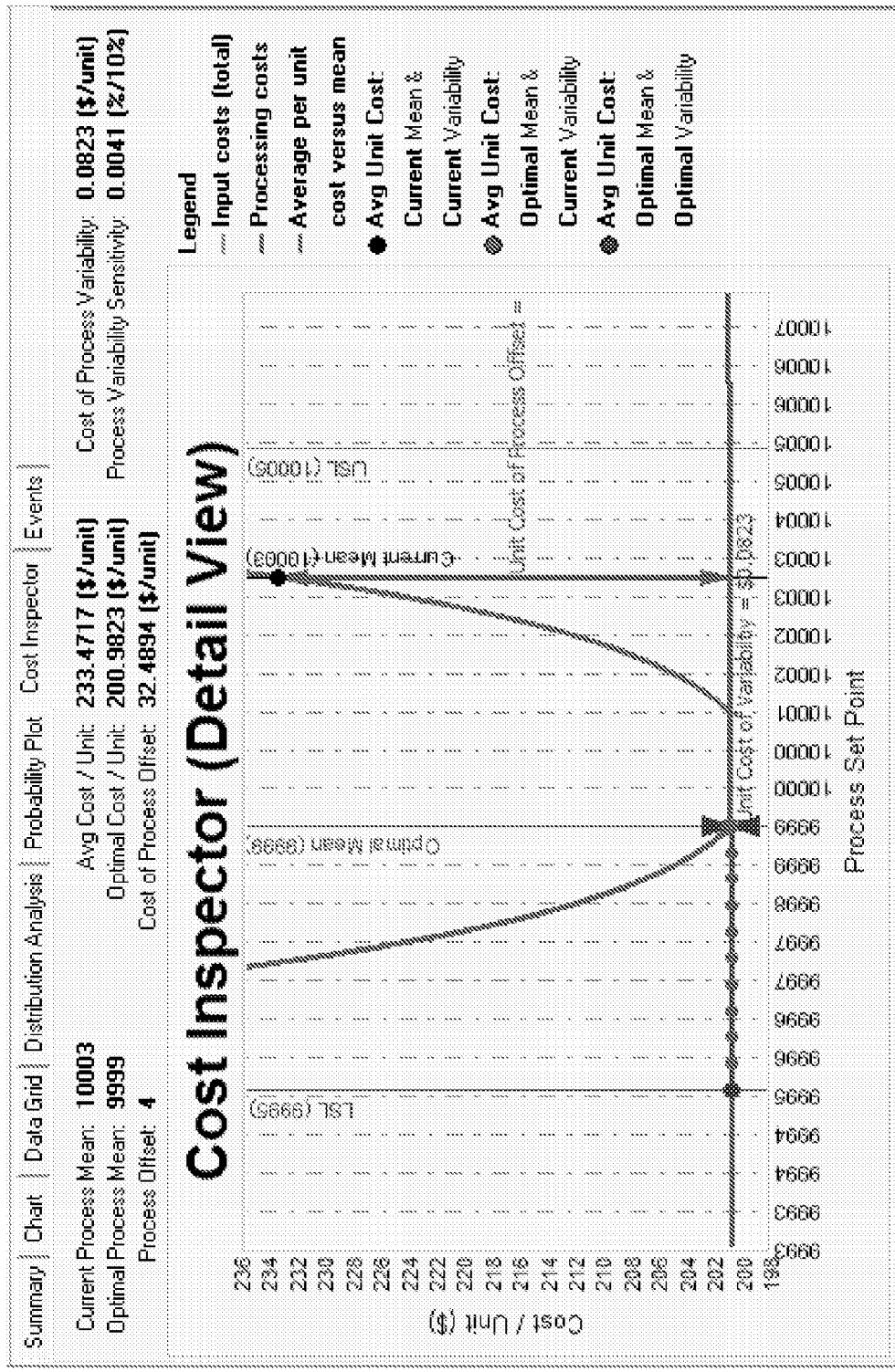
FIG. 20C provides a detail view of FIG. 20B.

FIGS. 20A-20C illustrate an example of a cost model 112 for an injection molding process step 210 having a set of associated variable data 122 for a diameter of a part. In addition to the process step cost factor 113*a* entered in the process step cost factor box 940, the cost model 112 has a material cost factor 113*b* entered in the material cost factor box 1010, a lower specification limit violation scrap cost factor 113*c* entered in the LSL scrap cost factor box 1150 and an upper specification limit violation scrap cost factor entered in the USL scrap cost factor box 1230. Applying the cost model 112 to an example set of diameter data, as shown in FIG. 20B, reveals that the data's optimal process mean is to the left of the current process mean and has a cost of process offset of over thirty-two dollars per unit. For every million units molded, this adds up to a waste of $32,489,400.00. The injection molding process step 210 is producing molds with too great a diameter and needs to be adjusted to produce molds of relatively lesser diameter to cut costs. The detail view shown in FIG. 20C illustrates that a "build for LSL scrap" process setting makes sense since, in the end, this will result in lowest average effective cost per good unit.

Figure 21A:
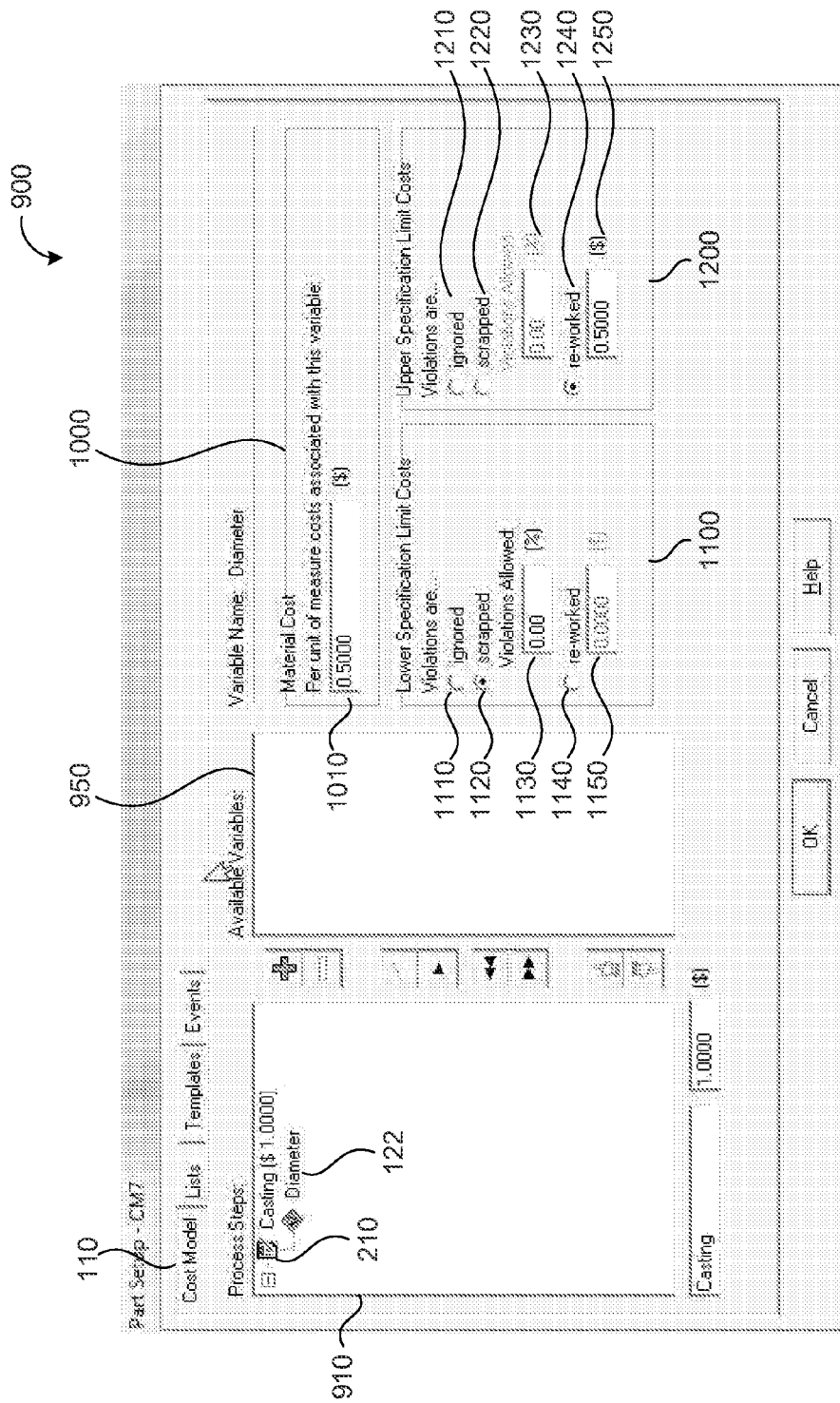
FIG. 21A is a schematic view of an exemplary cost model view receiving inputs for a material cost, a lower specification limit scrapped violation cost and an upper specification limit rework violation cost.
Figure 21B:
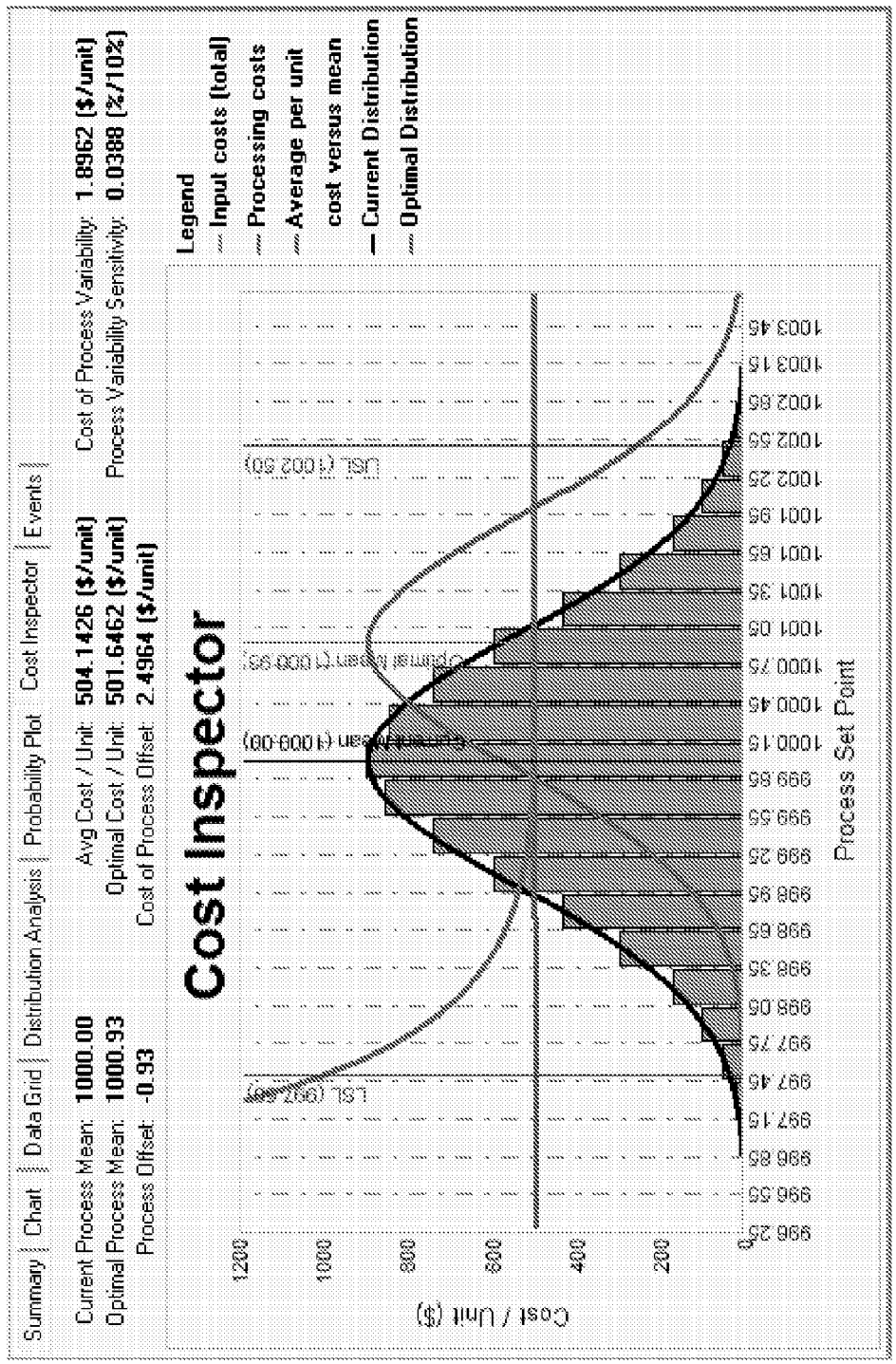
FIG. 21B provides an exemplary graphical view of costs, probability density function of a set of production data, and an optimal data mean provided by a real-time SPC system.
Figure 21C:
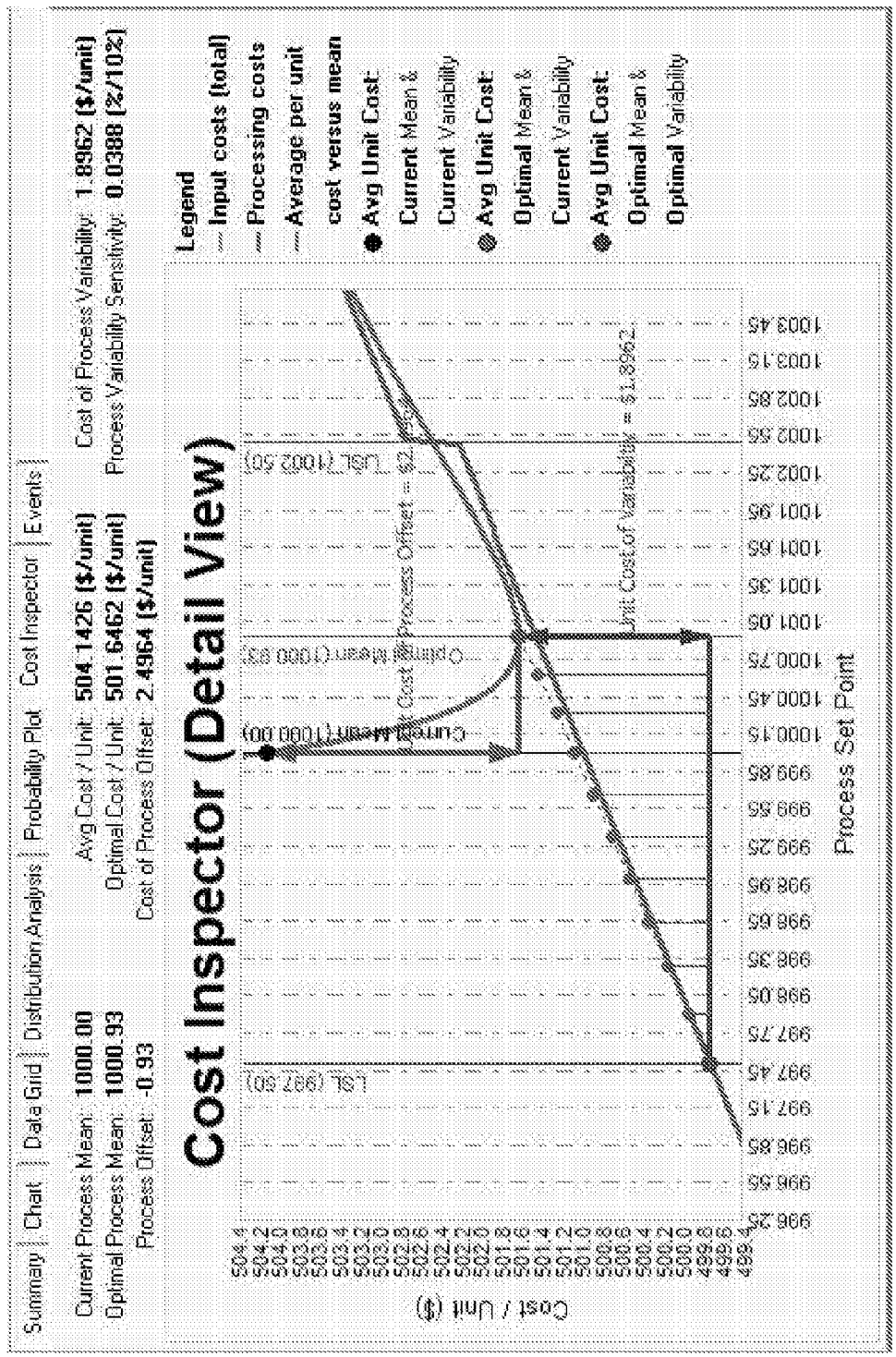
FIG. 21C provides a detail view of FIG. 21B.

FIGS. 21A-21C illustrate an example of a cost model 112 for a casting process step 210 having a set of associated variable data 122 for a diameter of a part. In addition to the process step cost factor 113*a* entered in the process step cost factor box 940, the cost model 112 has a material cost factor 113*b* entered in the material cost factor box 1010, a lower specification limit violation scrap cost factor 113*c* entered in the LSL scrap cost factor box 1150 and an upper specification limit violation rework cost factor 113*f* entered in the USL rework cost factor box 1250. Applying the cost model 112 to an example set of diameter data, as shown in FIG. 21B, reveals that the data's optimal process mean is to the right of the current process mean and has a cost of process offset of just under two and a half dollars per unit. For every million units cast, this adds up to a waste of $2,496,400.00. The casting process step 210 is producing casts with diameters that are too small and needs to be adjusted to produce casts having relatively larger diameters to cut cost. The detail view shown in FIG. 21C illustrates that putting a little more material into each mold can have the desirable but counter-intuitive effect of decreasing the cost/unit.

Figure 22A:
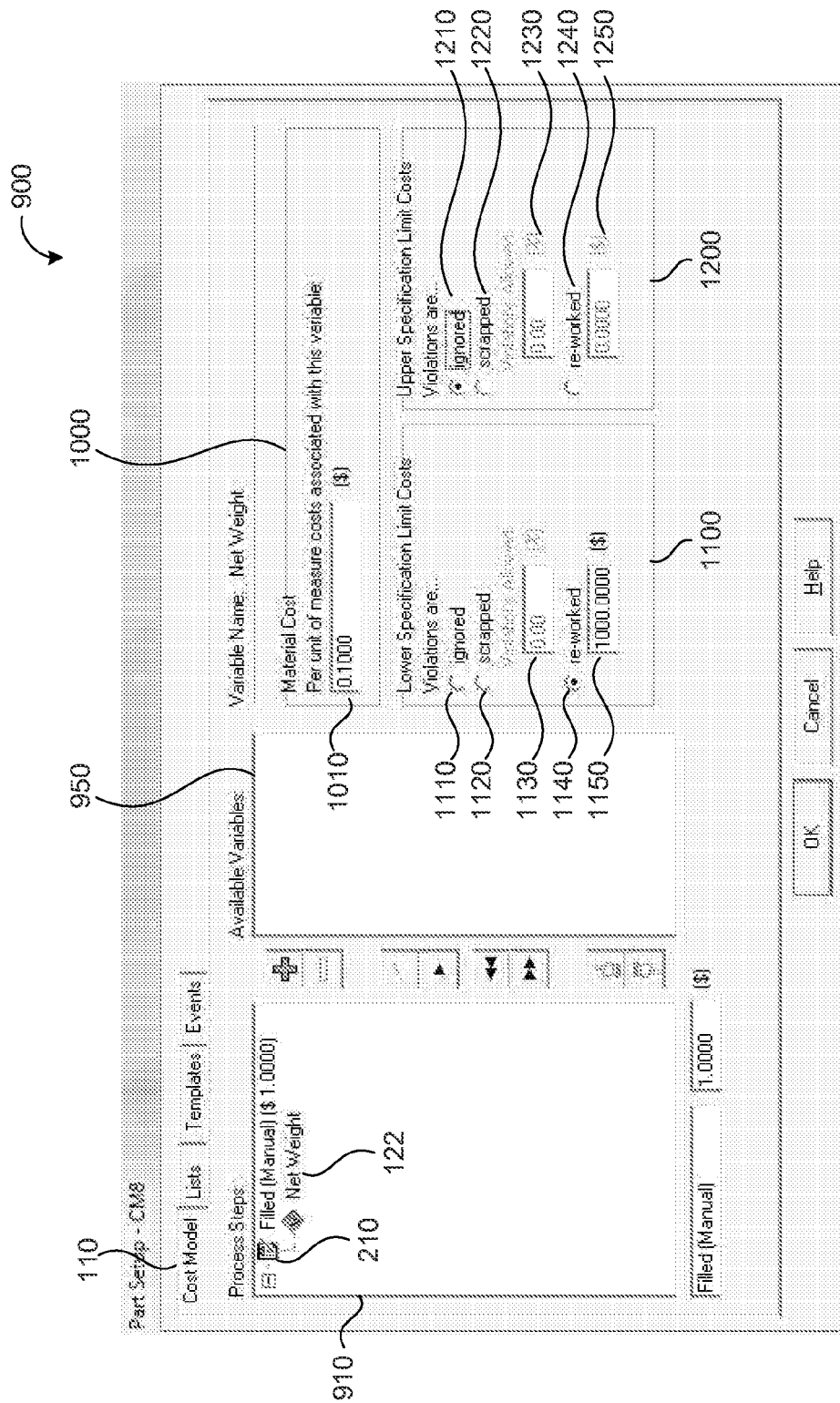
FIG. 22A is a schematic view of an exemplary cost model view receiving inputs for a material cost and a lower specification limit rework violation cost.
Figure 22B:
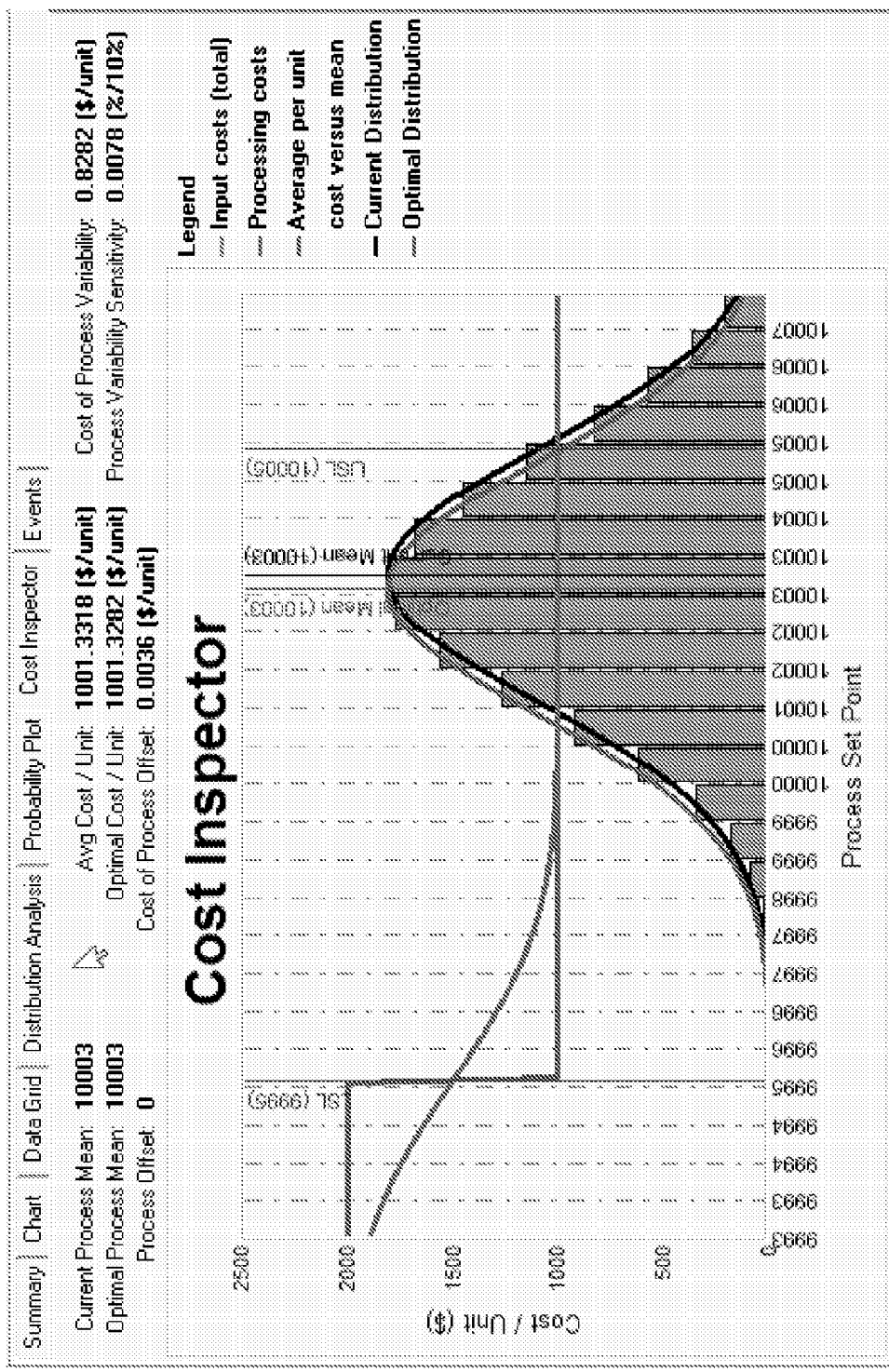
FIG. 22B provides an exemplary graphical view of costs, probability density function of a set of production data, and an optimal data mean provided by a real-time SPC system.
Figure 22C:
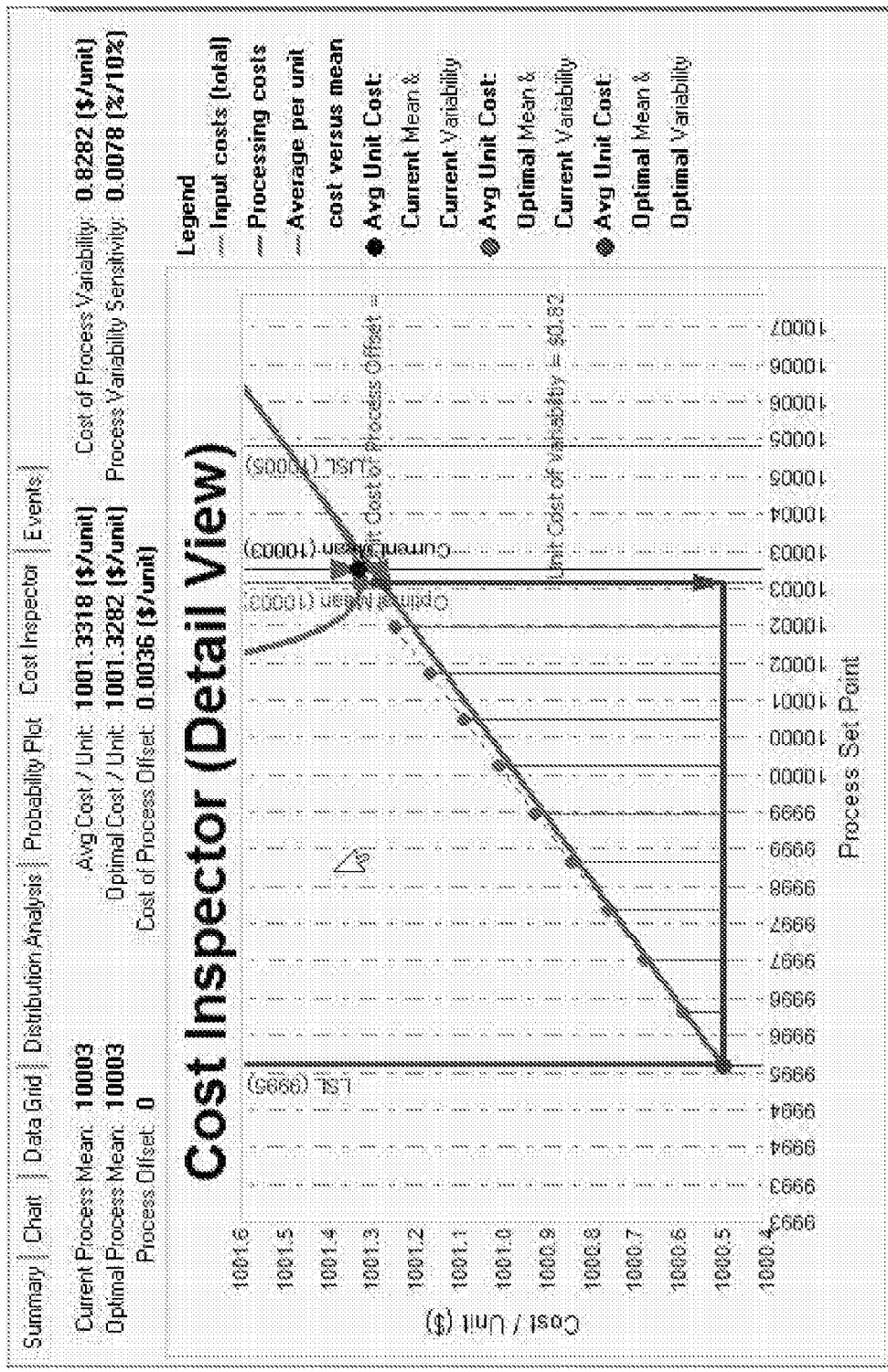
FIG. 22C provides a detail view of FIG. 22B.

FIGS. 22A-22C illustrate an example of a cost model 112 for a filling process step 210 in which a machine dispenses material into a container. A set of variable data 122 associated with the process step 122 is for a net weight. In addition to the process step cost factor 113*a* entered in the process step cost factor box 940, the cost model 112 has a material cost factor 113*b* entered in the material cost factor box 1010 and a lower specification limit violation rework cost factor 113*d* entered in the LSL rework cost factor box 1150. Applying the cost model 112 to an example set of net weight data, as shown in FIG. 22B, reveals that the data's optimal process mean is just slightly to the left of the current process mean and has a cost of process offset of less than a half-cent per unit. For every million containers filled, this adds up to a waste of $3,600.00. The filling process step 210 is slightly overfilling containers and can be adjusted to fill the containers with less material to save costs. The detail view shown in FIG. 22C illustrates that negligible gain will be had by shifting the current process mean but that considerable gain can be had by decreasing process variability.

Figure 23A:
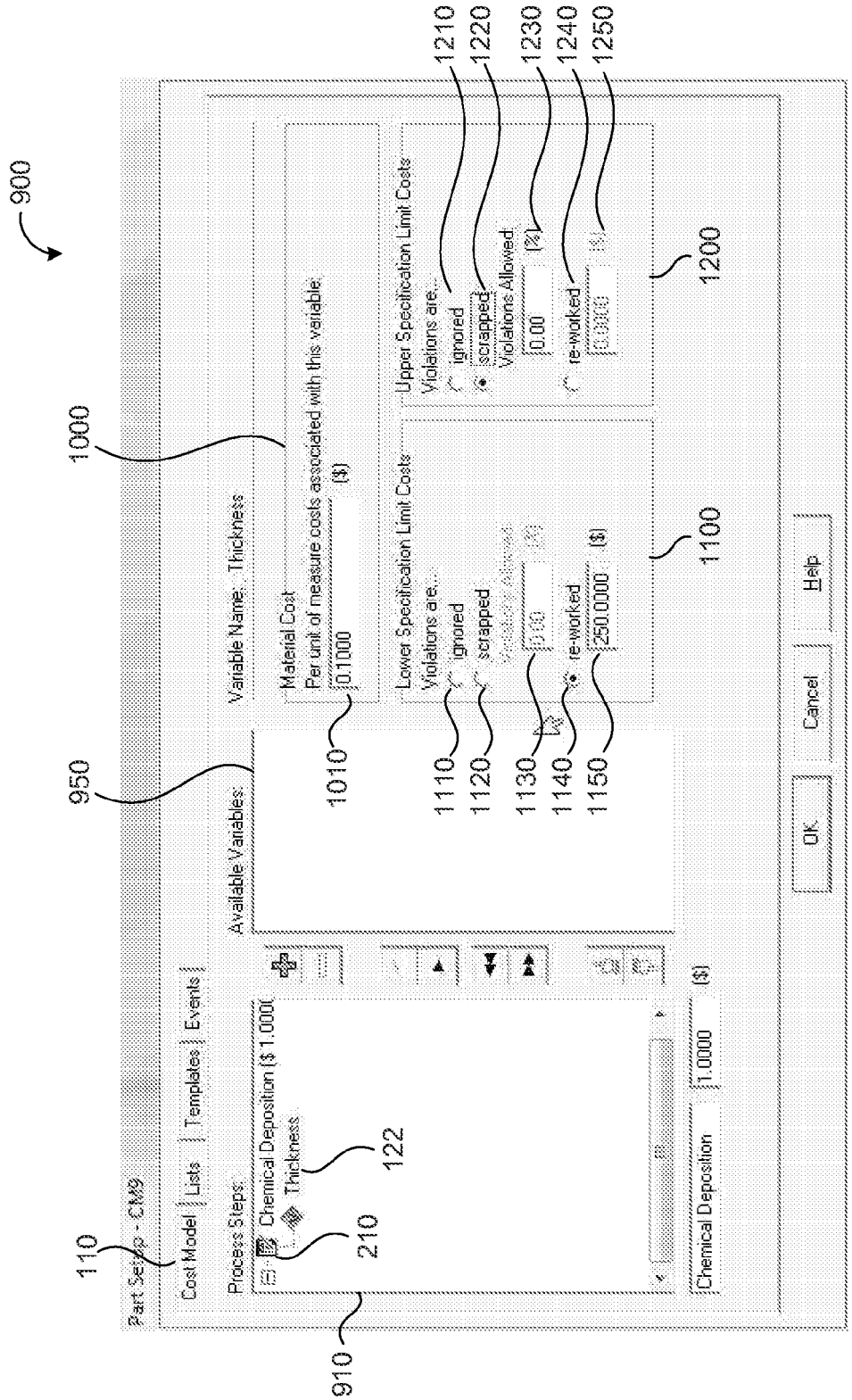
FIG. 23A is a schematic view of an exemplary cost model view receiving inputs for a material cost, a lower specification limit rework violation cost and an upper specification limit scrapped violation cost.
Figure 23B:
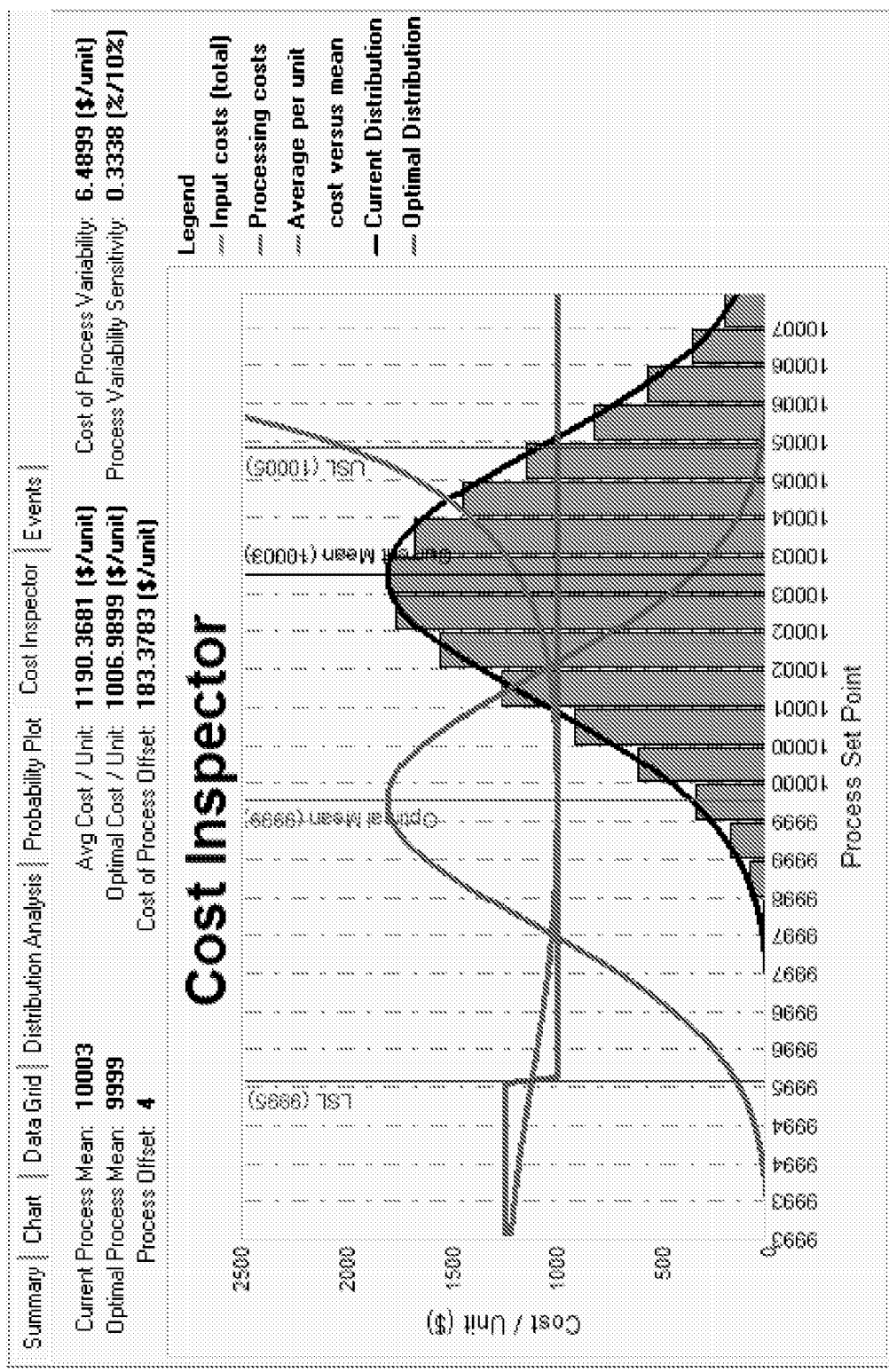
FIG. 23B provides an exemplary graphical view of costs, probability density function of a set of production data, and an optimal data mean provided by a real-time SPC system.
Figure 23C:
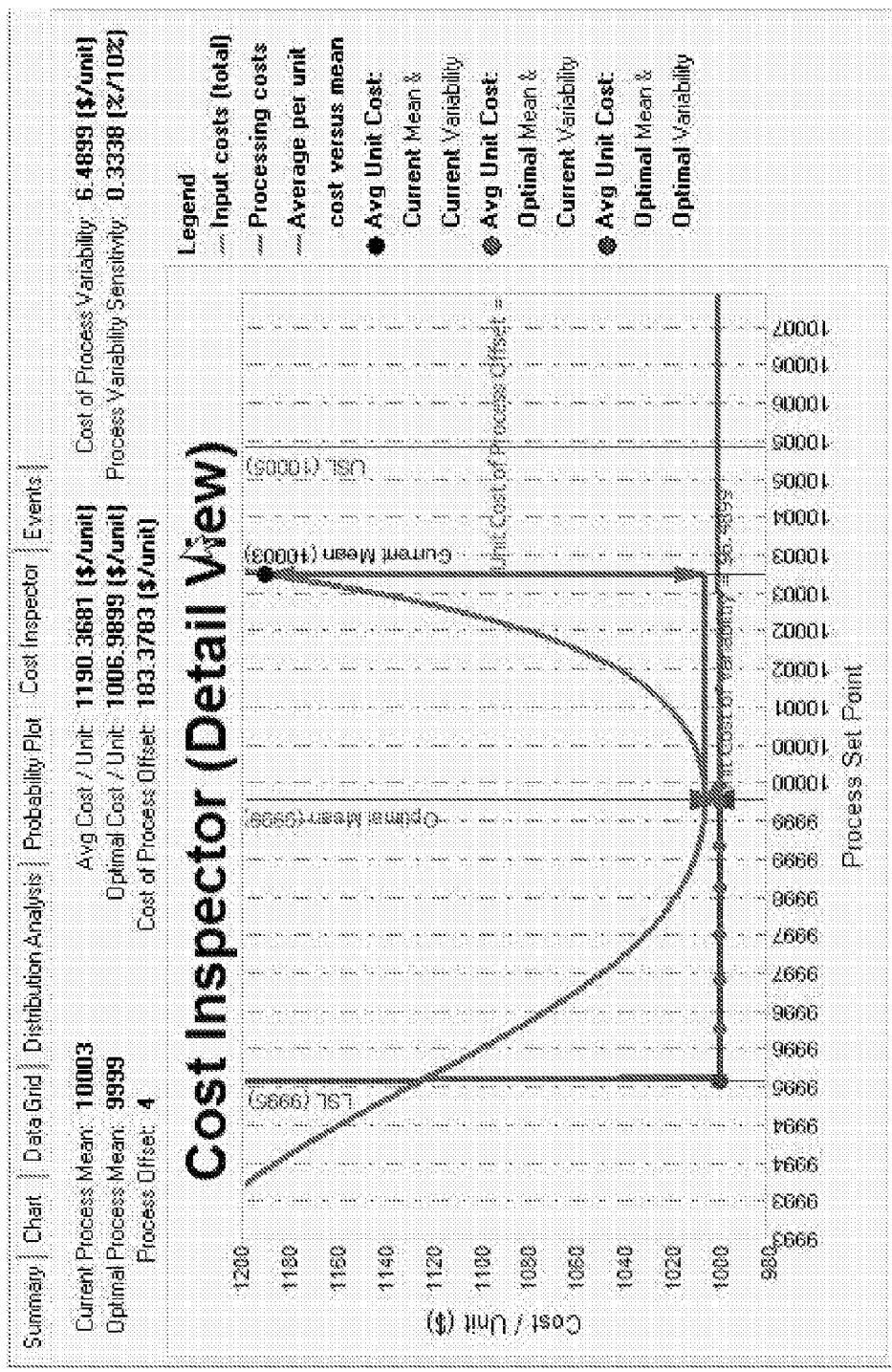
FIG. 23C provides a detail view of FIG. 23B.

FIGS. 23A-23C illustrate an example of a cost model 112 for a chemical deposition process step 210 having a set of associated variable data for a thickness. In addition to the process step cost factor 113*a* entered in the process step cost factor box 940, the cost model 112 has a material cost factor 113*b* entered in the material cost factor box 1010, a lower specification limit violation rework cost factor 113*d* entered in the LSL rework cost factor box 1150 and an upper specification limit violation scrap cost factor 113*e* entered in the USL scrap cost factor box 1230. Applying the cost model 112 to an example set of thickness data, as shown in FIG. 23B, reveals that the data's optimal process mean is to the left of the current process mean and has a cost of process offset of just over a hundred and eighty-three dollars per unit. For every million units processed, this adds up to a waste of $183,378,300.00. The chemical deposition process step 210 is over-depositing chemicals and needs to be adjusted to deposit relatively less material to save costs. The detail view shown in FIG. 23C illustrates that the cost of process offset is 30 times the cost of process variability, which dictates that a priority improvement is shifting the process mean.

Figure 24A:
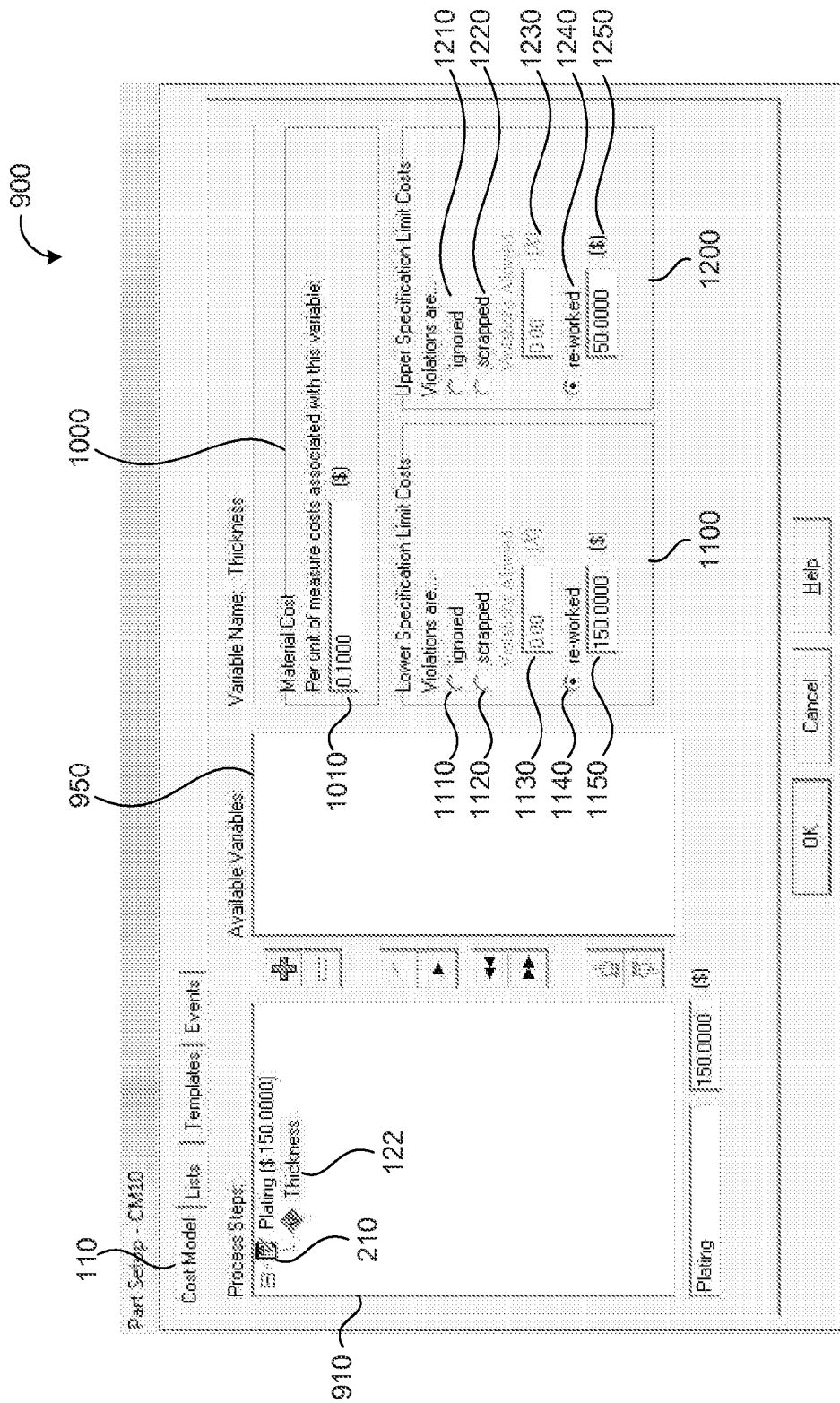
FIG. 24A is a schematic view of an exemplary cost model view receiving inputs for a material cost, a lower specification limit rework violation cost and an upper specification limit rework violation cost.
Figure 24B:
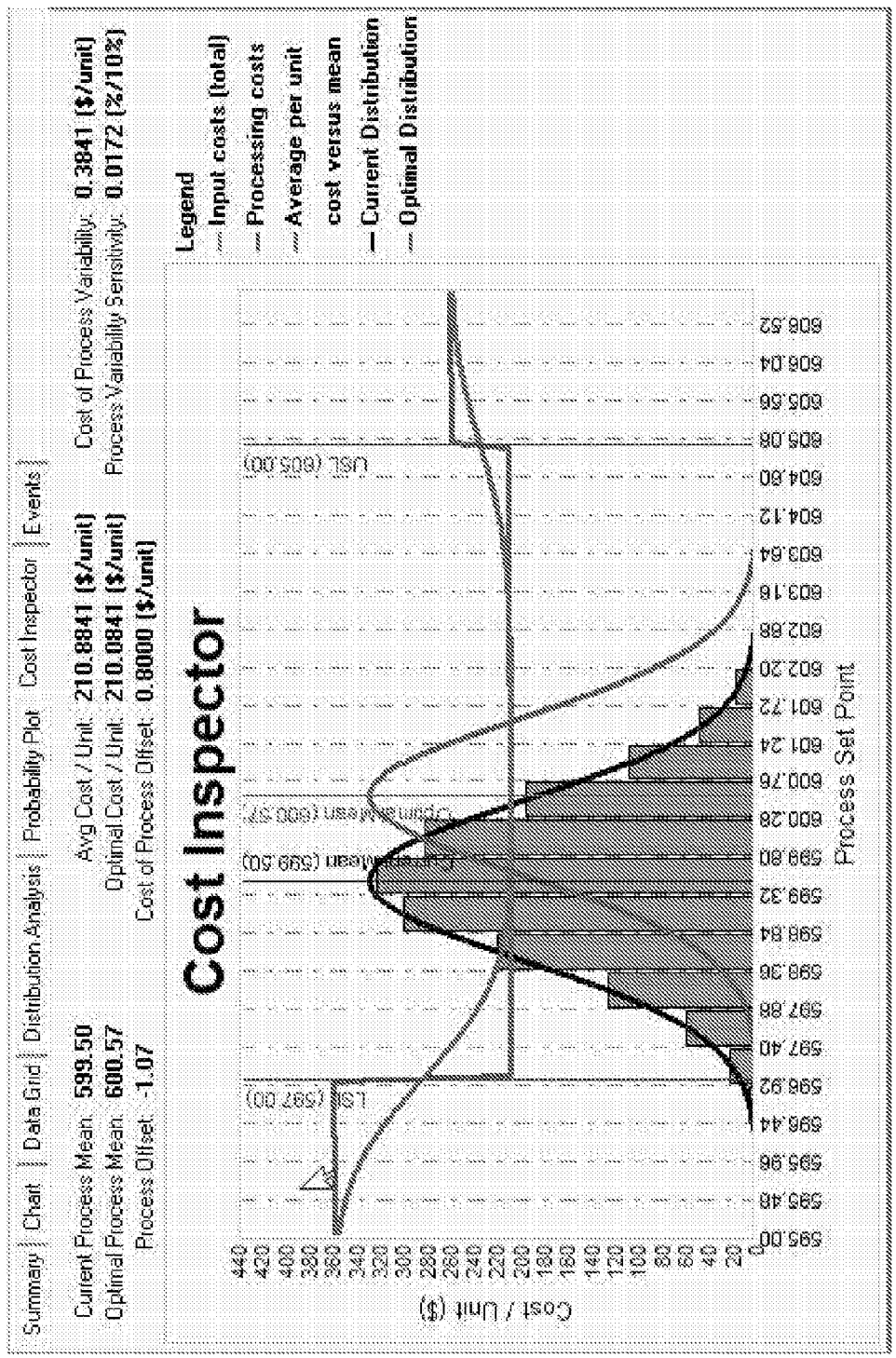
FIG. 24B provides an exemplary graphical view of costs, probability density function of a set of production data, and an optimal data mean provided by a real-time SPC system.
Figure 24C:
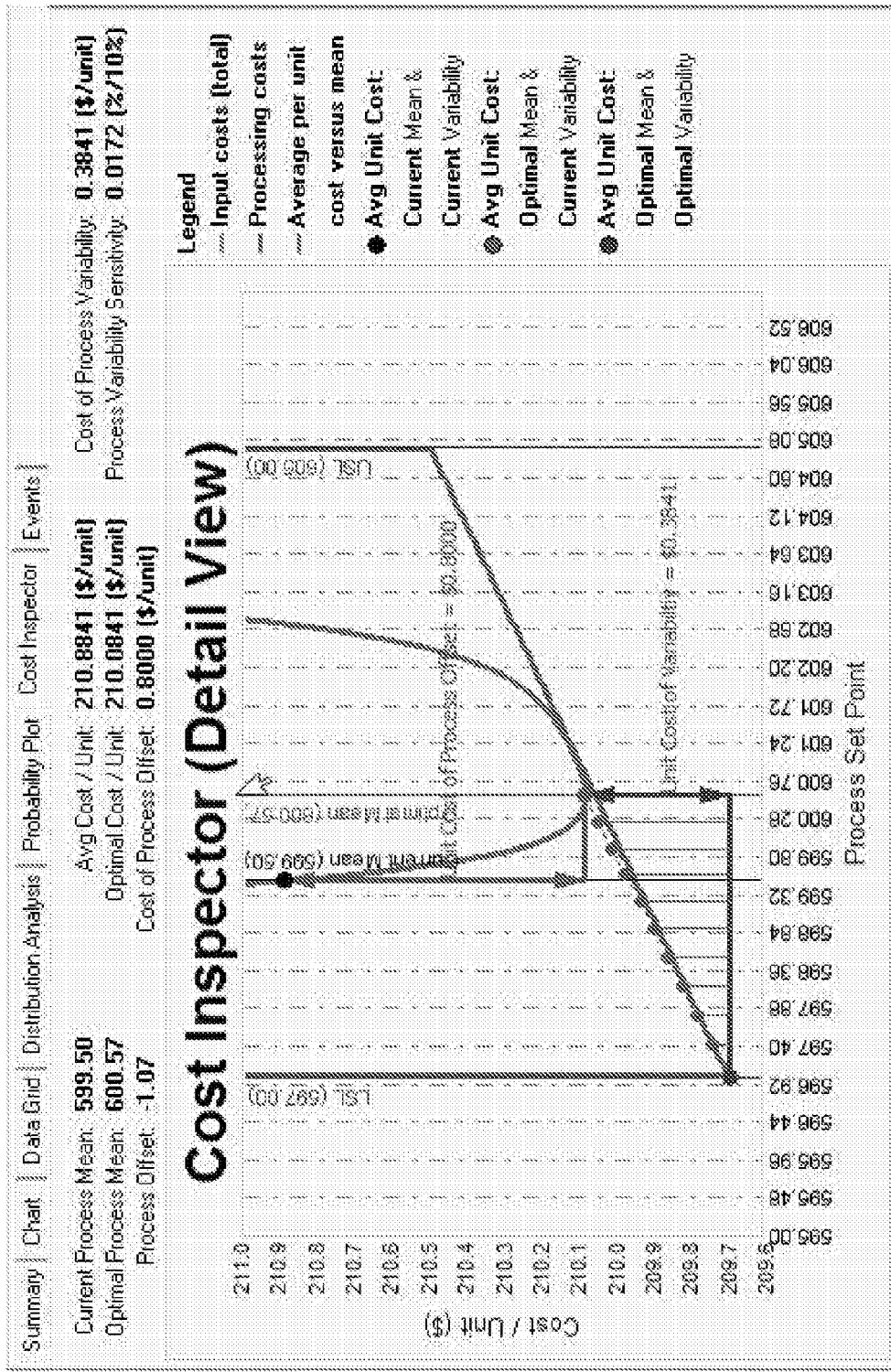
FIG. 24C provides a detail view of FIG. 24B.

FIGS. 24A-24C illustrate an example of a cost model 112 for a plating process step 210 having a set of associated variable data 122 for thickness. In addition to the process step cost factor 113*a* entered in the process step cost factor box 940, the cost model 112 has a material cost factor 113*b* entered in the material cost factor box 1010 and a lower specification limit violation rework cost factor 113*d* entered in the LSL rework cost factor box 1150 and an upper specification limit violation rework cost factor 113*f* entered in the USL rework cost factor box 1250. Applying the cost model 112 to an example set of thickness data, as shown in FIG. 23C, reveals that the data's optimal process mean is to the right of the current process mean and has a cost of process offset of eighty cents per unit. For every million units plated, this adds up to a waste of $80,000.00. The plating process step 210 is under-plating and needs to be adjusted to plate more heavily to save costs. The detail view shown in FIG. 24C illustrates that the bulk of loss comes from LSL rework and that loss increases much more slowly as the USL is approached.

FIGS. 25A-25D illustrate an exemplary SPC system 100 displaying a cost model 900 having a process pane 910 that can be populated with the process steps 210 of a particular process 200. The user may add and remove process steps 210 to the process pane 910 by clicking or selecting a create process step button 920*a* and remove process step button 920*b*, respectively. The user may assign or remove sets of variable data 122 to the selected process step 210 by selecting one or more sets of variable data 122 in an available variables pane 950 and selecting an add variables button 960*a* or a remove variables button 960*b*, respectively. The user can add all available sets of variable data 122 in an available variables pane 950 by selecting an add all variables button 960*d*. Moreover, the user can remove all sets of variable data 122 associated with the selected process step 210 by selecting a remove all variables button 960*d*. The user can reorder the process steps by selecting the move process step up button 970a or the move process step down button 970b. The user may enter a per unit of measure material cost in a material cost box 1010 of a material cost pane 1000.

The LSL violation pane 1100 (FIG. 25A) allows the user to assign lower specification limit properties for each set of variable data 122. In the example shown, the user can select an enforce/ignore radio button 1110 to assign whether the lower specification limits are enforced or ignored. A rework radio button 1140 allows the user to assign whether a part is reworked. A rework settings pane 1152 allows the user to assign associated lower specification limit violation rework cost factors 113d. The rework settings pane 1152 includes a maximum rework attempts radio button 1153 for assigning whether to enforce a maximum number of rework attempts 1154. A rework threshold radio button 1155 allows the user to assign whether to enforce a rework threshold 1156a, a cost of each attempt 1156b, a chance of success 1156c, and a chance of scrap 1156d. A final disposition pane 1158 allows the user to assign associated lower specification limit violation scrap cost factors 113c and includes a percent violations allowed 1158a, a disposal cost 1158b, a scrap recovery cost 1158c, and a percent material recovery 1158d.

The USL violation pane 1200 (FIG. 25B) allows the user to assign upper specification limit properties for each set of variable data 122. In the example shown, the user can select an enforce/ignore radio button 1210 to assign whether the upper specification limits are enforced or ignored. A rework radio button 1240 allows the user to assign whether a part is reworked. A rework settings pane 1252 allows the user to assign associated upper specification limit violation rework cost factors 113f. The rework settings pane 1252 includes a maximum rework attempts radio button 1253 for assigning whether to enforce a maximum number of rework attempts 1254. A rework threshold radio button 1255 allows the user to assign whether to enforce a rework threshold 1256a, a cost of each attempt 1256b, a chance of success 1256c, and a chance of scrap 1256d. A final disposition pane 1258 allows the user to assign associated upper specification limit violation scrap cost factors 113e and includes a percent violations allowed 1258a, a disposal cost 1258b, a scrap recovery cost 1258c, and a percent material recovery 1258d.

Figure 25A:
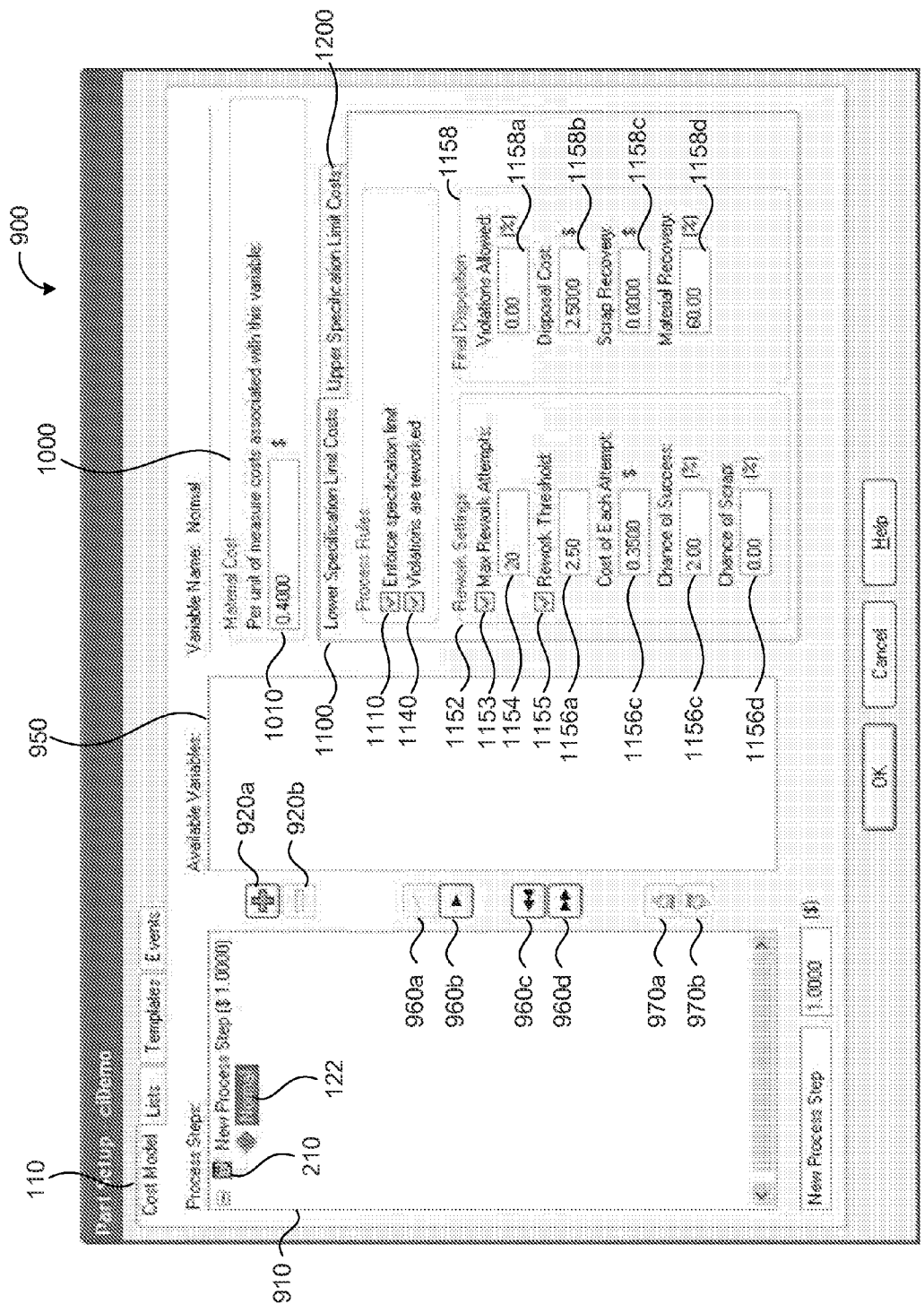
FIGS. 25A and 25B are schematic views of exemplary cost model views receiving cost model inputs.
Figure 25B:
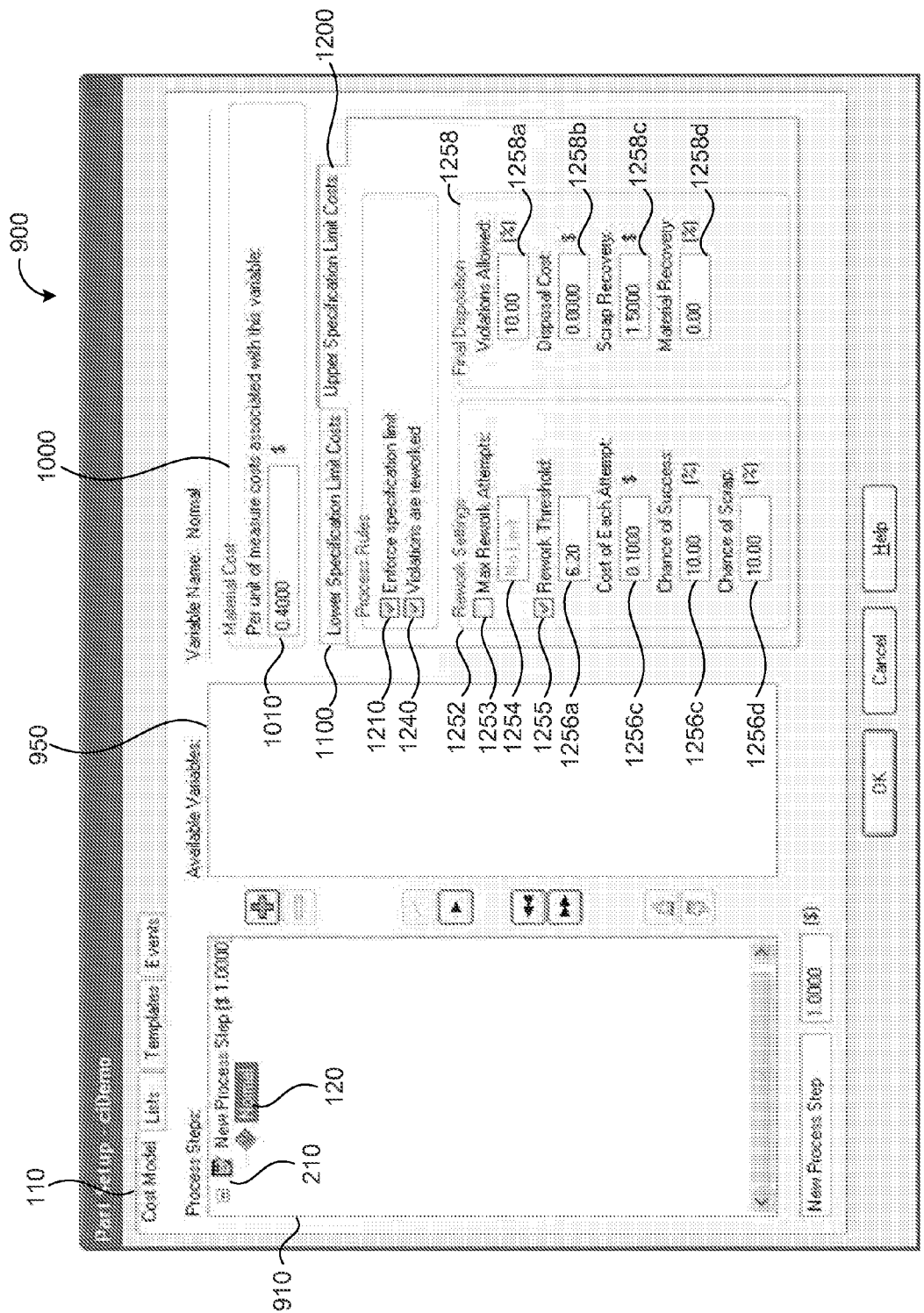
Figure 25C:
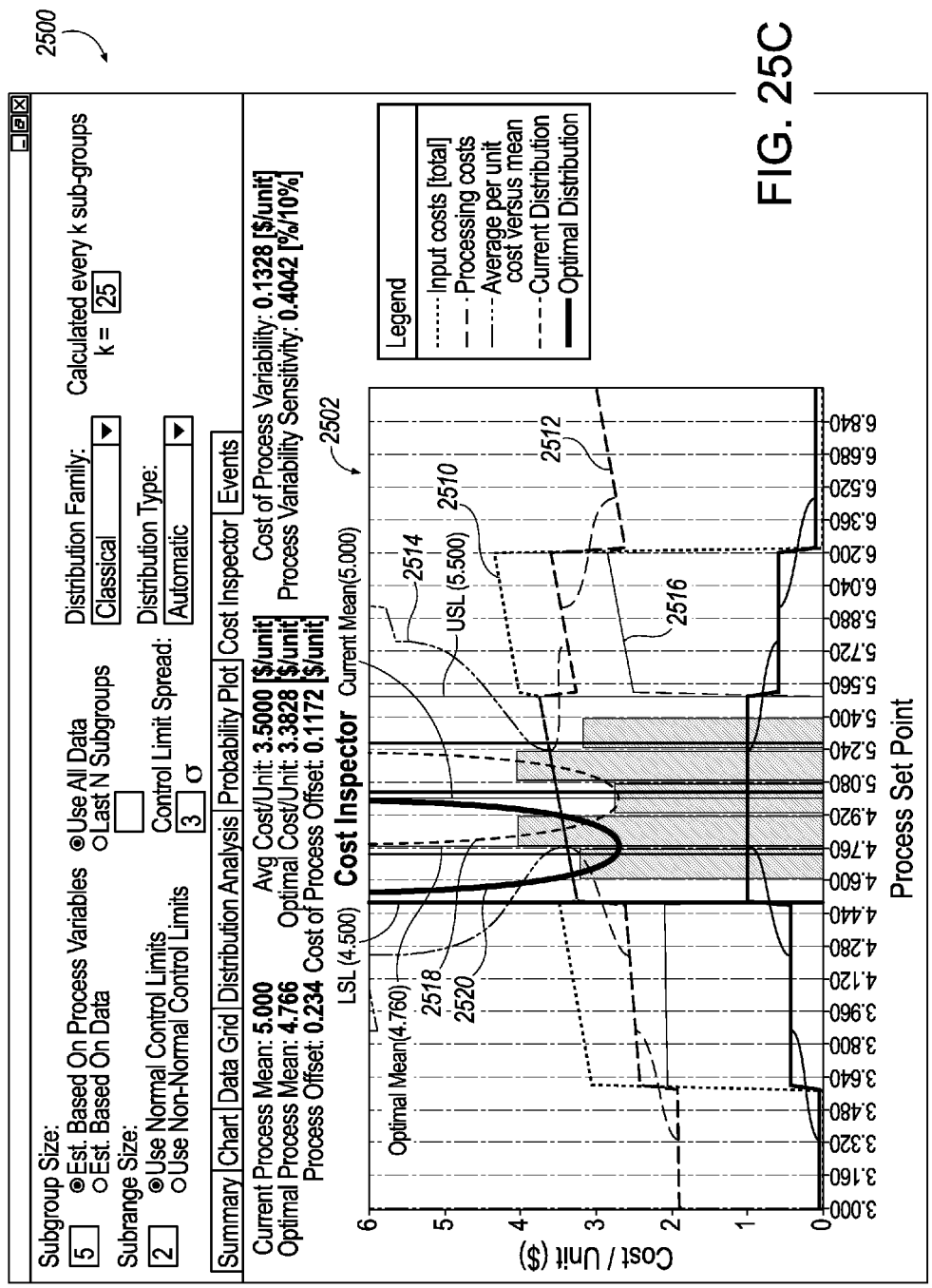
FIGS. 25C-25E are exemplary graphical views of costs, probability density functions of a set of production data, and an optimal data means provided by a real-time SPC system.
Figure 25D:
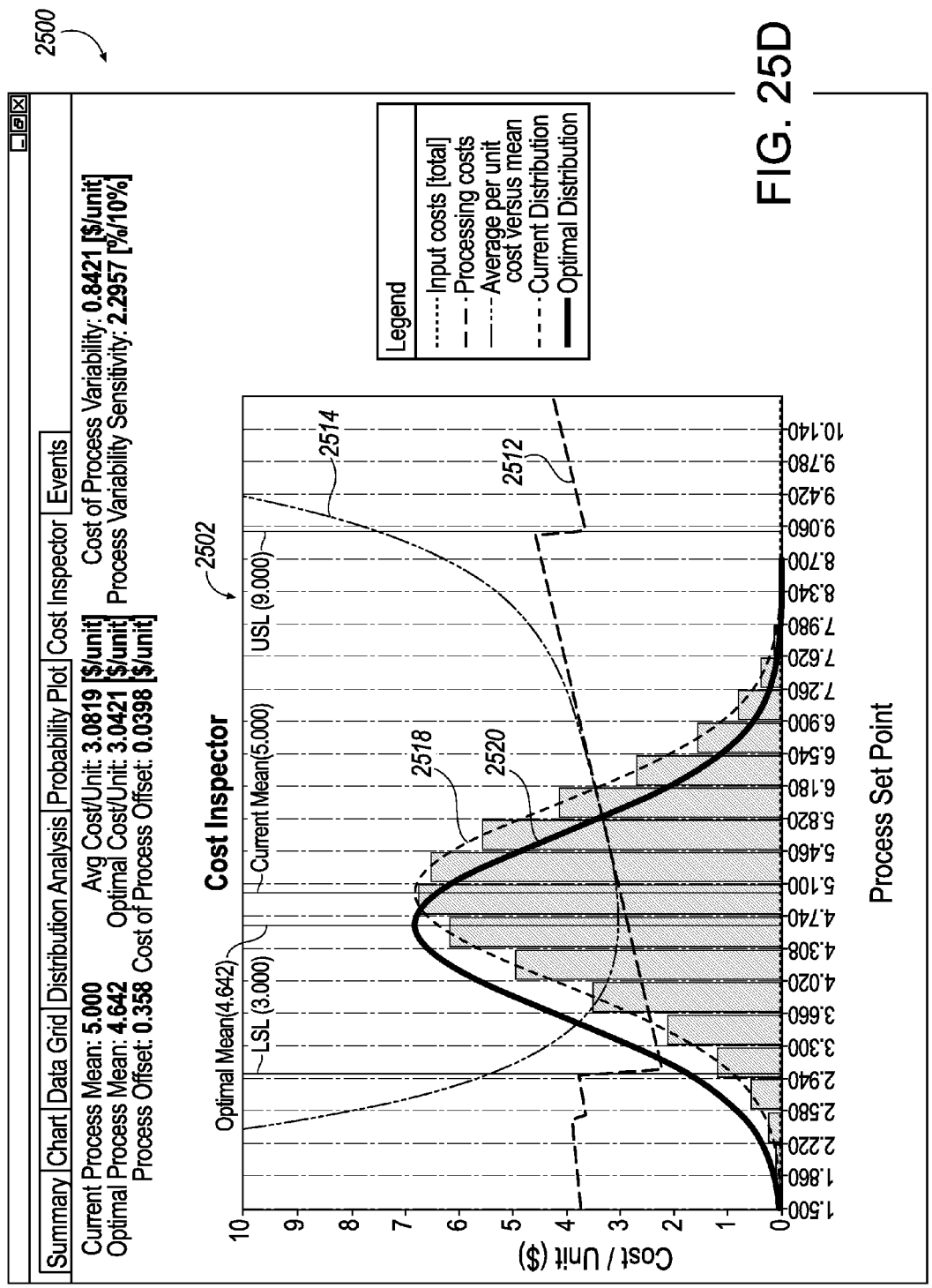
Figure 25E:
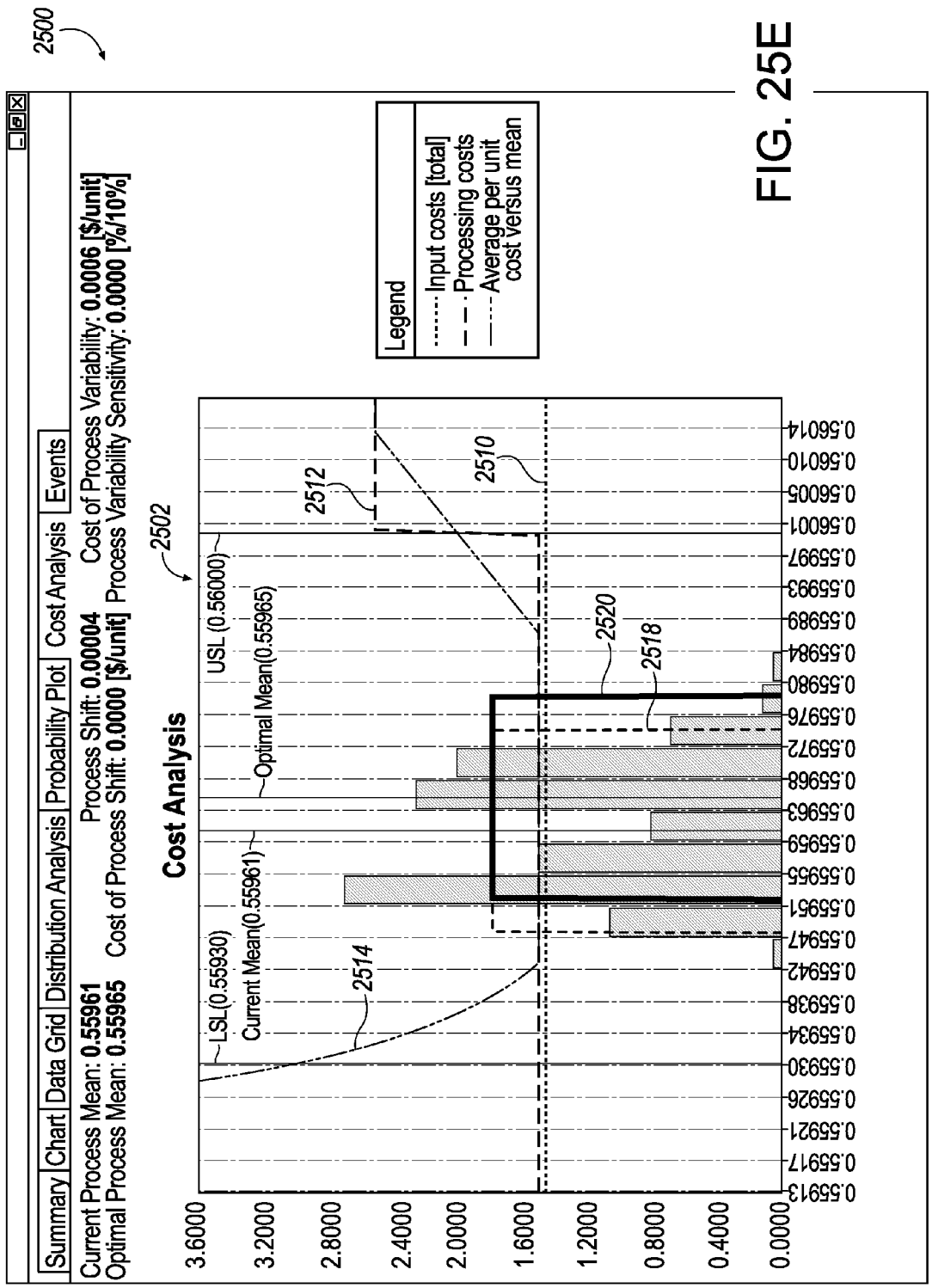

FIGS. 25C-25E illustrate exemplary cost inspector views 2500 providing a graphical representation 2502 of applying the cost model 112 of the example shown to a set of variable data 122. The graphical representation 2502 is plotted as cost per unit versus process set points and includes input costs 2510, processing costs 2512, average cost per unit 2514, cost versus mean 2516, current distribution 2518, and optimal distribution 2520.

The cost model parameters that can be considered in determining the minimum, average, effective per unit manufacturing cost include:

USL is the user-specified, upper specification limit of the production data being analyzed.

LSL is the user-specified, lower specification limit of the production data being analyzed.

ProcessStepCost is the total, loaded processing cost associated with the manufacture of one production unit.

PerUnitCost is the per unit of measure cost of material consumed during the production of a single unit.

$N_U$ ($0 \leq N_U < \infty$) is the maximum number of times that a unit violating its upper specification limit will be reworked in an effort to correct the violation.

$N_L$ ($0 \leq N_L < \infty$) is the maximum number of times that a unit violating its lower specification limit will be reworked in an effort to correct the violation.

URT (USL≤URT<∞) is the dimensional limit beyond which a rework attempt will not be made. That is, a manufactured unit whose dimensional value exceeds this amount will not be reworked.

LRT (−∞<LRT≤LSL) is the dimensional limit beyond which a rework attempt will not be made. That is, a manufactured unit whose dimensional value is less than this amount will not be reworked.

$C_{ReworkAttempt_U}$ is the cost of a single rework attempt that seeks to correct a violation of a unit's USL.

$C_{ReworkAttempt_L}$ is the cost of a single rework attempt that seeks to correct a violation of a unit's LSL.

$p_{Success_U}$ is the percentage chance that any single rework attempt will move the measured dimension of the unit between the specification limits. This parameter is the chance of correcting a violation of the USL.

$p_{Success_L}$ is the percentage chance that any single rework attempt will move the measured dimension of the unit between the specification limits. This parameter is the chance of correcting a violation of the LSL.

$p_{Scrap_U}$ is the percentage chance that any single rework attempt will destroy the unit beyond repair. This parameter is the chance of destroying a unit currently in violation of its USL.

$p_{Scrap_L}$ is the percentage chance that any single rework attempt will destroy the unit beyond repair. This parameter is the chance of destroying a unit currently in violation of its LSL.

Allowance$_U$ is the percentage of parts which violate the USL that are allowed to escape detection without consequence.

Allowance$_L$ is the percentage of parts which violate the LSL that are allowed to escape detection without consequence.

DisposalCost$_U$ specifies an addition per unit cost that must be paid to dispose of a unit that will be scrapped because of a USL violation.

DisposalCost$_L$ specifies an addition per unit cost that must be paid to dispose of a unit that will be scrapped because of an LSL violation.

ScrapRecovery$_U$ is the expected revenue received for one unit sold as scrap. This parameter is the per unit recovery value for those units in violation of their USL.

ScrapRecovery$_L$ is the expected revenue received for one unit sold as scrap. This parameter is the per unit recovery value for those units in violation of their LSL.

MaterialRecovery$_U$ specifies the percentage of material consumed during manufacture that can be recovered before a unit is ultimately scrapped. This parameter applies to those units scrapped owing to a violation of their USL.

MaterialRecovery$_L$ specifies the percentage of material consumed during manufacture that can be recovered before a unit is ultimately scrapped. This parameter applies to those units scrapped owing to a violation of their LSL.

In some implementations, the minimum, average, effective per unit manufacturing cost is given by the following:

$$\frac{d}{d\delta} AEC(\mu_0 + \delta) = 0 \tag{23}$$

This is the standard way to find the x value(s) at which a function reaches either a maximum or minimum. Because of our apriori knowledge of the shape of AEC(·), there can be more than one value of δ which satisfies this expression. Each value is found, and then the value of δ which produces the minimum value of AEC(μ₀+δ) is selected.

AEC(·) is the average, effective, per unit manufacturing cost at any process set point where the denominator is the general form of $P_{good}$. It is defined as follows:

$$AEC(\mu_0 + \delta) = \frac{R_{xy}(\delta)}{R_{xz}(\delta)} = \frac{\int_{-\infty}^{\infty} C_{good}(\zeta + \delta) \cdot pdf(\zeta) d\zeta}{\int_{-\infty}^{\infty} M_{good}(\zeta + \delta) \cdot pdf(\zeta) d\zeta} \quad (24)$$

where, $\mu_0$ is the mean of the production data being analyzed;

δ is any real number such that LSL<$\mu_0$+δ<USL (this constraint forces the recommended process set point to lay between the specification limits);

$C_{good}(\cdot)$ is the per unit manufacturing cost (not the average per unit manufacturing cost) at a given set point and is defined below;

$M_{good}(\cdot)$ is the percentage of units manufactured at a given set point that are considered "good" or "saleable" (not the average percentage of good units manufactured) and is defined below; and pdf(·) is the probability density function (e.g. one of the 12 Pearson distributions) that best fits the data being analyzed.

Now, the per unit manufacturing cost is modeled by the following piecewise linear function, $$C_{good}(\mu) = \begin{cases} m_1 \cdot \mu + b_1 & (\mu < LRT) \\ m_2 \cdot \mu + b_2 & (LRT \le \mu < LSL) \\ m_3 \cdot \mu + b_3 & (LSL \le \mu < USL) \\ m_4 \cdot \mu + b_4 & (USL < \mu \le URT) \\ m_5 \cdot \mu + b_5 & (URT < \mu) \end{cases} \quad (25)$$

where, $$m_1 = Allowance_L \cdot PerUnitCost + \\ (1 - Allowance_L) \cdot (1 - MaterialRecovery_L) \cdot PerUnitCost \quad (26)$$

$$b_1 = Allowance_L \cdot ProcessStepCost + (1 - Allowance_L) \cdot \\ (DisposalCost_L - ScrapRecovery_L + ProcessStepCost) \quad (27)$$

$$m_2 = p_{ReworkSuccess_L} \cdot m_3 + (1 - p_{ReworkSuccess_L}) \cdot m_1 \quad (28)$$

$$b_2 = p_{ReworkSuccess_L} \cdot (b_3 + C_{ReworkSuccess_L}) + \\ (1 - p_{ReworkSuccess_L}) \cdot (b_1 + C_{ReworkFailure_L}) \quad (29)$$

$$m_3 = PerUnitCost \quad (30)$$

$$b_3 = ProcessStepCost \quad (31)$$

$$m_4 = p_{ReworkSuccess_U} \cdot m_3 + (1 - p_{ReworkSuccess_U}) \cdot m_5 \quad (32)$$

$$b_4 = p_{ReworkSuccess_U} \cdot (b_3 + C_{ReworkSuccess_U}) + \\ (1 - p_{ReworkSuccess_U}) \cdot (b_5 + C_{ReworkFailure_U}) \quad (33)$$

$$m_5 = Allowance_U \cdot PerUnitCost + \\ (1 - Allowance_U) \cdot (1 - MaterialRecovery_U) \cdot PerUnitCost \quad (34)$$

$$b_5 = Allowance_U \cdot ProcessStepCost + (1 - Allowance_U) \cdot \\ (DisposalCost_U - ScrapRecovery_U + ProcessStepCost) \quad (35)$$

And, $$p_{ReworkSuccess_L} = p_{Success_L} \cdot \sum_{k=1}^{N_L} p_{Rework_L}^{k-1} \quad (36)$$

$$C_{ReworkSuccess_L} = p_{Success_L} \cdot C_{ReworkAttempt_L} \cdot \sum_{k=1}^{N_L} k \cdot p_{Rework_L}^{k-1} \quad (37)$$

$$C_{ReworkFailure_L} = p_{Scrap_L} \cdot C_{ReworkAttempt_L} \cdot \sum_{k=1}^{N_L} k \cdot p_{Rework_L}^{k-1} \quad (38)$$

$$p_{Rework_L} = 1 - p_{Success_L} - p_{Scrap_L} \quad (39)$$

Similarly, $$p_{ReworkSuccess_U} = p_{Success_U} \cdot \sum_{k=1}^{N_U} p_{Rework_U}^{k-1} \quad (40)$$

$$C_{ReworkSuccess_U} = p_{Success_U} \cdot C_{ReworkAttempt_U} \cdot \sum_{k=1}^{N_U} k \cdot p_{Rework_U}^{k-1} \quad (41)$$

$$C_{ReworkFailure_U} = p_{Scrap_U} \cdot C_{ReworkAttempt_U} \cdot \sum_{k=1}^{N_U} k \cdot p_{Rework_U}^{k-1} \quad (42)$$

$$p_{Rework_U} = 1 - p_{Success_U} - p_{Scrap_U} \quad (43)$$

Finally, the percent good parts function is given by the following piecewise constant function, $$M_{good}(\mu) = \begin{cases} p_1 & (\mu < LRT) \\ p_2 & (LRT \le \mu < LSL) \\ p_3 & (LSL \le \mu \le USL) \\ p_4 & (USL < \mu \le URT) \\ p_5 & (URT < \mu) \end{cases} \quad (44)$$

where, $$p_1 = Allowance_L \quad (45)$$

$$p_2 = p_1 + p_{ReworkSuccess_L} \quad (46)$$

$$p_3 = 1 \quad (47)$$

$$p_4 = p_5 + p_{ReworkSuccess_U} \quad (48)$$

$$p_5 = Allowance_U \quad (49)$$

A filling process in which a machine dispenses product of some kind into a can is an exemplary process that can be analyzed using methods and techniques disclosed herein. A measurement used to monitor this process is the Fill Weight of the can. This variable refers to the weight of the product in the can after the can has been filled.

For this example, the lower specification limit (LSL) for a can's fill weight has been established as 3.5 pounds. When the weight falls below this, the can is opened and 75% of the product is recovered. The remainder is hauled away by a hazardous waste disposal vendor at a cost. The upper specification limit (USL) for a can's fill weight has been established as 5.5 pounds. If a can exceeds 6.2 pounds, it is deemed ineligible for rework and set aside. If a can exceeds 5.5 pounds, but not 6.2 pounds, it is reworked. Reworking such a can involves removing and discarding some of its product. Following the rework, the can's contents are again weighed and if these are still found to be above 5.5 pounds, it is reworked a second time. If after 4 rework attempts the fill weight is still not within the spec limits, the can is set aside along with those that were deemed ineligible for rework. Moreover, for this example, each rework attempt has a 5% chance of being successful (meaning that the fill weight of the can will be reduced to be within the spec limits) and a 20% chance of rendering the can so that it cannot be further reworked (for example, by removing too much product). Per policy, of all the cans that are overfilled, regardless of whether or not they exceed 6.2 pounds, 10% may be shipped as if they were good (i.e. as if they have a weight that is within the spec limits). This 10% is taken from the group of cans which are set aside. The remainder of this group is then tagged to be sold at a reduced price.

The costs related to this exemplary process are as follows:
1. The act of filling costs $1.00 per can.
2. The cost of the product with which a can is filled is $0.40 per pound.
3. The hazardous waste disposal fee is $1.50 per can.
4. Reworking a can costs $0.25 per attempt.
5. Unshipped, overfilled cans are sold for $1.25 each.

Figure 26A:
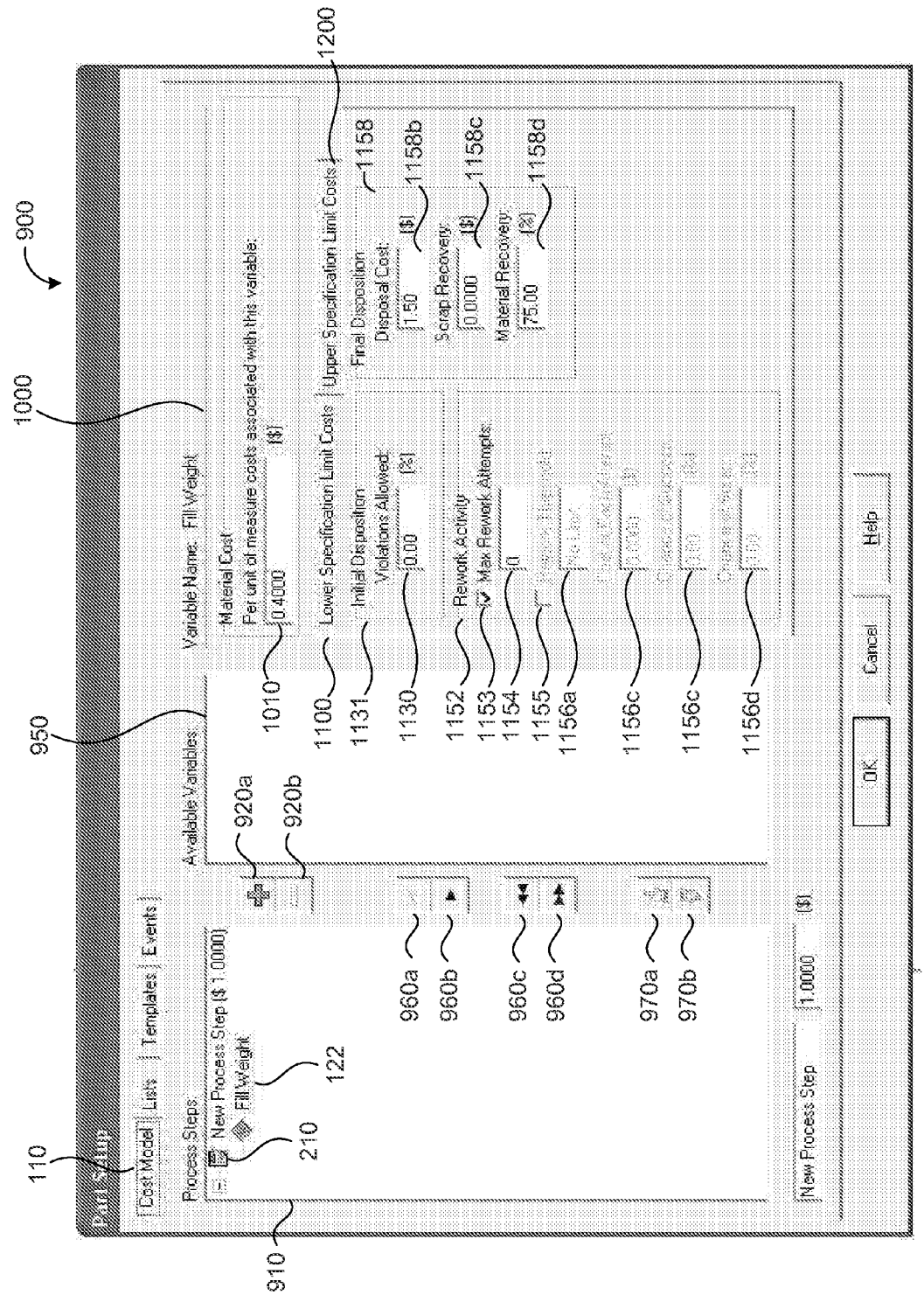
FIGS. 26A and 26B are schematic views of an exemplary cost model view receiving cost model inputs.
Figure 26B:
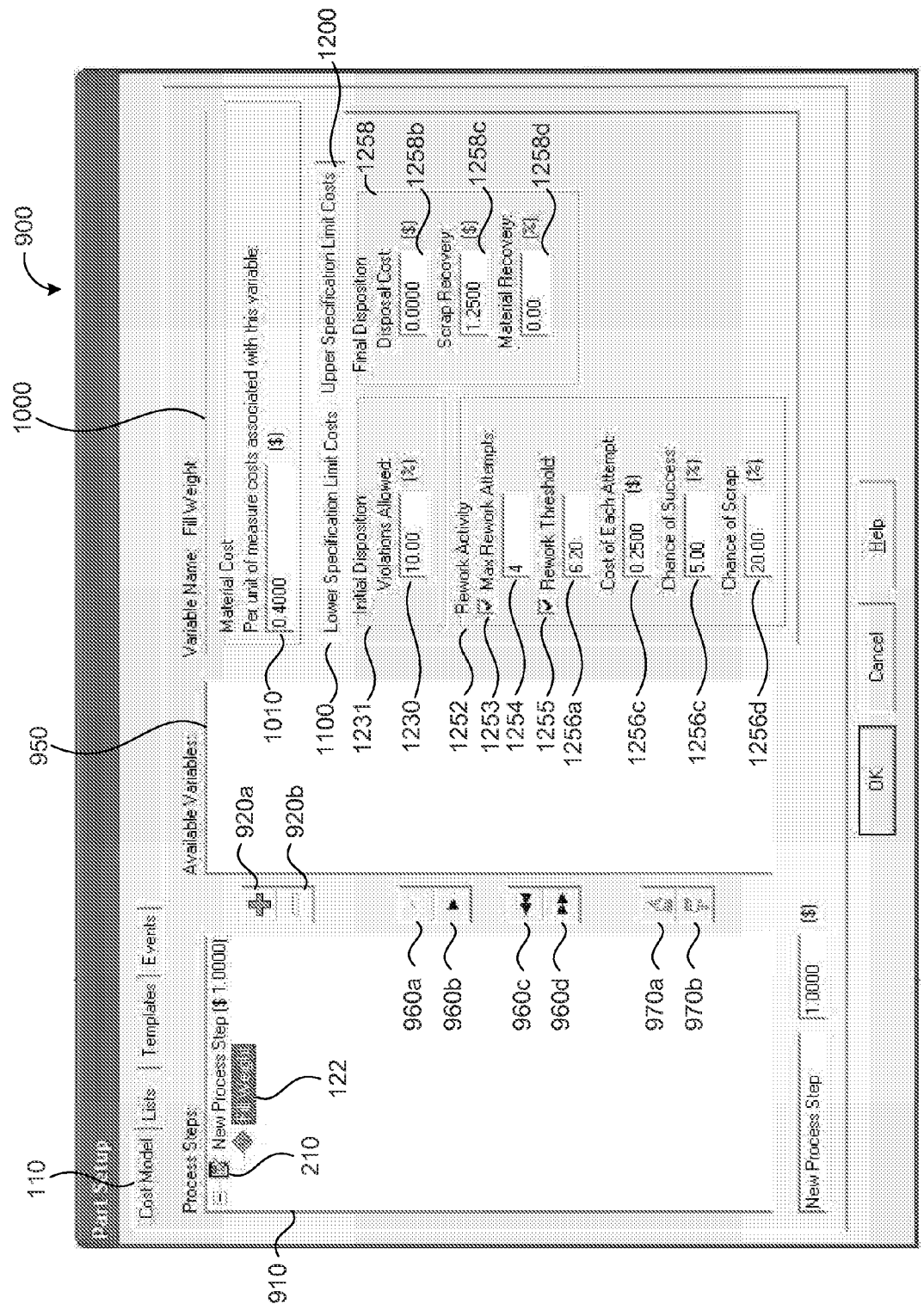

FIGS. 26A and 26B are schematic views of an exemplary cost model view 900 receiving variable inputs. The LSL violation pane 1100 allows the user to assign lower specification limit properties for each set of variable data 122. In the example shown in FIG. 26A, the user can assign a percent of lower specification limit violations allowed 1130 in an initial disposition pane 1131. A rework radio button 1140 allows the user to assign whether a part is reworked. A rework settings pane 1152 allows the user to assign associated lower specification limit violation rework cost factors 113d. The rework settings pane 1152 includes a maximum rework attempts radio button 1153 for assigning whether to enforce a maximum number of rework attempts 1154. A rework threshold radio button 1155 allows the user to assign whether to enforce a rework threshold 1156a, a cost of each attempt 1156b, a chance of success 1156c, and a chance of scrap 1156d. A final disposition pane 1158 allows the user to assign associated lower specification limit violation scrap cost factors 113c and, in the example shown, includes a disposal cost 1158b, a scrap recovery cost 1158c, and a percent material recovery 1158d.

The USL violation pane 1200 allows the user to assign upper specification limit properties for each set of variable data 122. In the example shown in FIG. 26A, the user can assign a percent of upper specification limit violations allowed 1230 in an initial disposition pane 1231. A rework radio button 1240 allows the user to assign whether a part is reworked. A rework settings pane 1252 allows the user to assign associated upper specification limit violation rework cost factors 113f. The rework settings pane 1252 includes a maximum rework attempts radio button 1253 for assigning whether to enforce a maximum number of rework attempts 1254. A rework threshold radio button 1255 allows the user to assign whether to enforce a rework threshold 1256a, a cost of each attempt 1256b, a chance of success 1256c, and a chance of scrap 1256d. A final disposition pane 1258 allows the user to assign associated upper specification limit violation scrap cost factors 113e and, in the example shown, includes a disposal cost 1258b, a scrap recovery cost 1258c, and a percent material recovery 1258d.

Figure 26C:
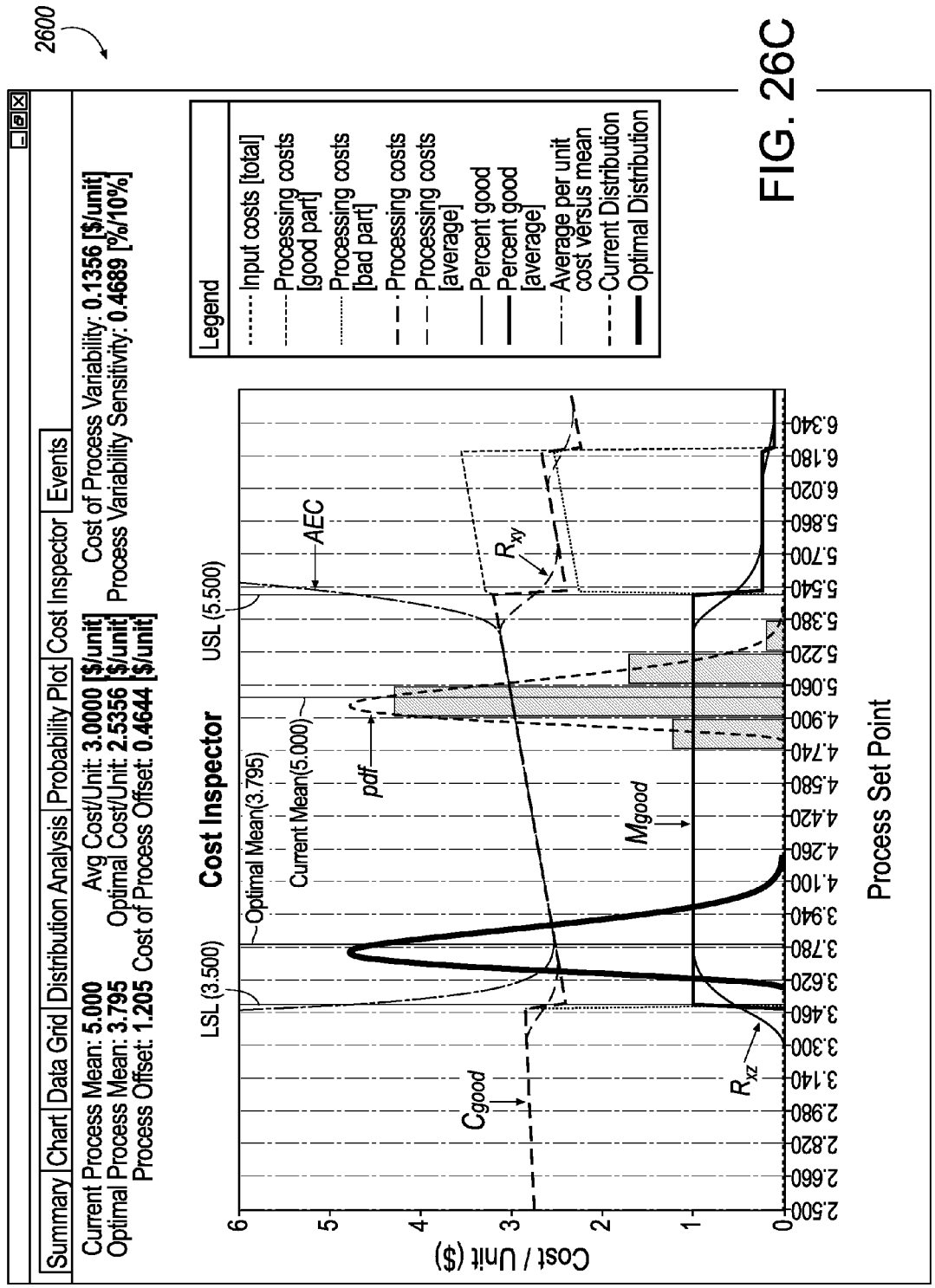
FIG. 26C is an exemplary graphical view of a cross-correlation of cost model inputs with production data.
Figure 26D:
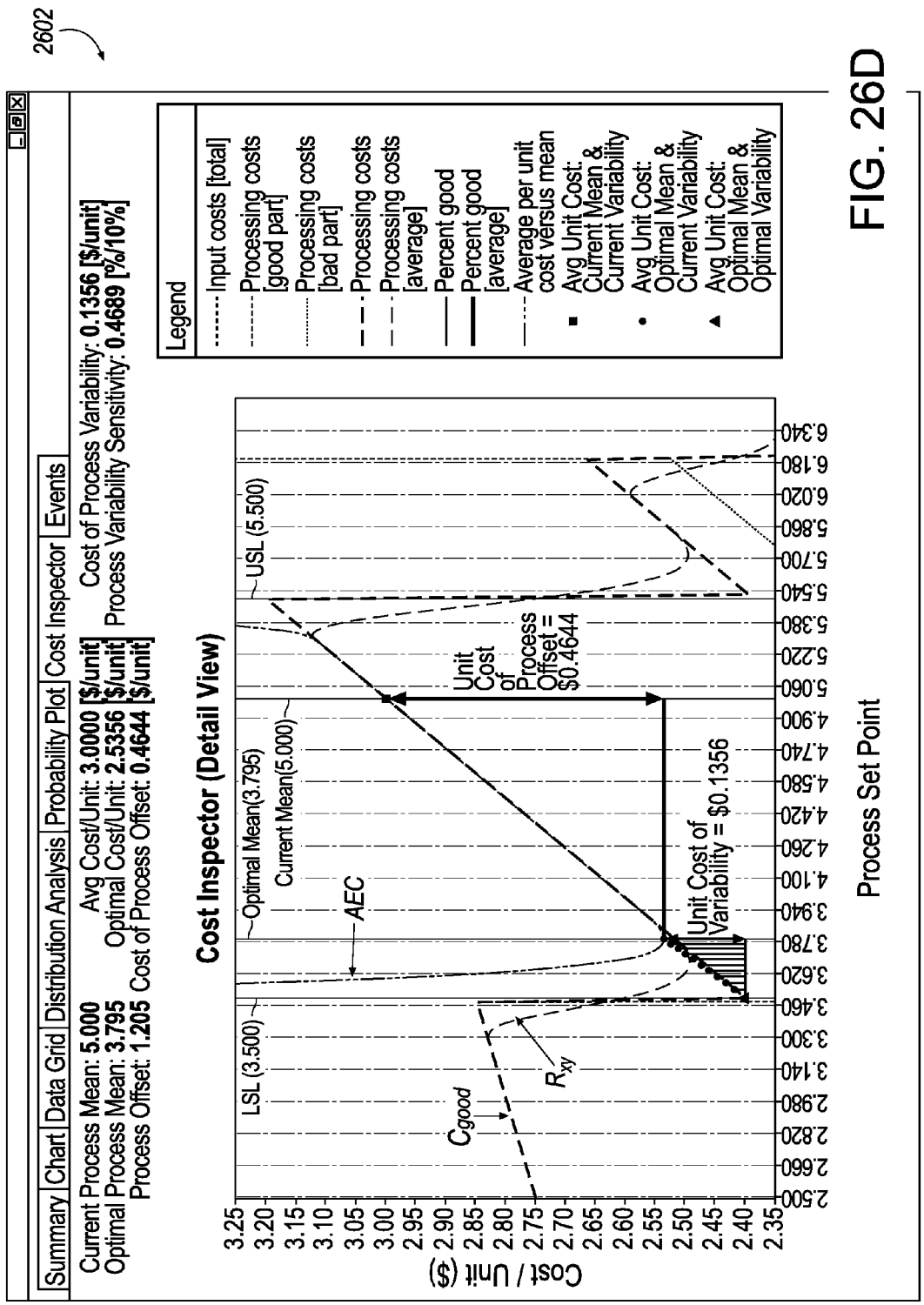
FIG. 26D provides a detail view of FIG. 26C.

The cost inspector cross-correlates the received inputs with a collection of production data. FIG. 26C provides an output view 2600 of the cost inspector providing a graphical representation of the cross-correlation. FIG. 26D provides a detail output view 2602 of the cost inspector providing a graphical representation of the cross-correlation.

Following a similar thought process to that used in the earlier machining case study, each cost factor will be found to contribute to the manufacturing costs of a single unit, or the percentage chance that a manufactured unit is good (i.e., saleable), or both. To start the analysis, consider a single unit manufactured between the specification limits. The total manufacturing cost for each such unit is the Fill Weight times the Per Unit Of Measure cost (e.g., 4.2 lbs.*0.40 $/lb.=$1.68) plus the filling cost (in this example, $1.00 per can). This is the equation of a line given as:

$$C3(x)=0.40*x+1.00(LSL<x<USL) \quad (50)$$

Further, 100% of the units manufactured having a Fill Weight between the specification limits are (by definition) good and saleable. Therefore, $$M3(x)=1.00(LSL<x<USL) \quad (51)$$

To arrive at the proper model equations for those units manufactured having a Fill Weight less than the LSL, we must adjust the costs just calculated by 3 factors. First, none of the units manufactured below the LSL are good, therefore, $$M1(x)=0.00(x<LSL) \quad (52)$$

Second, the cost of each such unit is reduced by 0.75*0.40*x, since 75% of the product put in the can is recovered for future use. And finally, a hazardous waste disposal fee of $1.50 must be added to the cost to manufacture such a unit. Putting these together gives, $$C1(x)=(1.00-0.75)*0.40*x+1.00+1.50(x<LSL) \quad (53)$$

Turning our attention to those units which are initially overfilled, we have two possible process paths to pursue. First, in this example, those units with a Fill Weight of more than 6.2 lbs. are not eligible for re-work, but 10% of these units can be sold for full price. The other 90% can be sold for $1.25 per unit (presumably, a fraction of what a good unit is sold for.) This leads to the following relationships, $$\begin{aligned}C5(x) &= 0.10(0.40*x+1.00)+0.90(0.40*x+1.00-1.25) \\ &\quad (6.20<x) \\ &= 0.40*x-0.125\end{aligned} \quad (54)$$

$$M5(x) = 0.10(6.20<x) \quad (55)$$

The remaining group of overfilled units consists of those units whose initial Fill Weight falls between the USL and 6.20 lbs. Each of these units will be reworked up to 4 times at a cost of $0.25 per rework attempt. With each attempt, we have a 5% chance of successfully adjusting the Fill Weight such that it falls between the specification limits, and a 20% chance of damaging the unit such that no further rework attempts can be made. This implies that we have a 75% chance of requiring another rework attempt. Using standard methods, we can calculate the chance of successfully reworking a unit (in up to 4 attempts) as, $$\begin{aligned}p_{Success} &= (5\%)+(75\%*5\%)+(75\%*75\%*5\%)+ \\ &\quad (75\%*75\%*75\%*5\%) \\ &= 0.05*(1+0.75+0.75*0.75+0.75*0.75*0.75) \\ &= 13.672\%\end{aligned} \quad (56)$$

Adding this percentage to the 10% of units in this range that we are allowed to ship means that, $$M4(x)=0.23672(USL<x<6.20) \quad (57)$$

When attempting to calculate the manufacturing costs accrued by a unit in this range of Fill Weights, we must first calculate the cost of manufacturing a successfully reworked unit, then the cost of a unit which failed its rework. Finally, these two costs are combined based on the percentage just calculated. That is, 13.672% of units manufactured will have the "good" cost, and 86.328% will have the "bad" cost.

The "good" cost is simply C3 (above) plus the average cost of a successful rework. Using standard methods, the cost of a successful rework is, $$c_{Success}=(5\%*\$0.25)+(75\%*5\%*2*\$0.25)+ \\ (75\%*75\%*5\%*3*\$0.25)+(75\%*75\%*75\%*5\%*4*\$0.25) \quad (58)$$

That is, 5% of the units reworked, will only be reworked one time at a cost of $0.25. 5% of the 75% of the units that survive the first rework attempt, will be successfully reworked on the second attempt at a total cost of $0.50. And so on, up to 4 attempts. In total, then, $$c_{Success}=\$0.07344 \text{ per unit (on average)} \quad (59)$$

While it may seem odd that the average cost of a successful rework is less than the cost of any given rework attempt, this number also factors in the chance of successfully reworking a unit.

In a similar manner, the cost of a failed rework is, $$c_{Failure}=(20\%*\$0.25)+(75\%*20\%*2*\$0.25)+ \\ (75\%*75\%*20\%*3*\$0.25)+(75\%*75\%*75\%*95\%*4*\$0.25) \quad (60)$$

or, $$c_{Failure}=\$0.61016 \text{ per unit (on average)} \quad (61)$$

Putting this altogether, then, and including the $1.25 salvage value for those units failing rework, $$C4(x)=0.40*x+13.672\%*(1.00+0.07344)+86.328\%* \\ (-0.125+0.61016) \text{ (USL}<x<6.20) \quad (62)$$

or, more simply, $$C4(x)=0.40*x+0.5656 \text{ (USL}<x<6.20) \quad (63)$$

We have now fully developed the $M_{good}(x)$ and $C_{good}(x)$ equations necessary for the final analysis. Restated here for clarity, we have, $$M_{good}(x) = \begin{cases} M_1 = 0 & (x < LSL) \\ M_3 = 1 & (LSL < x < USL) \\ M_4 = 0.23672 & (USL < x < 6.20) \\ M_5 = 0.1 & (6.20 < x) \end{cases} \quad (64)$$

and, $$C_{good}(x) = \begin{cases} C_1 = 0.10*x + 2.50 & (x < LSL) \\ C_3 = 0.40*x + 1.00 & (LSL < x < USL) \\ C_4 = 0.40*x + 0.5656 & (USL < x < 6.20) \\ C_5 = 0.40*x - 0.125 & (6.20 < x) \end{cases} \quad (65)$$

The first of the above two calculations results in a piecewise constant curve. The second results in a piecewise linear curve.

As in the first use case, to get to the average, effective cost per unit, we must cross-correlate each of these functions with the probability density function of the manufacturing data we are analyzing, and then divide the results. Symbolically, $$AEC(\mu_0 + \delta) = \frac{R_{xy}(\delta)}{R_{xz}(\delta)} = \frac{\int_{-\infty}^{\infty} C_{good}(\zeta + \delta) \cdot pdf(\zeta) d\zeta}{\int_{-\infty}^{\infty} M_{good}(\zeta + \delta) \cdot pdf(\zeta) d\zeta} \quad (66)$$

As before, the minimum value of this function (the minimum average effective per-unit manufacturing cost) can be calculated using standard methods.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of process cost analysis, the method comprising:
    receiving one or more part specification limits for executing a process step;
    determining a per-unit cost function for executing a process step based on a per-unit manufacturing cost and a per-unit rework cost for each acceptable part manufactured by the process step, the per-unit rework cost applied to each part that violates at least one of the one or more part specification limits indicated as allowing rework after a first pass through the process step and undergoing rework so that the corresponding part is within the one or more part specification limits without scrapping the corresponding part;
    determining a percentage-of-acceptable-parts function for executing a process step based on a percentage of parts manufactured by the process step that are within the one or more part specification limits;
    receiving production data into non-transitory memory, the production data corresponding to a measured quality metric of the executed process step;
    determining a probability density function for the received production data;
    executing on a processor a correlation routine for cross-correlating the per-unit cost function with the probability density function of the production data to provide a first cross-correlation, the first cross-correlation corresponding to a weighted average per-unit cost at every set point of the process step;

executing on the processor the correlation routine for cross-correlating the percentage-of-acceptable-parts function with the probability density function of the production data to provide a second cross-correlation, the second cross-correlation corresponding to an average percentage-of-acceptable-parts at every set point of the process step;

determining an average effective per-unit cost at every set point of the processing step to produce a resultant of the process step by dividing the first cross-correlation by the second cross-correlation;

determining an optimal process mean associated with a minimum average effective unit cost associated with a current data distribution;

presenting a process offset based at least in part on a difference between the optimal process mean and a current process mean associated with the current data distribution, the process offset associated with a cost savings of the process step;

iteratively determining the minimum average affective per-unit cost using different standard deviations for the probability density function of the received data corresponding to a theoretical reduction in process variability; and determining an optimal mean and minimum average effective per-unit cost at one or more standard deviations.

2. The method of claim 1, further comprising determining a minimum value of the quotient of the first and second cross-correlations to determine the minimum average effective per-unit cost associated with the current data distribution.

3. The method of claim 2, further comprising electronically displaying a plot corresponding to the determined minimum average effective per-unit cost.

4. The method of claim 1, further comprising presenting the iteratively determined minimum average effective per-unit costs.

5. A method of process cost analysis, the method comprising:
receiving at least one cost factor and one or more specification limits into memory for executing a process step;
receiving production data into non-transitory memory, the production data corresponding to a measured quality metric of the executed process step;
determining a per unit manufacturing cost for the process step based on a per-unit manufacturing cost and a per-unit rework cost for each acceptable part manufactured by the process step, the per-unit rework cost applied to each part that violates at least one of the one or more part specification limits indicated as allowing rework after a first pass through the process step and undergoing rework so that the corresponding part is within the one or more part specification limits without scrapping the corresponding part;
determining a percentage of acceptable units manufactured by the process step based on a percentage of parts manufactured by the process step that are within the one or more part specification limits;
modeling the per unit manufacturing cost as a piecewise linear function;
modeling the percentage of acceptable units as a piecewise constant function;
determining a probability density function for the received production data;
determining a first cross-correlation by executing on a processor a correlation routine for cross-correlating the piecewise linear function with the probability density function for the received production data, the first cross-correlation corresponding to a weighted average per-unit cost at every set point of the process step;
determining a second cross-correlation by executing on the process the cross-correlation routine for cross-correlating the piecewise constant function with the probability density function for the received production data, the second cross-correlation corresponding to an average percentage-of-acceptable-parts at every set-point of the process step;
determining an average effective per-unit cost at every set point of the process step to produce a resultant of the process step by dividing the first cross-correlation by the second cross-correlation;
determining an optimal process mean associated with a minimum average effective per-unit cost associated with a current data distribution;
presenting a process offset based at least in part on a difference between the optimal process mean and a current process mean associated with the current data distribution, the process offset associated with a cost savings of the process step;
iteratively determining the minimum average effective per-unit cost using different standard deviations for the probability density function of the received data corresponding to a theoretical reduction in process variability; and
determining an optimal mean and minimum average effective per-unit cost at one or more standard deviations.

6. The method of claim 5, further comprising determining a minimum value of the quotient of the first and second cross-correlations to determine the minimum average effective per-unit cost associated with the current data distribution.

7. The method of claim 5, further comprising electronically displaying a plot corresponding to the determined average effective per-unit cost.

8. The method of claim 5, further comprising presenting the iteratively determined minimum average effective per-unit costs.

9. The method of claim 5, wherein the at least one cost factor comprising at least one of:
a lower specification limit violation scrap cost factor;
a lower specification limit violation rework cost factor;
an upper specification limit violation scrap cost factor;
an upper specification limit violation rework cost factor;
a maximum rework attempts cost factor for lower specification limit violations;
a maximum rework attempts cost factor for upper specification limit violation;
a lower dimensional limit for rework threshold cost factor;
an upper dimensional limit for rework threshold cost factor;
a cost of each rework attempt cost factor for lower specification limit violations
a cost of each rework attempt cost factor for upper specification limit violations
a percentage chance of rework success cost factor for lower specification limit violations;
a percentage chance of rework success cost factor for upper specification limit violations;
a percentage chance of rework failure cost factor for lower specification limit violations;
a percentage chance of rework failure cost factor for upper specification limit violations;
a percentage of lower specification limit violations allowed cost factor
a percentage of upper specification limit violations allowed cost factor a disposal cost of a scrapped unit cost factor for lower specification limit violations;
a disposal cost of a scrapped unit cost factor for upper specification limit violations;
a per unit recovery value of a scrapped unit cost factor for lower specification limit violations;
a per unit recovery value of a scrapped unit cost factor for upper specification limit violations;
a per unit material value of a scrapped unit cost factor for lower specification limit violations;
a per unit material value of a scrapped unit cost factor for upper specification limit violations;
a per step process cost factor; and
a per unit of measure material cost factor.

10. A cost inspection system for a process, the system comprising:
  a function module receiving a cost model associated with at least one process step and providing a per-unit cost function and a percentage-of-acceptable-parts function for executing a process step, the cost model including one or more part specification limits for executing the process step, the per-unit cost function based on a per-unit manufacturing cost and a per-unit rework cost for each acceptable part manufactured by the process step, the per-unit rework cost applied to each part that violates at least one of the one or more part specification limits indicated as allowing rework after a first pass through the process step and undergoing rework so that the corresponding part is within the one or more part specification limits without scrapping the corresponding part, the percentage of acceptable parts function based on a percentage of parts manufactured by the process step that are within a the one or more part specification limits;
  a data module receiving production data corresponding to a measured quality metric of the executed process step and providing a probability density function for the received production data;
  a cross-correlation module cross-correlating the per-unit cost function with the probability density function of the production data to provide a first cross-correlation corresponding to a weighted average per-unit cost at every set point of the process step and cross-correlating the percentage-of-acceptable-parts function with the probability density function of the production data to provide a second cross-correlation corresponding to an average percentage-of-acceptable-parts at every set point of the process step; and
  a cost module executing on a computing processor, the cost module:
    determining an average effective per-unit cost at every set point to produce a resultant of the at least one process step by dividing the first cross-correlation by the second cross-correlation;
    determining an optimal process mean associated with a minimum average effective per-unit cost associated with a current data distribution;
    presenting a process offset based at least in part on a difference between the optimal process mean and a current process mean associated with the current data distribution, the process offset associated with a cost savings of the process step;
    iteratively determining the minimum average effective per-unit cost using different standard deviations for the probability density function of the received data corresponding to a theoretical reduction in process variability; and
    determining an optimal mean and minimum average effective per-unit cost at one or more standard deviations.

11. The system of claim 10, wherein the cost module displays on an electronic device a plot corresponding to the determined average effective per-unit cost.

12. The system of claim 10, wherein the cost module determines a minimum value of the quotient of the first and second cross-correlations to determine the minimum average effective per-unit cost associated with the current data distribution.

13. The system of claim 10, wherein the cost module electronically displays the iteratively determined minimum average effective per-unit costs.

14. The system of claim 10, wherein the cost module receives at least one cost factor comprising at least one of:
  a lower specification limit violation scrap cost factor;
  a lower specification limit violation rework cost factor;
  an upper specification limit violation scrap cost factor;
  an upper specification limit violation rework cost factor;
  a maximum rework attempts cost factor for lower specification limit violations;
  a maximum rework attempts cost factor for upper specification limit violation;
  a lower dimensional limit for rework threshold cost factor;
  an upper dimensional limit for rework threshold cost factor;
  a cost of each rework attempt cost factor for lower specification limit violations
  a cost of each rework attempt cost factor for upper specification limit violations
  a percentage chance of rework success cost factor for lower specification limit violations;
  a percentage chance of rework success cost factor for upper specification limit violations;
  a percentage chance of rework failure cost factor for lower specification limit violations;
  a percentage chance of rework failure cost factor for upper specification limit violations;
  a percentage of lower specification limit violations allowed cost factor
  a percentage of upper specification limit violations allowed cost factor
  a disposal cost of a scrapped unit cost factor for lower specification limit violations;
  a disposal cost of a scrapped unit cost factor for upper specification limit violations;
  a per unit recovery value of a scrapped unit cost factor for lower specification limit violations;
  a per unit recovery value of a scrapped unit cost factor for upper specification limit violations;
  a per unit material value of a scrapped unit cost factor for lower specification limit violations;
  a per unit material value of a scrapped unit cost factor for upper specification limit violations;
  a per step process cost factor; and
  a per unit of measure material cost factor.

* * * * *